(12) United States Patent
Chen et al.

(10) Patent No.: US 9,671,589 B2
(45) Date of Patent: Jun. 6, 2017

(54) MOBILE DEVICE AND OPTICAL IMAGING LENS THEREOF

(71) Applicant: GeniuS Electronic Optical Co., Ltd., Taichung (TW)

(72) Inventors: Shih-Han Chen, Taichung (TW); Ta-Cheng Fan, Taichung (TW); Jia Sin Jhang, Taichung (TW)

(73) Assignee: GeniuS Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 14/696,203

(22) Filed: Apr. 24, 2015

(65) Prior Publication Data
US 2016/0216484 A1 Jul. 28, 2016

(30) Foreign Application Priority Data
Jan. 23, 2015 (CN) .......................... 2015 1 0034278

(51) Int. Cl.
| | | |
|---|---|---|
| *G02B 13/18* | (2006.01) | |
| *G02B 9/64* | (2006.01) | |
| *G02B 13/00* | (2006.01) | |
| *G02B 5/00* | (2006.01) | |
| *G02B 27/00* | (2006.01) | |
| *G02B 9/62* | (2006.01) | |
| *G02B 3/04* | (2006.01) | |

(52) U.S. Cl.
CPC .......... *G02B 13/0045* (2013.01); *G02B 9/64* (2013.01); *G02B 3/04* (2013.01); *G02B 5/005* (2013.01); *G02B 9/62* (2013.01); *G02B 13/001* (2013.01); *G02B 13/002* (2013.01); *G02B 13/0015* (2013.01); *G02B 13/18* (2013.01); *G02B 27/0025* (2013.01)

(58) Field of Classification Search
CPC ...... G02B 13/0045; G02B 9/62; G02B 13/18; G02B 27/0025; G02B 13/0015; G02B 5/005; G02B 3/04; G02B 9/64; G02B 13/002; G02B 13/001
USPC ................................. 359/713, 739, 756, 757
See application file for complete search history.

(56) References Cited

U.S. PATENT DOCUMENTS

2013/0329306 A1* 12/2013 Tsai .................... G02B 13/0045
                                                         359/713
2014/0355134 A1   12/2014 Sekine

FOREIGN PATENT DOCUMENTS

| CN | 203909381 | 10/2014 |
| TW | 201239446 | 10/2012 |
| TW | 201447357 | 12/2014 |

* cited by examiner

*Primary Examiner* — Evelyn A Lester
(74) *Attorney, Agent, or Firm* — Baker & McKenzie LLP

(57) ABSTRACT

Present embodiments provide for a mobile device and an optical imaging lens thereof. The optical imaging lens may comprise an aperture stop and six lens elements positioned sequentially from an object side to an image side. Through controlling the convex or concave shape of the surfaces of the lens elements and designing parameters satisfying at least one inequality, the optical imaging lens may exhibit better optical characteristics and the total length of the optical imaging lens may be shortened.

14 Claims, 47 Drawing Sheets

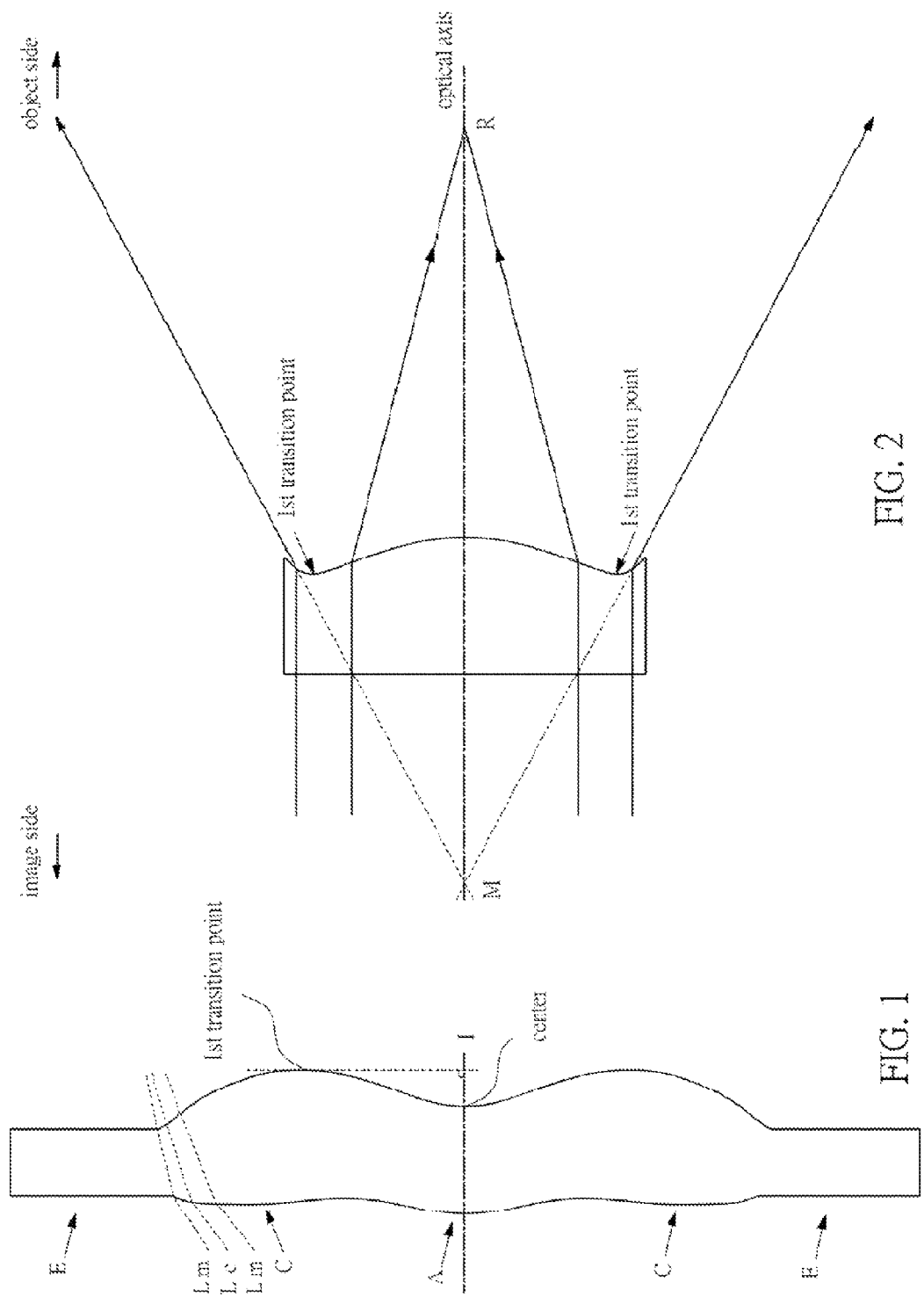

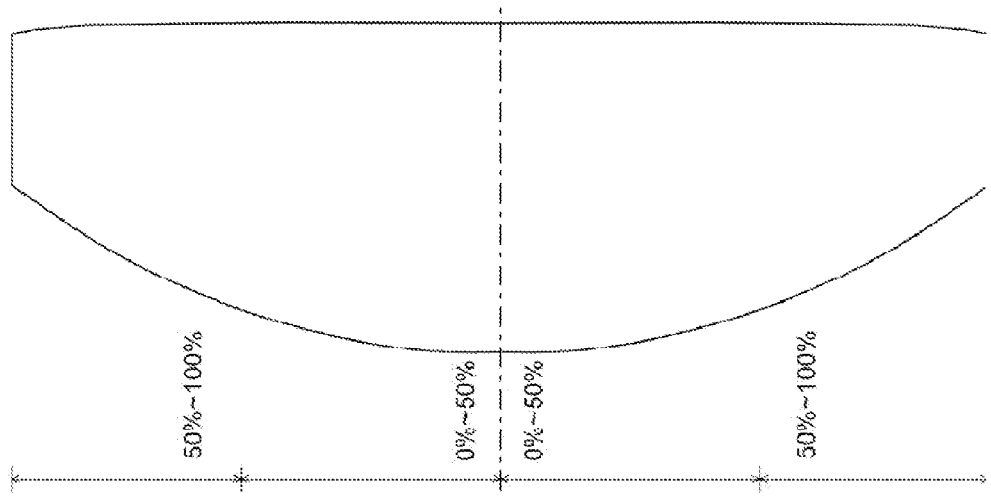
FIG. 5
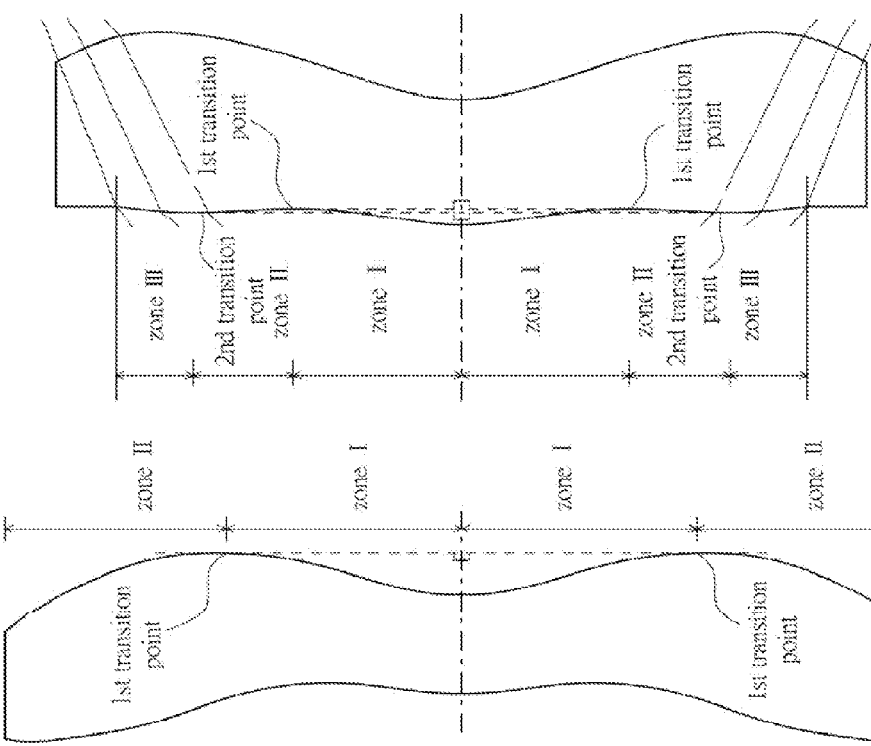
FIG. 4
FIG. 3

| EFL(Effective focus length)= 3.016mm, HFOV(Half angular field of view)= 37.286deg., System length=4.132mm, Image height= 2.3mm, Fno=2.0 |||||||
|---|---|---|---|---|---|---|---|
| Surface # | | Radius | Thickness | Refractive index | Abbe number | Focus | Material |
| - | Object | ∞ | ∞ | | | | |
| 100 | Aperture stop | ∞ | -0.100 | | | | |
| 111 | 1st lens element | 1.778 | 0.637 | 1.535 | 55.712 | 2.401 | plastic |
| 112 | | -4.097 | 0.068 | | | | |
| 121 | 2nd lens element | 7.495 | 0.200 | 1.643 | 22.437 | -3.429 | plastic |
| 122 | | 1.696 | 0.224 | | | | |
| 131 | 3rd lens element | 8.453 | 0.315 | 1.535 | 55.712 | 7.088 | plastic |
| 132 | | -6.829 | 0.185 | | | | |
| 141 | 4th lens element | -1.016 | 0.462 | 1.535 | 55.712 | 4.245 | plastic |
| 142 | | -0.814 | 0.069 | | | | |
| 151 | 5th lens element | 1.655 | 0.461 | 1.535 | 55.712 | -5.314 | plastic |
| 152 | | 0.946 | 0.206 | | | | |
| 161 | 6th lens element | 2.839 | 0.329 | 1.531 | 55.744 | -22.608 | plastic |
| 162 | | 2.205 | 0.400 | | | | |
| 171 | IR cut filter | ∞ | 0.210 | 1.517 | 64.167 | | plastic |
| 172 | | ∞ | 0.366 | | | | |
| 180 | Image plane | ∞ | 0.000 | | | | |

FIG. 8

| | Aspherical parameters | | | | | |
|---|---|---|---|---|---|---|
| Surface # | 111 | 112 | 121 | 122 | 131 | 132 |
| K | -1.7391E+01 | -1.5803E+02 | 0.0000E+00 | -2.1411E+01 | 0.0000E+00 | 0.0000E+00 |
| $a_4$ | 3.2460E-01 | -5.0687E-03 | 5.1441E-02 | 2.7054E-01 | -1.8783E-01 | -5.9520E-02 |
| $a_6$ | -4.3419E-01 | -1.4204E-01 | -4.1133E-01 | -6.0680E-01 | -3.2825E-02 | -3.7801E-02 |
| $a_8$ | 3.2538E-01 | -2.4450E-01 | -2.0618E-01 | 2.8898E-01 | 1.0750E-01 | 8.3950E-02 |
| $a_{10}$ | -1.6884E-01 | 7.6504E-02 | 2.0760E-01 | 1.1895E-01 | 3.1968E-02 | 2.0227E-02 |
| $a_{12}$ | 2.0131E-01 | 2.8924E-01 | 3.9413E-01 | -8.4866E-02 | 0.0000E+00 | 0.0000E+00 |
| $a_{14}$ | -3.4095E-01 | 9.9061E-02 | -6.5917E-02 | -1.9603E-01 | 0.0000E+00 | 0.0000E+00 |
| $a_{16}$ | 4.2021E-02 | -3.2803E-01 | -1.5414E-01 | 1.8859E-01 | 0.0000E+00 | 0.0000E+00 |
| Surface # | 141 | 142 | 151 | 152 | 161 | 162 |
| K | -5.2634E+00 | -1.6406E+00 | -1.2539E+01 | -7.2028E+00 | 0.0000E+00 | 0.0000E+00 |
| $a_4$ | -1.1107E-02 | 1.4831E-01 | -1.3844E-01 | -1.6002E-01 | -1.9568E-01 | -1.6517E-01 |
| $a_6$ | 3.4967E-01 | -1.0386E-01 | 3.3336E-02 | 4.2041E-02 | 2.0601E-02 | 4.6547E-02 |
| $a_8$ | -2.9350E-01 | 7.2326E-02 | -9.2030E-03 | -1.8319E-02 | 7.2636E-03 | -8.9813E-03 |
| $a_{10}$ | 2.1187E-01 | 1.4178E-01 | -2.0523E-03 | 2.5718E-03 | -1.1654E-03 | 4.8764E-04 |
| $a_{12}$ | -2.0208E-01 | -1.2887E-01 | -2.3634E-03 | 3.0723E-04 | 0.0000E+00 | 0.0000E+00 |
| $a_{14}$ | 9.3880E-02 | 1.2079E-02 | -3.4405E-04 | -1.5305E-04 | 0.0000E+00 | 0.0000E+00 |
| $a_{16}$ | -1.5435E-02 | 8.6700E-03 | 8.6246E-04 | 5.1847E-05 | 0.0000E+00 | 0.0000E+00 |

FIG. 9

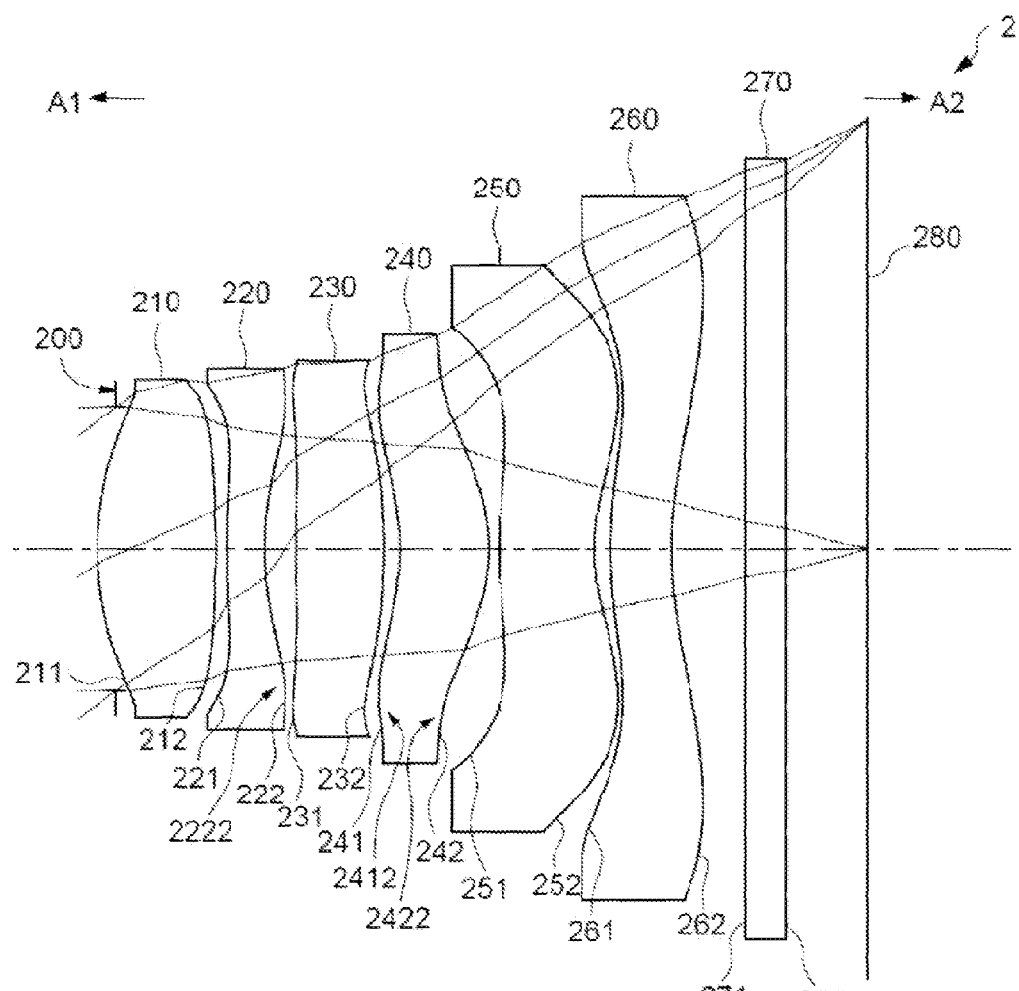
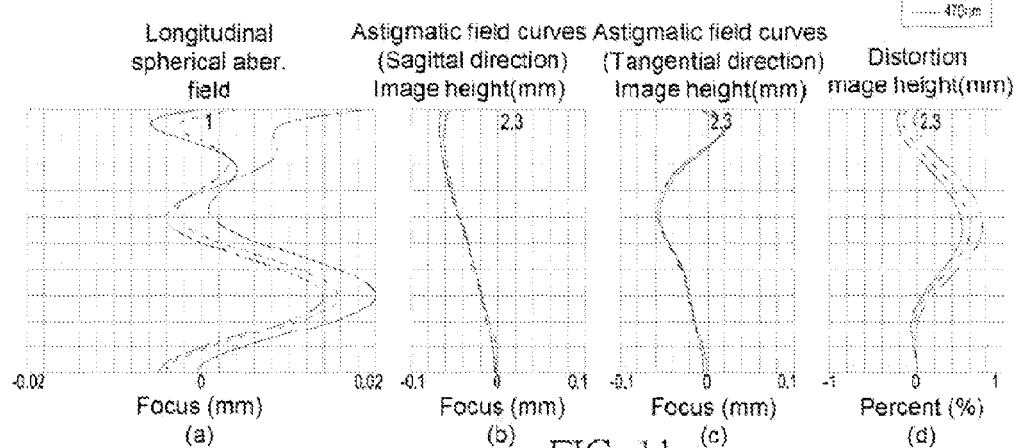
FIG. 10
FIG. 11

| \multicolumn{7}{c}{EFL(Effective focus length)= 3.037mm, HFOV(Half angular field of view)= 37.125deg., System length=4.132mm, Image heigh= 2.3mm, Fno=2.0} |

| Surface # | | Radius | Thickness | Refractive index | Abbe number | Focus | Material |
|---|---|---|---|---|---|---|---|
| - | Object | ∞ | ∞ | | | | |
| 200 | Aperture stop | ∞ | -0.100 | | | | |
| 211 | 1st lens element | 1.681 | 0.638 | 1.535 | 55.712 | 2.447 | plastic |
| 212 | | -5.207 | 0.057 | | | | |
| 221 | 2nd lens element | 5.693 | 0.205 | 1.643 | 22.437 | -3.537 | plastic |
| 222 | | 1.611 | 0.168 | | | | |
| 231 | 3rd lens element | 11.414 | 0.469 | 1.535 | 55.712 | 5.346 | plastic |
| 232 | | -3.779 | 0.089 | | | | |
| 241 | 4th lens element | -1.200 | 0.477 | 1.535 | 55.712 | 4.694 | plastic |
| 242 | | -0.926 | 0.051 | | | | |
| 251 | 5th lens element | 2.175 | 0.512 | 1.535 | 55.712 | -3.794 | plastic |
| 252 | | 0.965 | 0.088 | | | | |
| 261 | 6th lens element | 2.302 | 0.328 | 1.531 | 55.744 | -267.215 | plastic |
| 262 | | 2.153 | 0.400 | | | | |
| 271 | IR cut filter | ∞ | 0.210 | 1.517 | 64.167 | | plastic |
| 272 | | ∞ | 0.441 | | | | |
| 280 | Image plane | ∞ | 0.000 | | | | |

FIG. 12

| Aspherical parameters | | | | | | |
|---|---|---|---|---|---|---|
| Surface # | 211 | 212 | 221 | 222 | 231 | 232 |
| K | -1.5505E+01 | -2.6436E+02 | 0.0000E+00 | -1.7851E+01 | 0.0000E+00 | 0.0000E+00 |
| $a_4$ | 3.4620E-01 | -1.4076E-03 | -2.2954E-02 | 2.5259E-01 | -1.4332E-01 | -8.1449E-02 |
| $a_6$ | -4.3114E-01 | -1.4892E-01 | -4.2860E-01 | -6.4207E-01 | -2.1381E-02 | 8.0086E-04 |
| $a_8$ | 3.2692E-01 | -2.6061E-01 | -1.7950E-01 | 2.8746E-01 | 1.1196E-01 | 1.0475E-01 |
| $a_{10}$ | -1.6138E-01 | 9.1852E-02 | 2.3806E-01 | 1.3026E-01 | 1.8970E-02 | 3.2768E-02 |
| $a_{12}$ | 1.9936E-01 | 3.2901E-01 | 4.0478E-01 | -8.2094E-02 | 0.0000E+00 | 0.0000E+00 |
| $a_{14}$ | -3.5535E-01 | 1.1208E-01 | -8.5520E-02 | -2.0037E-01 | 0.0000E+00 | 0.0000E+00 |
| $a_{16}$ | 8.2548E-02 | -4.0523E-01 | -2.1425E-01 | 1.9344E-01 | 0.0000E+00 | 0.0000E+00 |
| Surface # | 241 | 242 | 251 | 252 | 261 | 262 |
| K | -8.7283E+00 | -1.8511E+00 | -2.8406E+01 | -7.3593E+00 | 0.0000E+00 | 0.0000E+00 |
| $a_4$ | 1.3269E-02 | 1.9728E-01 | -2.1987E-01 | -1.9625E-01 | -2.1098E-01 | -1.3502E-01 |
| $a_6$ | 3.4034E-01 | -9.3793E-02 | 5.1837E-02 | 3.9257E-02 | 2.4728E-02 | 3.5340E-02 |
| $a_8$ | -2.9497E-01 | 5.6645E-02 | -1.7788E-02 | -1.3442E-02 | 7.5264E-03 | -7.5639E-03 |
| $a_{10}$ | 2.1211E-01 | 1.2986E-01 | -1.0311E-02 | 2.3003E-03 | -1.3288E-03 | 4.9863E-04 |
| $a_{12}$ | -2.0645E-01 | -1.3411E-01 | -4.9013E-03 | 7.2406E-05 | 0.0000E+00 | 0.0000E+00 |
| $a_{14}$ | 8.9008E-02 | 1.1247E-02 | 1.8012E-04 | -1.0985E-04 | 0.0000E+00 | 0.0000E+00 |
| $a_{16}$ | -1.3523E-02 | 1.0187E-02 | 2.3670E-03 | 1.0727E-04 | 0.0000E+00 | 0.0000E+00 |

FIG. 13

| EFL(Effective focus length)= 3.323mm, HFOV(Half angular field of view)= 34.705deg., System length= 4.804mm, Image heigh= 2.3mm, Fno=1.8 ||||||||
|---|---|---|---|---|---|---|---|
| Surface # | | Radius | Thickness | Refractive index | Abbe number | Focus | Material |
| - | Object | ∞ | ∞ | | | | |
| 300 | Aperture stop | ∞ | -0.100 | | | | |
| 311 | 1st lens element | 2.374 | 0.844 | 1.535 | 55.712 | 2.783 | plastic |
| 312 | | -3.530 | 0.070 | | | | |
| 321 | 2nd lens element | 3.500 | 0.230 | 1.643 | 22.437 | -3.777 | plastic |
| 322 | | 1.403 | 0.282 | | | | |
| 331 | 3rd lens element | 32.108 | 0.415 | 1.535 | 55.712 | 8.912 | plastic |
| 332 | | -5.596 | 0.320 | | | | |
| 341 | 4th lens element | -1.418 | 0.544 | 1.535 | 55.712 | 3.596 | plastic |
| 342 | | -0.927 | 0.069 | | | | |
| 351 | 5th lens element | 6.545 | 0.461 | 1.535 | 55.712 | 26.586 | plastic |
| 352 | | 11.792 | 0.068 | | | | |
| 361 | 6th lens element | 2.176 | 0.359 | 1.531 | 55.744 | -3.207 | plastic |
| 362 | | 0.902 | 0.500 | | | | |
| 371 | IR cut filter | ∞ | 0.210 | 1.517 | 64.167 | | plastic |
| 372 | | ∞ | 0.435 | | | | |
| 380 | Image plane | ∞ | 0.000 | | | | |

FIG. 16

| Aspherical parameters | | | | | | |
|---|---|---|---|---|---|---|
| Surface # | 311 | 312 | 321 | 322 | 331 | 332 |
| K | 0.0000E+00 | 0.0000E+00 | 0.0000E+00 | -8.1004E+00 | 0.0000E+00 | 0.0000E+00 |
| $a_4$ | -7.7503E-03 | 8.0359E-02 | -2.0172E-01 | -3.3382E-02 | -1.4045E-01 | -6.3790E-02 |
| $a_6$ | -1.0472E-02 | -1.5544E-01 | 1.6277E-01 | 2.5459E-02 | 8.1253E-02 | 5.7906E-02 |
| $a_8$ | 8.6787E-03 | 5.7540E-02 | -2.5650E-01 | -8.5209E-02 | 0.0000E+00 | 0.0000E+00 |
| $a_{10}$ | -2.3725E-02 | -1.4586E-02 | 1.0973E-01 | 3.4918E-02 | 0.0000E+00 | 0.0000E+00 |
| $a_{12}$ | 0.0000E+00 | 0.0000E+00 | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 341 | 342 | 351 | 352 | 361 | 362 |
| K | 0.0000E+00 | -7.9873E-01 | 1.2549E+01 | -2.0195E+03 | 0.0000E+00 | -3.4874E+00 |
| $a_4$ | 1.5527E-01 | 2.9126E-01 | 8.8809E-02 | 9.7974E-02 | -2.1656E-01 | -1.6129E-01 |
| $a_6$ | 2.6066E-02 | -2.8883E-01 | -9.3959E-02 | -6.5764E-02 | 6.4828E-02 | 1.0104E-01 |
| $a_8$ | -9.0308E-03 | 2.8720E-01 | 8.8882E-03 | 8.7463E-03 | -8.4513E-03 | -5.2492E-02 |
| $a_{10}$ | 2.4332E-03 | -1.8580E-01 | 2.6723E-02 | 0.0000E+00 | 0.0000E+00 | 1.9591E-02 |
| $a_{12}$ | 0.0000E+00 | 7.1964E-02 | -2.4548E-02 | 0.0000E+00 | 0.0000E+00 | -4.4893E-03 |
| $a_{14}$ | 0.0000E+00 | -1.1242E-02 | 8.6720E-03 | 0.0000E+00 | 0.0000E+00 | 5.4863E-04 |
| $a_{16}$ | 0.0000E+00 | 0.0000E+00 | -1.0785E-03 | 0.0000E+00 | 0.0000E+00 | -2.7640E-05 |

FIG. 17

| \multicolumn{8}{c}{EFL(Effective focus length)= 3.342mm, HFOV(Half angular field of view)= 34.537deg., System length=4.869mm, Image heigh= 2.3mm, Fno=1.8} |
|---|---|---|---|---|---|---|---|
| Surface # | | Radius | Thickness | Refractive index | Abbe number | Focus | Material |
| - | Object | ∞ | ∞ | | | | |
| 400 | Aperture stop | ∞ | -0.100 | | | | |
| 411 | 1st lens element | 2.383 | 0.862 | 1.535 | 55.712 | 2.773 | plastic |
| 412 | | -3.466 | 0.066 | | | | |
| 421 | 2nd lens element | 3.887 | 0.232 | 1.643 | 22.437 | -3.795 | plastic |
| 422 | | 1.471 | 0.258 | | | | |
| 431 | 3rd lens element | 21.775 | 0.489 | 1.535 | 55.712 | 7.560 | plastic |
| 432 | | -4.948 | 0.205 | | | | |
| 441 | 4th lens element | -1.477 | 0.631 | 1.535 | 55.712 | 3.644 | plastic |
| 442 | | -0.967 | 0.057 | | | | |
| 451 | 5th lens element | 7.815 | 0.435 | 1.535 | 55.712 | 35.571 | plastic |
| 452 | | 12.972 | 0.053 | | | | |
| 461 | 6th lens element | 2.128 | 0.373 | 1.531 | 55.744 | -3.188 | plastic |
| 462 | | 0.887 | 0.500 | | | | |
| 471 | IR cut filter | ∞ | 0.210 | 1.517 | 64.167 | | plastic |
| 472 | | ∞ | 0.499 | | | | |
| 480 | Image plane | ∞ | 0.000 | | | | |

FIG. 20

| Aspherical parameters | | | | | | |
|---|---|---|---|---|---|---|
| Surface # | 411 | 412 | 421 | 422 | 431 | 432 |
| K | 0.0000E+00 | 0.0000E+00 | 0.0000E+00 | -9.1195E+00 | 0.0000E+00 | 0.0000E+00 |
| $a_4$ | -8.2118E-03 | 7.5897E-02 | -1.9970E-01 | -3.4398E-02 | -1.4583E-01 | -6.4781E-02 |
| $a_6$ | -9.0759E-03 | -1.5380E-01 | 1.6128E-01 | 2.6155E-02 | 7.9589E-02 | 5.5227E-02 |
| $a_8$ | 8.1481E-03 | 5.8264E-02 | -2.5767E-01 | -8.4948E-02 | 0.0000E+00 | 0.0000E+00 |
| $a_{10}$ | -2.3586E-02 | -1.5238E-02 | 1.0868E-01 | 3.4365E-02 | 0.0000E+00 | 0.0000E+00 |
| $a_{12}$ | 0.0000E+00 | 0.0000E+00 | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 441 | 442 | 451 | 452 | 461 | 462 |
| K | 0.0000E+00 | -8.0587E-01 | 1.3276E+01 | -2.3684E+03 | 0.0000E+00 | -3.4768E+00 |
| $a_4$ | 1.6064E-01 | 2.9554E-01 | 8.7702E-02 | 9.6984E-02 | -2.2097E-01 | -1.6257E-01 |
| $a_6$ | 2.8465E-02 | -2.9018E-01 | -9.3086E-02 | -6.6182E-02 | 6.3642E-02 | 1.9072E-01 |
| $a_8$ | -9.9914E-03 | 2.8766E-01 | 8.6100E-03 | 8.8004E-03 | -8.4843E-03 | -5.2504E-02 |
| $a_{10}$ | 1.4359E-03 | -1.8529E-01 | 2.6731E-02 | 0.0000E+00 | 0.0000E+00 | 1.9596E-02 |
| $a_{12}$ | 0.0000E+00 | 7.2073E-02 | -2.4496E-02 | 0.0000E+00 | 0.0000E+00 | -4.4889E-03 |
| $a_{14}$ | 0.0000E+00 | -1.1332E-02 | 8.6958E-03 | 0.0000E+00 | 0.0000E+00 | 5.4877E-04 |
| $a_{16}$ | 0.0000E+00 | 0.0000E+00 | -1.0722E-03 | 0.0000E+00 | 0.0000E+00 | -2.7525E-05 |

FIG. 21

| \multicolumn{7}{c}{EFL(Effective focus length)= 3.344mm, HFOV(Half angular field of view)= 34.520deg., System length=4.955mm, Image heigh= 2.3mm, Fno=1.8} | | | | | | |
|---|---|---|---|---|---|---|
| Surface # | | Radius | Thickness | Refractive index | Abbe number | Focus | Material |
| - | Object | ∞ | ∞ | | | | |
| 500 | Aperture stop | ∞ | -0.100 | | | | |
| 511 | 1st lens element | 2.425 | 0.846 | 1.535 | 55.712 | 2.875 | plastic |
| 512 | | -3.726 | 0.072 | | | | |
| 521 | 2nd lens element | 4.106 | 0.225 | 1.643 | 22.437 | -3.810 | plastic |
| 522 | | 1.508 | 0.211 | | | | |
| 531 | 3rd lens element | 12.791 | 0.619 | 1.535 | 55.712 | 6.098 | plastic |
| 532 | | -4.325 | 0.121 | | | | |
| 541 | 4th lens element | -1.492 | 0.677 | 1.535 | 55.712 | 3.821 | plastic |
| 542 | | -1.001 | 0.030 | | | | |
| 551 | 5th lens element | 7.351 | 0.440 | 1.535 | 55.712 | 31.584 | plastic |
| 552 | | 12.705 | 0.028 | | | | |
| 561 | 6th lens element | 2.061 | 0.399 | 1.531 | 55.744 | -3.136 | plastic |
| 562 | | 0.861 | 0.500 | | | | |
| 571 | IR cut filter | ∞ | 0.210 | 1.517 | 64.167 | | plastic |
| 572 | | ∞ | 0.576 | | | | |
| 580 | Image plane | ∞ | 0.000 | | | | |

FIG. 24

| Aspherical parameters | | | | | | |
|---|---|---|---|---|---|---|
| Surface # | 511 | 512 | 521 | 522 | 531 | 532 |
| K | 0.0000E+00 | 0.0000E+00 | 0.0000E+00 | -9.8631E+00 | 0.0000E+00 | 0.0000E+00 |
| $a_4$ | -1.0333E-02 | 6.2392E-02 | -1.9858E-01 | -3.2928E-02 | -1.4973E-01 | -6.4061E-02 |
| $a_6$ | -9.5936E-03 | -1.5107E-01 | 1.5799E-01 | 2.6165E-02 | 7.7214E-02 | 5.2017E-02 |
| $a_8$ | 7.7193E-03 | 5.8824E-02 | -2.5700E-01 | -8.5603E-02 | 0.0000E+00 | 0.0000E+00 |
| $a_{10}$ | -2.4344E-02 | -1.5283E-02 | 1.0853E-01 | 3.4005E-02 | 0.0000E+00 | 0.0000E+00 |
| $a_{12}$ | 0.0000E+00 | 0.0000E+00 | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 541 | 542 | 551 | 552 | 561 | 562 |
| K | 0.0000E+00 | -8.0976E-01 | 1.2578E+01 | -1.8884E+03 | 0.0000E+00 | -3.4362E+00 |
| $a_4$ | 1.6188E-01 | 3.0011E-01 | 8.9593E-02 | 1.0112E-01 | -2.2524E-01 | -1.5608E-01 |
| $a_6$ | 3.1243E-02 | -2.9294E-01 | -9.2544E-02 | -6.7076E-02 | 6.3762E-02 | 1.0064E-01 |
| $a_8$ | -9.8417E-03 | 2.8680E-01 | 8.5362E-03 | 8.7368E-03 | -8.1578E-03 | -5.2451E-02 |
| $a_{10}$ | 3.7765E-04 | -1.8530E-01 | 2.6790E-02 | 0.0000E+00 | 0.0000E+00 | 1.9617E-02 |
| $a_{12}$ | 0.0000E+00 | 7.2119E-02 | -2.4461E-02 | 0.0000E+00 | 0.0000E+00 | -4.4853E-03 |
| $a_{14}$ | 0.0000E+00 | -1.1344E-02 | 8.6991E-03 | 0.0000E+00 | 0.0000E+00 | 5.4897E-04 |
| $a_{16}$ | 0.0000E+00 | 0.0000E+00 | -1.0779E-03 | 0.0000E+00 | 0.0000E+00 | -2.7572E-05 |

FIG. 25

| \multicolumn{8}{c}{EFL.(Effective focus length)= 3.824mm, HFOV(Half angular field of view)= 38.122deg., System length 5.384mm, Image heigh= 3.0mm, Fno=1.8} |
|---|---|---|---|---|---|---|---|
| Surface # | | Radius | Thickness | Refractive index | Abbe number | Focus | Material |
| - | Object | ∞ | ∞ | | | | |
| 600 | Aperture stop | ∞ | -0.180 | | | | |
| 611 | 1st lens element | 2.207 | 0.899 | 1.535 | 55.712 | 3.639 | plastic |
| 612 | | -14.576 | 0.074 | | | | |
| 621 | 2nd lens element | 4.500 | 0.217 | 1.643 | 22.437 | -5.030 | plastic |
| 622 | | 1.854 | 0.188 | | | | |
| 631 | 3rd lens element | 15.170 | 0.452 | 1.535 | 55.712 | 4.853 | plastic |
| 632 | | -3.113 | 0.268 | | | | |
| 641 | 4th lens element | -1.502 | 0.761 | 1.535 | 55.712 | 7.554 | plastic |
| 642 | | -1.290 | 0.029 | | | | |
| 651 | 5th lens element | 3.608 | 0.472 | 1.535 | 55.712 | -30.061 | plastic |
| 652 | | 2.814 | 0.030 | | | | |
| 661 | 6th lens element | 3.178 | 0.622 | 1.531 | 55.744 | -6.061 | plastic |
| 662 | | 1.493 | 0.500 | | | | |
| 671 | IR cut filter | ∞ | 0.300 | 1.517 | 64.167 | | plastic |
| 672 | | ∞ | 0.572 | | | | |
| 680 | Image plane | ∞ | 0.000 | | | | |

FIG. 28

| Aspherical parameters | | | | | | |
|---|---|---|---|---|---|---|
| Surface # | 611 | 612 | 621 | 622 | 631 | 632 |
| K | 0.0000E+00 | 0.0000E+00 | 0.0000E+00 | -6.4044E+00 | 0.0000E+00 | 0.0000E+00 |
| $a_4$ | 2.1659E-02 | 2.8416E-02 | -1.6903E-01 | -1.0546E-01 | -9.8341E-02 | 1.7144E-02 |
| $a_6$ | -3.4043E-02 | -4.4848E-02 | 1.3960E-01 | 1.0906E-01 | 5.0436E-02 | 3.1696E-02 |
| $a_8$ | 2.8516E-02 | -1.6234E-04 | -1.4913E-01 | -9.7535E-02 | 0.0000E+00 | 0.0000E+00 |
| $a_{10}$ | -1.1739E-02 | -2.6681E-03 | 4.5126E-02 | 2.8084E-02 | 0.0000E+00 | 0.0000E+00 |
| $a_{12}$ | 0.0000E+00 | 0.0000E+00 | 0.0000E+00 | 0.0000E+00 | 0.0000E+00 | 0.0000E+00 |
| $a_{14}$ | 0.0000E+00 | 0.0000E+00 | 0.0000E+00 | 0.0000E+00 | 0.0000E+00 | 0.0000E+00 |
| $a_{16}$ | 0.0000E+00 | 0.0000E+00 | 0.0000E+00 | 0.0000E+00 | 0.0000E+00 | 0.0000E+00 |
| Surface # | 641 | 642 | 651 | 652 | 661 | 662 |
| K | 0.0000E+00 | -7.0769E-01 | 1.5356E-01 | -2.6088E+01 | 0.0000E+00 | -4.1959E+00 |
| $a_4$ | 2.5402E-01 | 1.6121E-01 | -1.2307E-01 | -6.1437E-02 | -1.0797E-01 | -5.8098E-02 |
| $a_6$ | -6.9644E-02 | -1.1919E-01 | 1.5773E-02 | 2.9686E-03 | 1.9669E-02 | 2.2793E-02 |
| $a_8$ | 2.0893E-02 | 8.5613E-02 | -4.0118E-03 | 2.1536E-04 | -1.1997E-03 | -7.4098E-03 |
| $a_{10}$ | -3.1458E-03 | -3.7251E-02 | 1.3517E-03 | 0.0000E+00 | 0.0000E+00 | 1.6450E-03 |
| $a_{12}$ | 0.0000E+00 | 7.7715E-03 | -1.8686E-03 | 0.0000E+00 | 0.0000E+00 | -2.3699E-04 |
| $a_{14}$ | 0.0000E+00 | -3.5865E-04 | 5.2385E-04 | 0.0000E+00 | 0.0000E+00 | 1.9866E-05 |
| $a_{16}$ | 0.0000E+00 | 0.0000E+00 | -9.0792E-06 | 0.0000E+00 | 0.0000E+00 | -7.1436E-07 |

FIG. 29

| EFL(Effective focus length)= 2.820mm, HFOV(Half angular field of view)= 39.478deg., System length=3.782mm, Image heigh= 2.3mm, Fno=2.0 ||||||||
|---|---|---|---|---|---|---|---|
| Surface # | | Radius | Thickness | Refractive index | Abbe number | Focus | Material |
| - | Object | ∞ | ∞ | | | | |
| 700 | Aperture stop | ∞ | -0.100 | | | | |
| 711 | 1st lens element | 1.694 | 0.474 | 1.535 | 55.712 | 2.451 | plastic |
| 712 | | -5.309 | 0.075 | | | | |
| 721 | 2nd lens element | 12.405 | 0.227 | 1.643 | 22.437 | -3.746 | plastic |
| 722 | | 2.016 | 0.210 | | | | |
| 731 | 3rd lens element | -10.919 | 0.374 | 1.535 | 55.712 | 5.246 | plastic |
| 732 | | -2.265 | 0.085 | | | | |
| 741 | 4th lens element | -2.313 | 0.413 | 1.535 | 55.712 | 9.652 | plastic |
| 742 | | -1.699 | 0.092 | | | | |
| 751 | 5th lens element | 2.344 | 0.384 | 1.535 | 55.712 | -9.401 | plastic |
| 752 | | 1.509 | 0.134 | | | | |
| 761 | 6th lens element | 2.139 | 0.251 | 1.531 | 55.744 | -758.226 | plastic |
| 762 | | 2.041 | 0.300 | | | | |
| 771 | IR cut filter | ∞ | 0.210 | 1.517 | 64.167 | | plastic |
| 772 | | ∞ | 0.554 | | | | |
| 780 | Image plane | ∞ | 0.000 | | | | |

FIG. 32

| | Aspherical parameters | | | | | |
|---|---|---|---|---|---|---|
| Surface # | 711 | 712 | 721 | 722 | 731 | 732 |
| K | -1.3871E+01 | -1.4310E+02 | 0.0000E+00 | -3.0746E+01 | 0.0000E+00 | 0.0000E+00 |
| $a_4$ | 3.1118E-01 | 5.5507E-02 | 2.1798E-02 | 2.2003E-01 | -1.0879E-01 | -9.0566E-02 |
| $a_6$ | -4.0253E-01 | -1.5253E-01 | -3.0351E-01 | -6.2562E-01 | -2.9642E-02 | 6.1544E-02 |
| $a_8$ | 3.5798E-01 | -1.9279E-01 | -8.6834E-02 | 3.0691E-01 | 1.3337E-01 | 1.5105E-01 |
| $a_{10}$ | -2.0928E-01 | 2.1912E-01 | 2.7968E-01 | 1.1342E-01 | 5.1687E-02 | 4.0761E-02 |
| $a_{12}$ | 8.7247E-02 | 4.1232E-01 | 4.0190E-01 | -1.1748E-01 | 0.0000E+00 | 0.0000E+00 |
| $a_{14}$ | -3.9397E-01 | 4.6021E-02 | -1.4574E-01 | -2.0541E-01 | 0.0000E+00 | 0.0000E+00 |
| $a_{16}$ | 4.0167E-01 | -6.9884E-01 | -3.8180E-01 | 2.6871E-01 | 0.0000E+00 | 0.0000E+00 |
| Surface # | 741 | 742 | 751 | 752 | 761 | 762 |
| K | -3.6793E+01 | -1.6432E+00 | -6.7163E+00 | -5.4174E+00 | 0.0000E+00 | 0.0000E+00 |
| $a_4$ | -5.8540E-02 | 1.5439E-01 | -2.2615E-01 | -1.5487E-01 | -2.1223E-01 | -1.8625E-01 |
| $a_6$ | 2.9137E-01 | -1.1555E-01 | 4.7016E-02 | 2.9415E-02 | 2.5388E-02 | 4.7726E-02 |
| $a_8$ | -3.0447E-01 | 5.6267E-02 | -1.4557E-02 | -1.2761E-02 | 7.3899E-03 | -7.0506E-03 |
| $a_{10}$ | 2.3195E-01 | 1.3077E-01 | 9.2470E-04 | 2.2949E-03 | -1.4459E-03 | 6.6228E-05 |
| $a_{12}$ | -1.8665E-01 | -1.3351E-01 | 2.3119E-03 | -7.7857E-05 | 0.0000E+00 | 0.0000E+00 |
| $a_{14}$ | 8.6490E-02 | 1.2329E-02 | 8.5650E-04 | -1.1768E-04 | 0.0000E+00 | 0.0000E+00 |
| $a_{16}$ | -4.5820E-02 | 1.1775E-02 | 1.0929E-04 | 1.4871E-04 | 0.0000E+00 | 0.0000E+00 |

FIG. 33

| | EFL(Effective focus length)= 2.822mm, HFOV(Half angular field of view)= 38.967deg., System length=3.840mm, Image heigh= 2.3mm, Fno=2.0 |

| Surface # | | Radius | Thickness | Refractive index | Abbe number | Focus | Material |
|---|---|---|---|---|---|---|---|
| - | Object | ∞ | ∞ | | | | |
| 800 | Aperture stop | ∞ | -0.100 | | | | |
| 811 | 1st lens element | 1.702 | 0.445 | 1.535 | 55.712 | 2.510 | plastic |
| 812 | | -5.883 | 0.065 | | | | |
| 821 | 2nd lens element | 11.020 | 0.305 | 1.643 | 22.437 | -3.872 | plastic |
| 822 | | 2.021 | 0.226 | | | | |
| 831 | 3rd lens element | -25.945 | 0.367 | 1.535 | 55.712 | 5.198 | plastic |
| 832 | | -2.532 | 0.103 | | | | |
| 841 | 4th lens element | -2.431 | 0.372 | 1.535 | 55.712 | 10.705 | plastic |
| 842 | | -1.800 | 0.071 | | | | |
| 851 | 5th lens element | 2.557 | 0.329 | 1.535 | 55.712 | -9.244 | plastic |
| 852 | | 1.612 | 0.129 | | | | |
| 861 | 6th lens element | 2.185 | 0.403 | 1.531 | 55.744 | 169.603 | plastic |
| 862 | | 2.095 | 0.400 | | | | |
| 871 | IR cut filter | ∞ | 0.210 | 1.517 | 64.167 | | plastic |
| 872 | | ∞ | 0.412 | | | | |
| 880 | Image plane | ∞ | 0.000 | | | | |

FIG. 36

| Aspherical parameters | | | | | | |
|---|---|---|---|---|---|---|
| Surface # | 811 | 812 | 821 | 822 | 831 | 832 |
| K | -1.4374E+01 | -1.6113E+02 | 0.0000E+00 | -3.0262E+01 | 0.0000E+00 | 0.0000E+00 |
| $a_4$ | 3.1178E-01 | 5.1193E-02 | 2.3994E-02 | 2.2247E-01 | -1.1107E-01 | -8.9072E-02 |
| $a_6$ | -4.0020E-01 | -1.5801E-01 | -3.0376E-01 | -6.2256E-01 | -3.2601E-02 | 6.3817E-02 |
| $a_8$ | 3.5975E-01 | -1.9730E-01 | -8.7914E-02 | 3.0942E-01 | 1.3104E-01 | 1.5344E-01 |
| $a_{10}$ | -2.1291E-01 | 2.1623E-01 | 2.7790E-01 | 1.1520E-01 | 4.8522E-02 | 4.3096E-02 |
| $a_{12}$ | 7.6652E-02 | 4.0825E-01 | 4.0217E-01 | -1.1652E-01 | 0.0000E+00 | 0.0000E+00 |
| $a_{14}$ | -4.1480E-01 | 3.5167E-02 | -1.4277E-01 | -2.0532E-01 | 0.0000E+00 | 0.0000E+00 |
| $a_{16}$ | 3.6361E-01 | -7.2719E-01 | -3.6841E-01 | 2.6788E-01 | 0.0000E+00 | 0.0000E+00 |
| Surface # | 841 | 842 | 851 | 852 | 861 | 862 |
| K | -3.4788E+01 | -1.5526E+00 | -6.2854E+00 | -5.4627E+00 | 0.0000E+00 | 0.0000E+00 |
| $a_4$ | -5.1648E-02 | 1.5309E-01 | -2.2522E-01 | -1.5383E-01 | -2.1240E-01 | -1.8783E-01 |
| $a_6$ | 2.9039E-01 | -1.1544E-01 | 4.7546E-02 | 2.9412E-02 | 2.5438E-02 | 4.8009E-02 |
| $a_8$ | -3.0212E-01 | 5.6173E-02 | -1.4354E-02 | -1.2871E-02 | 7.4100E-03 | -6.9771E-03 |
| $a_{10}$ | 2.3557E-01 | 1.3052E-01 | 8.9894E-04 | 2.2548E-03 | -1.4395E-03 | 7.5239E-05 |
| $a_{12}$ | -1.8365E-01 | -1.3374E-01 | 2.2825E-03 | -9.0209E-05 | 0.0000E+00 | 0.0000E+00 |
| $a_{14}$ | 8.9366E-02 | 1.2202E-02 | 8.3160E-04 | -1.2181E-04 | 0.0000E+00 | 0.0000E+00 |
| $a_{16}$ | -4.3181E-02 | 1.1710E-02 | 8.5155E-05 | 1.4715E-04 | 0.0000E+00 | 0.0000E+00 |

FIG. 37

| EFL(Effective focus length)= 2.865mm, HFOV(Half angular field of view)= 39.045deg., System length=3.862mm, Image heigh= 2.3mm, Fno=2.0 | | | | | | |
|---|---|---|---|---|---|---|
| Surface # | | Radius | Thickness | Refractive index | Abbe number | Focus | Material |
| - | Object | ∞ | ∞ | | | | |
| 900 | Aperture stop | ∞ | -0.100 | | | | |
| 911 | 1st lens element | 1.665 | 0.489 | 1.535 | 55.712 | 2.438 | plastic |
| 912 | | -5.489 | 0.078 | | | | |
| 921 | 2nd lens element | 8.867 | 0.224 | 1.643 | 22.437 | -3.797 | plastic |
| 922 | | 1.907 | 0.195 | | | | |
| 931 | 3rd lens element | -13.834 | 0.352 | 1.535 | 55.712 | 5.269 | plastic |
| 932 | | -2.369 | 0.070 | | | | |
| 941 | 4th lens element | -2.313 | 0.552 | 1.535 | 55.712 | 9.243 | plastic |
| 942 | | -1.709 | 0.064 | | | | |
| 951 | 5th lens element | 2.332 | 0.424 | 1.535 | 55.712 | -7.907 | plastic |
| 952 | | 1.409 | 0.153 | | | | |
| 961 | 6th lens element | 2.169 | 0.264 | 1.531 | 55.744 | -684.563 | plastic |
| 962 | | 2.065 | 0.300 | | | | |
| 971 | IR cut filter | ∞ | 0.210 | 1.517 | 64.167 | | plastic |
| 972 | | ∞ | 0.487 | | | | |
| 980 | Image plane | ∞ | 0.000 | | | | |

FIG. 40

| | Aspherical parameters | | | | | |
|---|---|---|---|---|---|---|
| Surface # | 911 | 912 | 921 | 922 | 931 | 932 |
| K | -1.3359E+01 | -1.3457E+02 | 0.0000E+00 | -2.4495E+01 | 0.0000E+00 | 0.0000E+00 |
| $a_4$ | 3.1700E-01 | 5.6710E-02 | 2.0735E-02 | 2.3591E-01 | -1.1569E-01 | -9.4363E-02 |
| $a_6$ | -4.0800E-01 | -1.6223E-01 | -3.4513E-01 | -6.2714E-01 | -2.6059E-02 | 5.3841E-02 |
| $a_8$ | 3.5468E-01 | -2.2491E-01 | -1.0888E-01 | 2.9297E-01 | 1.4086E-01 | 1.4038E-01 |
| $a_{10}$ | -2.4118E-01 | 1.6663E-01 | 2.5005E-01 | 1.0305E-01 | 4.9636E-02 | 4.3147E-02 |
| $a_{12}$ | 1.7919E-01 | 3.4478E-01 | 3.7918E-01 | -1.1174E-01 | 0.0000E+00 | 0.0000E+00 |
| $a_{14}$ | -3.9648E-01 | 2.2100E-02 | -1.6983E-01 | -1.9512E-01 | 0.0000E+00 | 0.0000E+00 |
| $a_{16}$ | 1.3980E-01 | -6.5163E-01 | -3.3305E-01 | 2.5100E-01 | 0.0000E+00 | 0.0000E+00 |
| Surface # | 941 | 942 | 951 | 952 | 961 | 962 |
| K | -4.0406E+01 | -1.5709E+00 | -6.1609E+00 | -5.1696E+00 | 0.0000E+00 | 0.0000E+00 |
| $a_4$ | -5.0883E-02 | 1.5441E-01 | -2.2487E-01 | -1.5312E-01 | -2.1176E-01 | -1.8577E-01 |
| $a_6$ | 2.8907E-01 | -1.1503E-01 | 4.8096E-02 | 2.9689E-02 | 2.5291E-02 | 4.8049E-02 |
| $a_8$ | -3.0868E-01 | 5.7037E-02 | -1.4122E-02 | -1.2948E-02 | 7.3909E-03 | -7.0185E-03 |
| $a_{10}$ | 2.2771E-01 | 1.3182E-01 | 1.0673E-03 | 2.2973E-03 | -1.4320E-03 | 7.4530E-05 |
| $a_{12}$ | -1.9070E-01 | -1.3310E-01 | 2.1680E-03 | -8.8955E-05 | 0.0000E+00 | 0.0000E+00 |
| $a_{14}$ | 7.7417E-02 | 1.2593E-02 | 8.9791E-04 | -1.1977E-04 | 0.0000E+00 | 0.0000E+00 |
| $a_{16}$ | -5.5655E-02 | 1.1835E-02 | 1.6783E-04 | 1.4347E-04 | 0.0000E+00 | 0.0000E+00 |

FIG. 41

| \multicolumn{7}{c}{EFL(Effective focus length)= 2.897mm, HFOV(Half angular field of view)= 38.311deg., System length=3.866mm, Image heigh= 2.3mm. Fno=2.0} |
|---|---|---|---|---|---|---|---|
| Surface # | | Radius | Thickness | Refractive index | Abbe number | Focus | Material |
| - | Object | ∞ | ∞ | | | | |
| 1000 | Aperture stop | ∞ | -0.100 | | | | |
| 1011 | 1st lens element | 1.674 | 0.484 | 1.535 | 55.712 | 2.471 | plastic |
| 1012 | | -5.749 | 0.069 | | | | |
| 1021 | 2nd lens element | 15.002 | 0.212 | 1.643 | 22.437 | -3.578 | plastic |
| 1022 | | 1.997 | 0.207 | | | | |
| 1031 | 3rd lens element | -9.024 | 0.401 | 1.535 | 55.712 | 5.302 | plastic |
| 1032 | | -2.197 | 0.086 | | | | |
| 1041 | 4th lens element | -2.333 | 0.289 | 1.535 | 55.712 | 10.312 | plastic |
| 1042 | | -1.712 | 0.121 | | | | |
| 1051 | 5th lens element | 2.512 | 0.321 | 1.535 | 55.712 | -10.710 | plastic |
| 1052 | | 1.670 | 0.127 | | | | |
| 1061 | 6th lens element | 2.141 | 0.286 | 1.531 | 55.744 | 741.086 | plastic |
| 1062 | | 2.053 | 0.400 | | | | |
| 1071 | IR cut filter | ∞ | 0.210 | 1.517 | 64.167 | | plastic |
| 1072 | | ∞ | 0.652 | | | | |
| 1080 | Image plane | ∞ | 0.000 | | | | |

FIG. 44

| Aspherical parameters | | | | | | |
|---|---|---|---|---|---|---|
| Surface # | 1011 | 1012 | 1021 | 1022 | 1031 | 1032 |
| K | -1.4476E+01 | -1.9631E+02 | 0.0000E+00 | -3.0361E+01 | 0.0000E+00 | 0.0000E+00 |
| $a_4$ | 3.0921E-01 | 5.4882E-02 | 2.4408E-02 | 2.1777E-01 | -1.0924E-01 | -9.3479E-02 |
| $a_6$ | -4.0393E-01 | -1.5329E-01 | -3.0061E-01 | -6.2696E-01 | -3.0574E-02 | 6.1018E-02 |
| $a_8$ | 3.5716E-01 | -1.9250E-01 | -8.4585E-02 | 3.0650E-01 | 1.3195E-01 | 1.5193E-01 |
| $a_{10}$ | -2.0935E-01 | 2.2021E-01 | 2.8132E-01 | 1.1362E-01 | 4.9922E-02 | 4.2390E-02 |
| $a_{12}$ | 8.8170E-02 | 4.1392E-01 | 4.0311E-01 | -1.1678E-01 | 0.0000E+00 | 0.0000E+00 |
| $a_{14}$ | -3.9197E-01 | 4.7874E-02 | -1.4499E-01 | -2.0420E-01 | 0.0000E+00 | 0.0000E+00 |
| $a_{16}$ | 4.0432E-01 | -6.9652E-01 | -3.8177E-01 | 2.7049E-01 | 0.0000E+00 | 0.0000E+00 |
| Surface # | 1041 | 1042 | 1051 | 1052 | 1061 | 1062 |
| K | -3.0623E+01 | -1.4733E+00 | -6.3593E+00 | -5.7294E+00 | 0.0000E+00 | 0.0000E+00 |
| $a_4$ | -5.7681E-02 | 1.5166E-01 | -2.2760E-01 | -1.5459E-01 | -2.1249E-01 | -1.8500E-01 |
| $a_6$ | 2.8720E-01 | -1.1665E-01 | 4.5792E-02 | 2.9508E-02 | 2.5414E-02 | 4.7701E-02 |
| $a_8$ | -3.0499E-01 | 5.5477E-02 | -1.5014E-02 | -1.2765E-02 | 7.4155E-03 | -7.1121E-03 |
| $a_{10}$ | 2.3494E-01 | 1.3019E-01 | 8.0701E-04 | 2.3029E-03 | -1.4358E-03 | 4.3353E-05 |
| $a_{12}$ | -1.8217E-01 | -1.3385E-01 | 2.3092E-03 | -6.8778E-05 | 0.0000E+00 | 0.0000E+00 |
| $a_{14}$ | 9.1210E-02 | 1.2201E-02 | 8.6410E-04 | -1.1074E-04 | 0.0000E+00 | 0.0000E+00 |
| $a_{16}$ | -4.1484E-02 | 1.1797E-02 | 1.0361E-04 | 1.5328E-04 | 0.0000E+00 | 0.0000E+00 |

FIG. 45

| | | EFL(Effective focus length)= 2.883mm, HFOV(Half angular field of view)= 38.916deg., System length=3.800mm, Image leigh= 2.3mm, Fno=2.0 | | | | | |
|---|---|---|---|---|---|---|---|
| Surface # | | Radius | Thickness | Refractive index | Abbe number | Focus | Material |
| - | Object | ∞ | ∞ | | | | |
| 1100 | Aperture stop | ∞ | -0.100 | | | | |
| 1111 | 1st lens element | 1.718 | 0.472 | 1.535 | 55.712 | 2.459 | plastic |
| 1112 | | -5.150 | 0.077 | | | | |
| 1121 | 2nd lens element | 13.930 | 0.233 | 1.643 | 22.437 | -3.736 | plastic |
| 1122 | | 2.049 | 0.230 | | | | |
| 1131 | 3rd lens element | -7.816 | 0.297 | 1.535 | 55.712 | 5.408 | plastic |
| 1132 | | -2.145 | 0.115 | | | | |
| 1141 | 4th lens element | -2.236 | 0.412 | 1.535 | 55.712 | 9.222 | plastic |
| 1142 | | -1.639 | 0.142 | | | | |
| 1151 | 5th lens element | 2.233 | 0.387 | 1.535 | 55.712 | -8.126 | plastic |
| 1152 | | 1.388 | 0.147 | | | | |
| 1161 | 6th lens element | 2.146 | 0.256 | 1.531 | 55.744 | -2113.673 | plastic |
| 1162 | | 2.054 | 0.300 | | | | |
| 1171 | IR cut filter | ∞ | 0.210 | 1.517 | 64.167 | | plastic |
| 1172 | | ∞ | 0.521 | | | | |
| 1180 | Image plane | ∞ | 0.000 | | | | |

FIG. 48

| Aspherical parameters | | | | | | |
|---|---|---|---|---|---|---|
| Surface # | 1111 | 1112 | 1121 | 1122 | 1131 | 1132 |
| K | -1.4608E+01 | -1.2968E+02 | 0.0000E+00 | -3.2762E+01 | 0.0000E+00 | 0.0000E+00 |
| $a_4$ | 3.1103E-01 | 5.8903E-02 | 1.5694E-02 | 2.1988E-01 | -1.0778E-01 | -9.0251E-02 |
| $a_6$ | -4.0069E-01 | -1.5239E-01 | -3.0856E-01 | -6.2106E-01 | -2.7114E-02 | 6.1456E-02 |
| $a_8$ | 3.6098E-01 | -2.0094E-01 | -8.6911E-02 | 3.1010E-01 | 1.3368E-01 | 1.5173E-01 |
| $a_{10}$ | -2.0696E-01 | 2.0486E-01 | 2.8045E-01 | 1.1376E-01 | 5.1418E-02 | 4.2087E-02 |
| $a_{12}$ | 8.7281E-02 | 3.9777E-01 | 4.0294E-01 | -1.2007E-01 | 0.0000E+00 | 0.0000E+00 |
| $a_{14}$ | -4.1297E-01 | 3.6978E-02 | -1.4256E-01 | -2.1129E-01 | 0.0000E+00 | 0.0000E+00 |
| $a_{16}$ | 3.3921E-01 | -6.9633E-01 | -3.8040E-01 | 2.5943E-01 | 0.0000E+00 | 0.0000E+00 |
| Surface # | 1141 | 1142 | 1151 | 1152 | 1161 | 1162 |
| K | -3.1379E+01 | -1.6758E+00 | -5.7869E+00 | -5.0993E+00 | 0.0000E+00 | 0.0000E+00 |
| $a_4$ | -5.3858E-02 | 1.5537E-01 | -2.2376E-01 | -1.5627E-01 | -2.1209E-01 | -1.8673E-01 |
| $a_6$ | 2.8953E-01 | -1.1436E-01 | 4.6665E-02 | 2.9248E-02 | 2.5365E-02 | 4.7983E-02 |
| $a_8$ | -3.0892E-01 | 5.7170E-02 | -1.5237E-02 | -1.2732E-02 | 7.3904E-03 | -6.9718E-03 |
| $a_{10}$ | 2.2847E-01 | 1.3112E-01 | 6.1433E-04 | 2.3020E-03 | -1.4429E-03 | 7.9077E-05 |
| $a_{12}$ | -1.8836E-01 | -1.3340E-01 | 2.1838E-03 | -8.5032E-05 | 0.0000E+00 | 0.0000E+00 |
| $a_{14}$ | 8.6444E-02 | 1.2426E-02 | 7.9966E-04 | -1.2405E-04 | 0.0000E+00 | 0.0000E+00 |
| $a_{16}$ | -4.4665E-02 | 1.1817E-02 | 8.1513E-05 | 1.4534E-04 | 0.0000E+00 | 0.0000E+00 |

FIG. 49

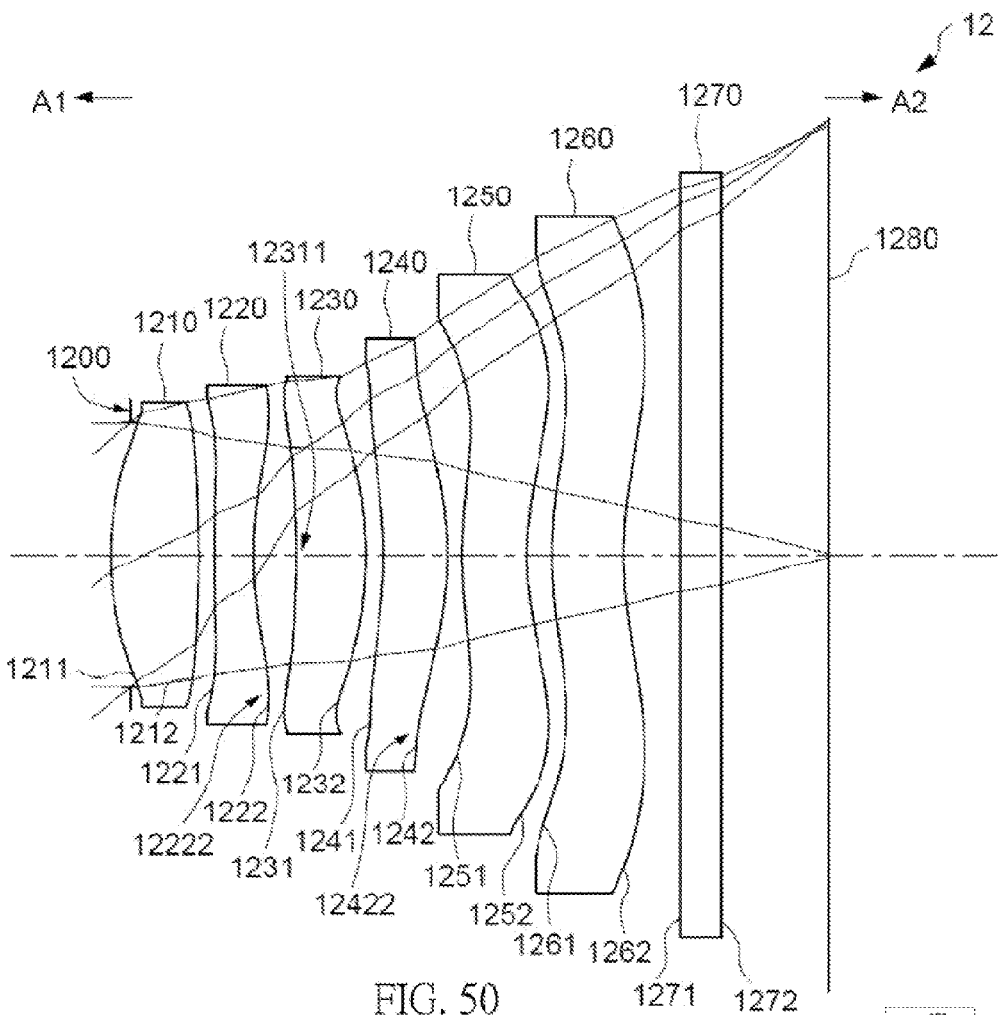
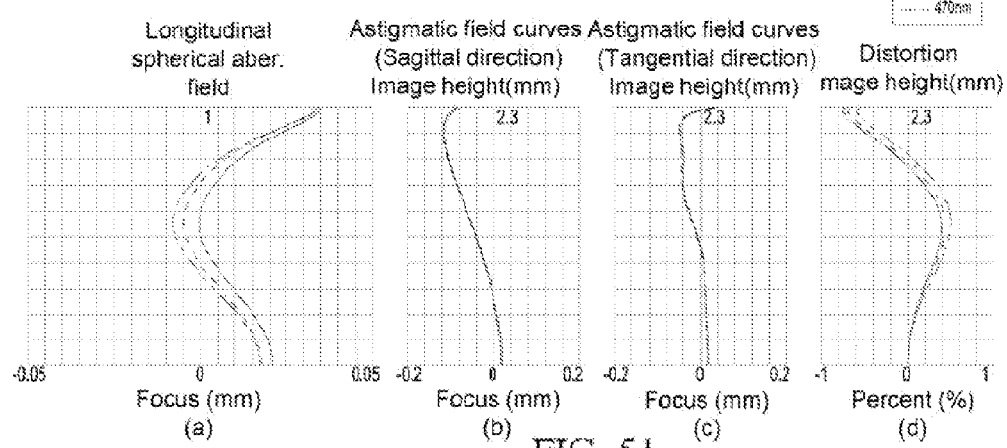
FIG. 50
FIG. 51

| EFL(Effective focus length)= 2.781mm, HFOV(Half angular field of view)= 39.966deg., System length=3.787mm, Image heigh= 2.3mm. Fno=2.0 ||||||||
|---|---|---|---|---|---|---|---|
| Surface # | | Radius | Thickness | Refractive index | Abbe number | Focus | Material |
| - | Object | ∞ | ∞ | | | | |
| 1200 | Aperture stop | ∞ | -0.100 | | | | |
| 1211 | 1st lens element | 1.687 | 0.465 | 1.535 | 55.712 | 2.462 | plastic |
| 1212 | | -5.513 | 0.080 | | | | |
| 1221 | 2nd lens element | 12.246 | 0.208 | 1.643 | 22.437 | -3.740 | plastic |
| 1222 | | 2.009 | 0.221 | | | | |
| 1231 | 3rd lens element | -8.803 | 0.371 | 1.535 | 55.712 | 5.036 | plastic |
| 1232 | | -2.099 | 0.094 | | | | |
| 1241 | 4th lens element | -2.328 | 0.337 | 1.535 | 55.712 | 10.327 | plastic |
| 1242 | | -1.722 | 0.079 | | | | |
| 1251 | 5th lens element | 2.484 | 0.339 | 1.535 | 55.712 | -9.179 | plastic |
| 1252 | | 1.573 | 0.132 | | | | |
| 1261 | 6th lens element | 2.164 | 0.379 | 1.531 | 55.744 | 196.102 | plastic |
| 1262 | | 2.075 | 0.300 | | | | |
| 1271 | IR cut filter | ∞ | 0.210 | 1.517 | 64.167 | | plastic |
| 1272 | | ∞ | 0.571 | | | | |
| 1280 | Image plane | ∞ | 0.000 | | | | |

FIG. 52

| | Aspherical parameters | | | | | |
|---|---|---|---|---|---|---|
| Surface # | 1211 | 1212 | 1221 | 1222 | 1231 | 1232 |
| K | -1.3561E+01 | -1.3535E+02 | 0.0000E+00 | -2.8780E+01 | 0.0000E+00 | 0.0000E+00 |
| $a_4$ | 3.0887E-01 | 4.6851E-02 | 8.9235E-03 | 2.1766E-01 | -1.1402E-01 | -9.5477E-02 |
| $a_6$ | -4.0181E-01 | -1.4504E-01 | -3.2601E-01 | -6.1247E-01 | -8.7123E-03 | 6.4914E-02 |
| $a_8$ | 3.4862E-01 | -2.2874E-01 | -7.5346E-02 | 3.0111E-01 | 1.5306E-01 | 1.5418E-01 |
| $a_{10}$ | -2.4051E-01 | 2.3757E-01 | 2.5655E-01 | 9.2146E-02 | 1.9337E-02 | 4.5619E-02 |
| $a_{12}$ | 6.8696E-02 | 2.6155E-01 | 3.2422E-01 | -1.5641E-01 | 0.0000E+00 | 0.0000E+00 |
| $a_{14}$ | -3.7407E-01 | 7.1085E-03 | -1.4623E-01 | -1.0331E-01 | 0.0000E+00 | 0.0000E+00 |
| $a_{16}$ | 3.8290E-01 | -5.9286E-01 | -2.3589E-01 | 2.2237E-01 | 0.0000E+00 | 0.0000E+00 |
| Surface # | 1241 | 1242 | 1251 | 1252 | 1261 | 1262 |
| K | -2.9426E+01 | -1.5129E+00 | -5.8442E+00 | -5.2252E+00 | 0.0000E+00 | 0.0000E+00 |
| $a_4$ | -5.2807E-02 | 1.5264E-01 | -2.2170E-01 | -1.5248E-01 | -2.1080E-01 | -1.8930E-01 |
| $a_6$ | 2.8727E-01 | -1.1832E-01 | 4.5490E-02 | 3.0921E-02 | 2.5544E-02 | 4.7711E-02 |
| $a_8$ | -3.0442E-01 | 5.7813E-02 | -1.2131E-02 | -1.2147E-02 | 7.3749E-03 | -7.0120E-03 |
| $a_{10}$ | 2.3554E-01 | 1.3218E-01 | 8.9111E-04 | 2.4052E-03 | -1.4359E-03 | 5.9870E-05 |
| $a_{12}$ | -1.8228E-01 | -1.3281E-01 | 2.0126E-03 | -7.3381E-05 | 0.0000E+00 | 0.0000E+00 |
| $a_{14}$ | 9.1092E-02 | 1.2256E-02 | 9.0585E-04 | -1.2211E-04 | 0.0000E+00 | 0.0000E+00 |
| $a_{16}$ | -4.1785E-02 | 1.1363E-02 | 9.4541E-05 | 1.3527E-04 | 0.0000E+00 | 0.0000E+00 |

FIG. 53

| \multicolumn{8}{|c|}{EFL(Effective focus length)= 2.778mm, HFOV(Half angular field of view)= 39.868deg., System length=3.802mm, Image heigh= 2.3mm, Fno=2.0} | | | | | | | |
|---|---|---|---|---|---|---|---|
| Surface # | | Radius | Thickness | Refractive index | Abbe number | Focus | Material |
| - | Object | ∞ | ∞ | | | | |
| 1300 | Aperture stop | ∞ | -0.100 | | | | |
| 1311 | 1st lens element | 1.722 | 0.487 | 1.535 | 55.712 | 2.467 | plastic |
| 1312 | | -5.168 | 0.065 | | | | |
| 1321 | 2nd lens element | 12.940 | 0.257 | 1.643 | 22.437 | -3.775 | plastic |
| 1322 | | 2.041 | 0.206 | | | | |
| 1331 | 3rd lens element | -10.598 | 0.385 | 1.535 | 55.712 | 4.975 | plastic |
| 1332 | | -2.160 | 0.084 | | | | |
| 1341 | 4th lens element | -2.421 | 0.441 | 1.535 | 55.712 | 9.366 | plastic |
| 1342 | | -1.738 | 0.090 | | | | |
| 1351 | 5th lens element | 2.465 | 0.374 | 1.535 | 55.712 | -9.776 | plastic |
| 1352 | | 1.588 | 0.127 | | | | |
| 1361 | 6th lens element | 2.171 | 0.215 | 1.531 | 55.744 | -278.533 | plastic |
| 1362 | | 2.066 | 0.400 | | | | |
| 1371 | IR cut filter | ∞ | 0.210 | 1.517 | 64.167 | | plastic |
| 1372 | | ∞ | 0.462 | | | | |
| 1380 | Image plane | ∞ | 0.000 | | | | |

FIG. 56

| | Aspherical parameters | | | | | |
|---|---|---|---|---|---|---|
| Surface # | 1311 | 1312 | 1321 | 1322 | 1331 | 1332 |
| K | -1.4246E+01 | -1.3576E+02 | 0.0000E+00 | -3.0921E+01 | 0.0000E+00 | 0.0000E+00 |
| $a_4$ | 3.0997E-01 | 5.5910E-02 | 2.1808E-02 | 2.1972E-01 | -1.0910E-01 | -9.0021E-02 |
| $a_6$ | -4.0229E-01 | -1.5182E-01 | -3.0377E-01 | -6.2597E-01 | -2.9576E-02 | 6.1668E-02 |
| $a_8$ | 3.5988E-01 | -1.9201E-01 | -8.7560E-02 | 3.0670E-01 | 1.3352E-01 | 1.5119E-01 |
| $a_{10}$ | -2.0568E-01 | 2.2067E-01 | 2.8101E-01 | 1.1309E-01 | 5.2137E-02 | 4.0951E-02 |
| $a_{12}$ | 9.1657E-02 | 4.1764E-01 | 4.0400E-01 | -1.1799E-01 | 0.0000E+00 | 0.0000E+00 |
| $a_{14}$ | -3.9244E-01 | 4.7544E-02 | -1.4382E-01 | -2.0614E-01 | 0.0000E+00 | 0.0000E+00 |
| $a_{16}$ | 3.9110E-01 | -6.9138E-01 | -3.7895E-01 | 2.6777E-01 | 0.0000E+00 | 0.0000E+00 |
| Surface # | 1341 | 1342 | 1351 | 1352 | 1361 | 1362 |
| K | -3.9691E+01 | -1.4375E+00 | -6.4052E+00 | -5.6388E+00 | 0.0000E+00 | 0.0000E+00 |
| $a_4$ | -6.4395E-02 | 1.5123E-01 | -2.2574E-01 | -1.5544E-01 | -2.1320E-01 | -1.8812E-01 |
| $a_6$ | 2.9052E-01 | -1.1606E-01 | 4.7182E-02 | 2.8751E-02 | 2.5211E-02 | 4.7444E-02 |
| $a_8$ | -3.0536E-01 | 5.6214E-02 | -1.4550E-02 | -1.3043E-02 | 7.3631E-03 | -7.0793E-03 |
| $a_{10}$ | 2.3142E-01 | 1.3074E-01 | 8.7274E-04 | 2.2370E-03 | -1.4475E-03 | 6.6234E-05 |
| $a_{12}$ | -1.8708E-01 | -1.3350E-01 | 2.2501E-03 | -7.5967E-05 | 0.0000E+00 | 0.0000E+00 |
| $a_{14}$ | 8.6030E-02 | 1.2379E-02 | 8.1480E-04 | -1.0883E-04 | 0.0000E+00 | 0.0000E+00 |
| $a_{16}$ | -4.6342E-02 | 1.1829E-02 | 8.4715E-05 | 1.5469E-04 | 0.0000E+00 | 0.0000E+00 |

FIG. 57

| \multicolumn{7}{c}{EFL(Effective focus length)= 2.900mm, HFOV(Half angular field of view)= 38.324deg., System length= 4.015mm, image heigh= 2.3mm, Fno=2.0} | | | | | | |
|---|---|---|---|---|---|---|
| Surface # | | Radius | Thickness | Refractive index | Abbe number | Focus | Material |
| - | Object | ∞ | ∞ | | | | |
| 1400 | Aperture stop | ∞ | -0.100 | | | | |
| 1411 | 1st lens element | 1.658 | 0.471 | 1.535 | 55.712 | 2.401 | plastic |
| 1412 | | -5.209 | 0.057 | | | | |
| 1421 | 2nd lens element | 18.829 | 0.256 | 1.643 | 22.437 | -3.438 | plastic |
| 1422 | | 1.981 | 0.168 | | | | |
| 1431 | 3rd lens element | -6.249 | 0.508 | 1.535 | 55.712 | 5.663 | plastic |
| 1432 | | -2.103 | 0.101 | | | | |
| 1441 | 4th lens element | -1.829 | 0.267 | 1.535 | 55.712 | 10.340 | plastic |
| 1442 | | -1.446 | 0.050 | | | | |
| 1451 | 5th lens element | 2.266 | 0.361 | 1.535 | 55.712 | -11.362 | plastic |
| 1452 | | 1.560 | 0.110 | | | | |
| 1461 | 6th lens element | 2.070 | 0.355 | 1.531 | 55.744 | 226.126 | plastic |
| 1462 | | 1.981 | 0.400 | | | | |
| 1471 | IR cut filter | ∞ | 0.210 | 1.517 | 64.167 | | plastic |
| 1472 | | ∞ | 0.700 | | | | |
| 1480 | Image plane | ∞ | 0.000 | | | | |

FIG. 60

| | Aspherical parameters | | | | | |
|---|---|---|---|---|---|---|
| Surface # | 1411 | 1412 | 1421 | 1422 | 1431 | 1432 |
| K | -1.3910E+01 | -2.1868E+02 | 0.0000E+00 | -2.8048E+01 | 0.0000E+00 | 0.0000E+00 |
| $a_4$ | 3.1826E-01 | 5.0033E-02 | 1.8166E-02 | 2.1276E-01 | -1.0701E-01 | -1.1016E-01 |
| $a_6$ | -3.9805E-01 | -1.5520E-01 | -3.1386E-01 | -6.3041E-01 | -2.7953E-02 | 5.2713E-02 |
| $a_8$ | 3.6118E-01 | -1.9884E-01 | -1.0010E-01 | 3.0518E-01 | 1.2791E-01 | 1.4246E-01 |
| $a_{10}$ | -2.0265E-01 | 2.1230E-01 | 2.6434E-01 | 1.1247E-01 | 4.9008E-02 | 3.1722E-02 |
| $a_{12}$ | 9.5387E-02 | 4.0999E-01 | 3.8418E-01 | -1.1985E-01 | 0.0000E+00 | 0.0000E+00 |
| $a_{14}$ | -3.9466E-01 | 5.5301E-02 | -1.5892E-01 | -2.1106E-01 | 0.0000E+00 | 0.0000E+00 |
| $a_{16}$ | 3.8313E-01 | -6.8057E-01 | -3.9520E-01 | 2.5830E-01 | 0.0000E+00 | 0.0000E+00 |
| Surface # | 1441 | 1442 | 1451 | 1452 | 1461 | 1462 |
| K | -2.0073E+01 | -2.2606E+00 | -9.5632E+00 | -5.1833E+00 | 0.0000E+00 | 0.0000E+00 |
| $a_4$ | -5.5551E-02 | 1.6548E-01 | -2.1463E-01 | -1.6082E-01 | -2.0920E-01 | -1.8458E-01 |
| $a_6$ | 2.9109E-01 | -1.1739E-01 | 5.0663E-02 | 3.1585E-02 | 2.6047E-02 | 4.7685E-02 |
| $a_8$ | -3.0061E-01 | 5.4439E-02 | -1.4955E-02 | -1.1324E-02 | 7.3724E-03 | -7.1780E-03 |
| $a_{10}$ | 2.3381E-01 | 1.3009E-01 | 9.4024E-04 | 2.4004E-03 | -1.5135E-03 | -1.0513E-05 |
| $a_{12}$ | -1.8544E-01 | -1.3348E-01 | 2.5036E-03 | -1.8044E-04 | 0.0000E+00 | 0.0000E+00 |
| $a_{14}$ | 9.0158E-02 | 1.2774E-02 | 9.1612E-04 | -1.7070E-04 | 0.0000E+00 | 0.0000E+00 |
| $a_{16}$ | -3.7746E-02 | 1.2433E-02 | 2.9061E-06 | 1.3899E-04 | 0.0000E+00 | 0.0000E+00 |

FIG. 61

| Embodiment | 1st Embodiment | 2nd Embodiment | 3rd Embodiment | 4th Embodiment | 5th Embodiment | 6th Embodiment | 7th Embodiment |
|---|---|---|---|---|---|---|---|
| T1 | 0.637 | 0.638 | 0.844 | 0.862 | 0.846 | 0.899 | 0.474 |
| A12 | 0.068 | 0.057 | 0.070 | 0.066 | 0.072 | 0.074 | 0.075 |
| T2 | 0.200 | 0.205 | 0.230 | 0.232 | 0.225 | 0.217 | 0.227 |
| G23 | 0.224 | 0.168 | 0.282 | 0.258 | 0.211 | 0.188 | 0.210 |
| T3 | 0.315 | 0.469 | 0.415 | 0.489 | 0.619 | 0.452 | 0.374 |
| G34 | 0.185 | 0.089 | 0.320 | 0.205 | 0.121 | 0.268 | 0.085 |
| T4 | 0.462 | 0.477 | 0.544 | 0.631 | 0.677 | 0.761 | 0.413 |
| G45 | 0.069 | 0.051 | 0.069 | 0.057 | 0.030 | 0.029 | 0.092 |
| T5 | 0.461 | 0.512 | 0.461 | 0.435 | 0.440 | 0.472 | 0.384 |
| G56 | 0.206 | 0.088 | 0.068 | 0.053 | 0.028 | 0.030 | 0.134 |
| T6 | 0.329 | 0.328 | 0.359 | 0.373 | 0.399 | 0.622 | 0.251 |
| BFL | 0.976 | 1.051 | 1.143 | 1.209 | 1.286 | 1.372 | 1.064 |
| EFL | 3.016 | 3.037 | 3.323 | 3.342 | 3.344 | 3.824 | 2.820 |
| ALT | 2.404 | 2.628 | 2.853 | 3.022 | 3.206 | 3.423 | 2.123 |
| AAG | 0.752 | 0.453 | 0.809 | 0.638 | 0.463 | 0.589 | 0.595 |
| EFL/(T2+T6) | 5.700 | 5.703 | 5.645 | 5.521 | 5.361 | 4.557 | 5.900 |
| BFL/T4 | 2.113 | 2.206 | 2.103 | 1.916 | 1.899 | 1.804 | 2.575 |
| AAG/T3 | 2.391 | 0.965 | 1.946 | 1.306 | 0.747 | 1.304 | 1.593 |
| ALT/T6 | 7.308 | 8.017 | 7.955 | 8.101 | 8.031 | 5.505 | 8.453 |
| EFL/AAG | 4.009 | 6.706 | 4.109 | 5.235 | 7.224 | 6.491 | 4.737 |
| BFL/(G12+G23) | 3.343 | 4.675 | 3.246 | 3.730 | 4.539 | 5.249 | 3.737 |
| ALT/BFL | 2.462 | 2.500 | 2.495 | 2.500 | 2.493 | 2.495 | 1.996 |
| (T5+T6)/(G34+G45+G56) | 1.717 | 3.684 | 1.797 | 2.571 | 4.676 | 3.337 | 2.044 |
| ALT+AAG | 3.156 | 3.081 | 3.661 | 3.661 | 3.669 | 4.012 | 2.719 |
| T3/(G12+G56) | 1.147 | 3.256 | 3.019 | 4.111 | 6.156 | 4.352 | 1.794 |
| ALT/(G34+G56) | 6.139 | 14.874 | 7.364 | 11.738 | 21.402 | 11.471 | 9.715 |
| T4/T5 | 1.002 | 0.931 | 1.179 | 1.449 | 1.540 | 1.611 | 1.075 |
| AAG/T2 | 3.759 | 2.212 | 3.515 | 2.748 | 2.061 | 2.709 | 2.624 |
| T1/(G23+G56) | 1.480 | 2.491 | 2.412 | 2.776 | 3.531 | 4.133 | 1.381 |

FIG. 62A

| Embodiment | 8th Embodiment | 9th Embodiment | 10th Embodiment | 11th Embodiment | 12th Embodiment | 13th Embodiment | 14th Embodiment |
|---|---|---|---|---|---|---|---|
| T1 | 0.445 | 0.489 | 0.484 | 0.472 | 0.465 | 0.487 | 0.471 |
| A12 | 0.065 | 0.078 | 0.069 | 0.077 | 0.080 | 0.065 | 0.057 |
| T2 | 0.305 | 0.224 | 0.212 | 0.233 | 0.208 | 0.257 | 0.256 |
| G23 | 0.226 | 0.195 | 0.207 | 0.230 | 0.221 | 0.206 | 0.168 |
| T3 | 0.367 | 0.352 | 0.401 | 0.297 | 0.371 | 0.385 | 0.508 |
| G34 | 0.103 | 0.070 | 0.086 | 0.115 | 0.094 | 0.084 | 0.101 |
| T4 | 0.372 | 0.552 | 0.289 | 0.412 | 0.337 | 0.441 | 0.267 |
| G45 | 0.071 | 0.064 | 0.121 | 0.142 | 0.079 | 0.090 | 0.050 |
| T5 | 0.329 | 0.424 | 0.321 | 0.387 | 0.339 | 0.374 | 0.361 |
| G56 | 0.129 | 0.153 | 0.127 | 0.147 | 0.132 | 0.127 | 0.110 |
| T6 | 0.403 | 0.264 | 0.286 | 0.256 | 0.379 | 0.215 | 0.355 |
| BFL | 1.022 | 0.997 | 1.262 | 1.031 | 1.081 | 1.072 | 1.310 |
| EFL | 2.822 | 2.865 | 2.897 | 2.883 | 2.781 | 2.778 | 2.900 |
| ALT | 2.222 | 2.305 | 1.994 | 2.057 | 2.099 | 2.158 | 2.219 |
| AAG | 0.595 | 0.560 | 0.609 | 0.712 | 0.606 | 0.571 | 0.486 |
| EFL/(T2+T6) | 3.982 | 5.865 | 5.810 | 5.894 | 4.738 | 5.890 | 4.744 |
| BFL/T4 | 2.745 | 1.807 | 4.364 | 2.502 | 3.208 | 2.432 | 4.907 |
| AAG/T3 | 1.623 | 1.592 | 1.519 | 2.396 | 1.632 | 1.485 | 0.955 |
| ALT/T6 | 5.508 | 8.718 | 6.967 | 8.046 | 5.536 | 10.050 | 6.245 |
| EFL/AAG | 4.740 | 5.112 | 4.753 | 4.050 | 4.589 | 4.863 | 5.970 |
| BFL/(G12+G23) | 3.507 | 3.642 | 4.568 | 3.354 | 3.598 | 3.962 | 5.812 |
| ALT/BFL | 2.174 | 2.312 | 1.579 | 1.996 | 1.942 | 2.012 | 1.693 |
| (T5+T6)/(G34+G45+G56) | 2.411 | 2.401 | 1.823 | 1.589 | 2.350 | 1.958 | 2.751 |
| ALT+AAG | 2.818 | 2.865 | 2.604 | 2.769 | 2.705 | 2.729 | 2.704 |
| T3/(G12+G56) | 1.884 | 1.523 | 2.049 | 1.323 | 1.748 | 2.004 | 3.043 |
| ALT/(G34+G56) | 9.545 | 10.350 | 9.380 | 7.844 | 9.282 | 10.254 | 10.530 |
| T4/T5 | 1.131 | 1.302 | 0.901 | 1.064 | 0.995 | 1.179 | 0.740 |
| AAG/T2 | 1.951 | 2.501 | 2.869 | 3.049 | 2.917 | 2.223 | 1.897 |
| T1/(G23+G56) | 1.252 | 1.404 | 1.448 | 1.251 | 1.319 | 1.463 | 1.690 |

FIG. 62B

MOBILE DEVICE AND OPTICAL IMAGING LENS THEREOF

INCORPORATION BY REFERENCE

This application claims priority from P.R.C. Patent Application No. 201510034278.5, filed on Jan. 23, 2015, the contents of which are hereby incorporated by reference in their entirety for all purposes.

TECHNICAL FIELD

The present disclosure relates to a mobile device and an optical imaging lens thereof, and particularly, relates to a mobile device applying an optical imaging lens having six lens elements and an optical imaging lens thereof.

BACKGROUND

The ever-increasing demand for smaller sized mobile devices, such as cell phones, digital cameras, etc. has triggered a corresponding and growing need for smaller sized photography modules. Such modules may comprise elements such as an optical imaging lens, a module housing unit, and an image sensor, etc., contained therein. Size reductions may be contributed from various aspects of the mobile devices, which may include not only the charge coupled device (CCD) and the complementary metal-oxide semiconductor (CMOS), but also the optical imaging lens mounted therein. When reducing the size of the optical imaging lens, however, achieving good optical characteristics may present a challenging problem.

According to current technological development, such as the optical imaging lenses in Taiwan Patent No. M471594 and I424271, both of which relate to optical imaging lens constructed with an optical imaging lens having six lens elements, the length of the optical imaging lens, from the object-side surface of the first lens element to the image plane is longer. These optical imaging lenses are too long for smaller sized mobile devices. Therefore, there is a need for optical imaging lens which may be capable to place with six lens elements therein, with a shorter length, while also having good optical characteristics.

SUMMARY

Embodiments of the present disclosure may provide a mobile device and an optical imaging lens thereof. By controlling the convex or concave shape of the surfaces, the length of the optical imaging lens may be shortened while maintaining good optical characteristics and system functionality.

In an exemplary embodiment, an optical imaging lens may comprise, sequentially from an object side to an image side along an optical axis, an aperture stop, first, second, third, fourth, fifth and sixth lens elements. Each of the first, second, third, fourth, fifth and sixth lens elements may have refracting power, an object-side surface facing toward the object side and an image-side surface facing toward the image side, and a central thickness defined along the optical axis.

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, an air gap between the fourth lens element and the fifth lens element along the optical axis, represented by G45, the central thickness of the fifth lens element, represented by T5, an air gap between the fifth lens element and the sixth lens element along the optical axis, represented by G56, the central thickness of the sixth lens element, represented by T6, a distance between the image-side surface of the sixth lens element and the object-side surface of a filtering unit along the optical axis, represented by G6F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, a focusing length of the sixth lens element, represented by f6, the refracting index of the first lens element, represented by n1, the refracting index of the second lens element, represented by n2, the refracting index of the third lens element, represented by n3, the refracting index of the fourth lens element, represented by n4, the refracting index of the fifth lens element, represented by n5, the refracting index of the sixth lens element, represented by n6, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an abbe number of the sixth lens element, represented by v6, an effective focal length of the optical imaging lens, represented by EFL, a distance between the object-side surface of the first lens element and an image plane along the optical axis, represented by TTL, a sum of the central thicknesses of all six lens elements, i.e. a sum of T1, T2, T3, T4, T5 and T6, represented by ALT, a sum of all five air gaps from the first lens element to the sixth lens element along the optical axis, i.e. a sum of G12, G23, G34, G45 and G56, represented by AAG, a back focal length of the optical imaging lens, which is defined as the distance from the image-side surface of the sixth lens element to the image plane along the optical axis, i.e. a sum of G6F, TF and GFP, and represented by BFL.

In an aspect of the optical imaging lens of the present disclosure, the image-side surface of the first lens may comprise a convex portion in a vicinity of the optical axis; the object-side surface of the second lens element may comprise a concave portion in a vicinity of the periphery of the second lens element; the object-side surface of the third lens element may comprise a convex portion in a vicinity of the periphery of the third lens element; the fourth lens element may be constructed by plastic material; the image-side surface of the fifth lens element may comprise a concave portion in a vicinity of the optical axis; the image-side surface of the sixth lens element may comprise a concave portion in a vicinity of the optical axis. In some embodiments, the optical imaging lens may comprise no other lenses having refracting power beyond the six lens elements.

In another exemplary embodiment, other equation(s), such as those relating to the ratio among parameters may be taken into consideration. For example, EFL, T2 and T6 could be controlled to satisfy the equation as follows:

$$EFL/(T2+T6) \leq 5.9 \qquad \text{Equation (1); or}$$

BFL and T4 could be controlled to satisfy the equation as follows:

$$1.8 \leq BFL/T4 \qquad \text{Equation (2); or}$$

T5, T6, G34, G45 and G56 could be controlled to satisfy the equation as follows:

$$1.5 \leq (T5+T6)/(G34+G45+G56) \qquad \text{Equation (3); or}$$

AAG and T3 could be controlled to satisfy the equation as follows:

$$AAG/T3 \leq 2.4 \qquad \text{Equation (4); or}$$

ALT and AAG could be controlled to satisfy the equation as follows:

$$ALT+AAG \leq 6 \qquad \text{Equation (5); or}$$

ALT and T6 could be controlled to satisfy the equation as follows:

$$5.5 \leq ALT/T6 \qquad \text{Equation (6); or}$$

T3, G12 and G56 could be controlled to satisfy the equation as follows:

$$1.0 \leq T3/(G12+G56) \qquad \text{Equation (7); or}$$

EFL and AAG could be controlled to satisfy the equation as follows:

$$4.0 \leq EFL/AAG \qquad \text{Equation (8); or}$$

ALT, G34 and G56 could be controlled to satisfy the equation as follows:

$$4.6 \leq ALT/(G34+G56) \qquad \text{Equation (9); or}$$

T4 and T5 could be controlled to satisfy the equation as follows:

$$T4/T5 \leq 1.5 \qquad \text{Equation (10); or}$$

BFL, G12 and G23 could be controlled to satisfy the equation as follows:

$$3.0 \leq BFL/(G12+G23) \qquad \text{Equation (11); or}$$

AAG and T2 could be controlled to satisfy the equation as follows:

$$AAG/T2 \leq 3.8 \qquad \text{Equation (12); or}$$

ALT and BFL could be controlled to satisfy the equation as follows:

$$ALT/BFL \leq 2.5 \qquad \text{Equation (13); or}$$

T1, G23 and G56 could be controlled to satisfy the equation as follows:

$$1.25 \leq T1/(G23+G56) \qquad \text{Equation (14).}$$

Aforesaid exemplary embodiments are not limited and could be selectively incorporated in other embodiments described herein.

In some exemplary embodiments, more details about the convex or concave surface structure could be incorporated for one specific lens element or broadly for plural lens elements to enhance the control for the system performance and/or resolution. It is noted that the details listed here could be incorporated in example embodiments if no inconsistency occurs.

In another exemplary embodiment, a mobile device may comprise a housing and a photography module positioned in the housing is provided. The photography module may comprise any of aforesaid example embodiments of optical imaging lens, a lens barrel, a module housing unit and an image sensor. The lens barrel may be suitable for positioning the optical imaging lens, the module housing unit may be suitable for positioning the lens barrel, and the image sensor may be positioned at the image side of the optical imaging lens.

Through controlling the convex or concave shape of the surfaces, the mobile device and the optical imaging lens thereof in exemplary embodiments may achieve good optical characteristics and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of one single lens element according to the present disclosure;

FIG. 2 is a schematic view of the relation between the surface shape and the optical focus of the lens element;

FIG. 3 is a schematic view of a first example of the surface shape and the efficient radius of the lens element;

FIG. 4 is a schematic view of a second example of the surface shape and the efficient radius of the lens element;

FIG. 5 is a schematic view of a third example of the surface shape and the efficient radius of the lens element;

FIG. 8 is a table of optical data for each lens element of the optical imaging lens of a first embodiment of the present disclosure;

FIG. 9 is a table of aspherical data of a first embodiment of the optical imaging lens according to the present disclosure;

FIG. 10 is a cross-sectional view of a second embodiment of an optical imaging lens having six lens elements according to the present disclosure;

FIG. 11 is a chart of longitudinal spherical aberration and other kinds of optical aberrations of a second embodiment of the optical imaging lens according the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of a sixth embodiment of an optical imaging lens according to the present disclosure;

FIG. 29 is a table of aspherical data of a sixth embodiment of the optical imaging lens according to the present disclosure;

FIG. 32 is a table of optical data for each lens element of the optical imaging lens of a seventh embodiment of the present disclosure;

FIG. 33 is a table of aspherical data of a seventh embodiment of the optical imaging lens according to the present disclosure;

FIG. 36 is a table of optical data for each lens element of the optical imaging lens of a eighth embodiment of the present disclosure;

FIG. 37 is a table of aspherical data of a eighth embodiment of the optical imaging lens according to the present disclosure;

FIG. 40 is a table of optical data for each lens element of the optical imaging lens of a ninth embodiment of the present disclosure;

FIG. 41 is a table of aspherical data of a ninth embodiment of the optical imaging lens according to the present disclosure;

FIG. 44 is a table of optical data for each lens element of the optical imaging lens of a tenth embodiment of the present disclosure;

FIG. 45 is a table of aspherical data of a tenth embodiment of the optical imaging lens according to the present disclosure;

FIG. 48 is a table of optical data for each lens element of the optical imaging lens of an eleventh embodiment of the present disclosure;

FIG. 49 is a table of aspherical data of an eleventh embodiment of the optical imaging lens according to the present disclosure;

FIG. 50 is a cross-sectional view of a twelfth embodiment of an optical imaging lens having six lens elements according to the present disclosure;

FIG. 51 is a chart of longitudinal spherical aberration and other kinds of optical aberrations of a twelfth embodiment of the optical imaging lens according the present disclosure;

FIG. 52 is a table of optical data for each lens element of the optical imaging lens of a twelfth embodiment of the present disclosure;

FIG. 53 is a table of aspherical data of a twelfth embodiment of the optical imaging lens according to the present disclosure;

FIG. 56 is a table of optical data for each lens element of the optical imaging lens of a thirteenth embodiment of the present disclosure;

FIG. 57 is a table of aspherical data of a thirteenth embodiment of the optical imaging lens according to the present disclosure;

FIG. 60 is a table of optical data for each lens element of the optical imaging lens of a fourteenth embodiment of the present disclosure;

FIG. 61 is a table of aspherical data of a fourteenth embodiment of the optical imaging lens according to the present disclosure;

FIG. 62(A) and FIG. 62(B) are two tables for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG, BFL/(G12+G23), ALT/BFL, (T5+T6)/(G34+ G45+G56), ALT+AAG, T3/(G12+G56), ALT/(G34+G56), T4/T5, AAG/T2 and T1/(G23+G56) of all fourteen example embodiments;

DETAILED DESCRIPTION

Figure 6:
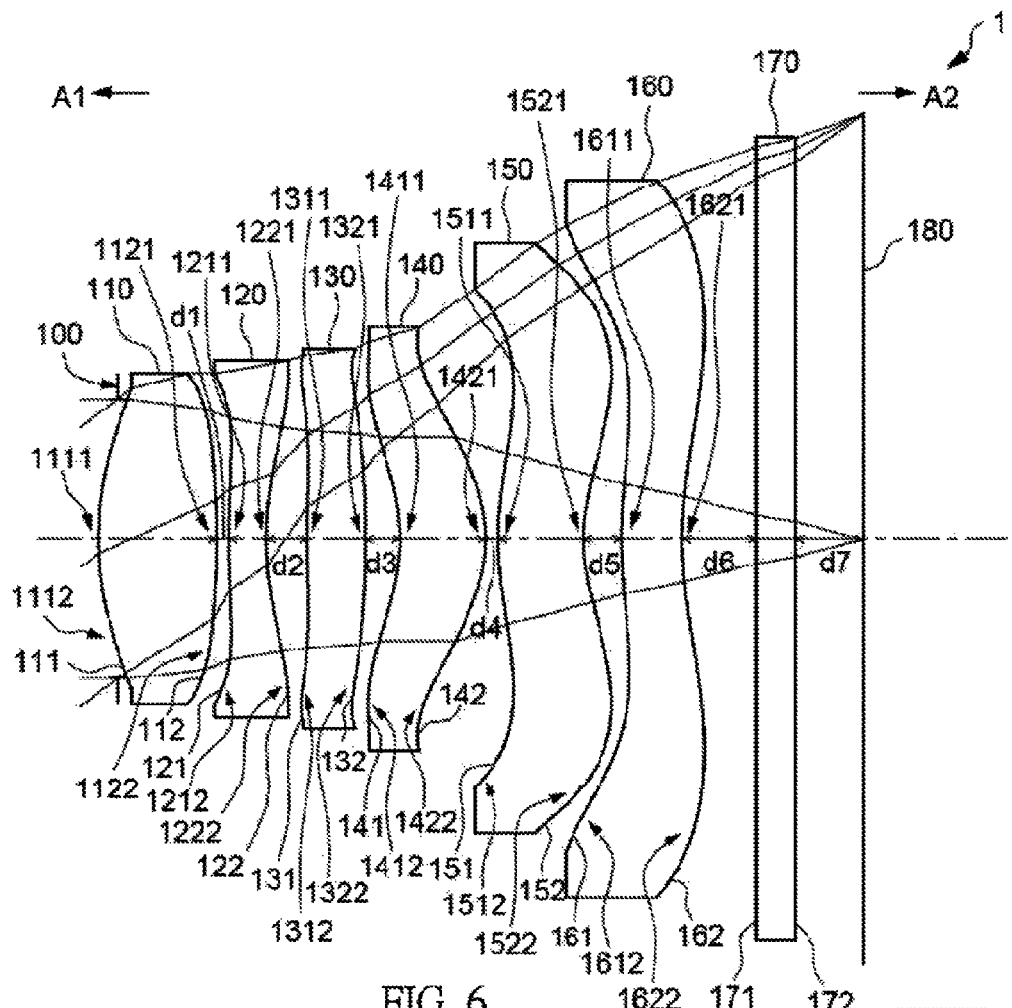
FIG. 6 is a cross-sectional view of a first embodiment of an optical imaging lens having six lens elements according to the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refractive power)" may indicate that the paraxial refractive power of the lens element in Gaussian optics is positive (or negative). The description "an object-side (or image-side) surface of a lens element" may only include a specific region of that surface of the lens element where imaging rays are capable of passing through that region, namely the clear aperture of the surface. The aforementioned imaging rays may be classified into two types, chief ray Lc and marginal ray Lm. Taking a lens element depicted in FIG. 1 as an example, the lens element may be rotationally symmetric, where the optical axis I is the axis of symmetry. The region A of the lens element may be defined as "a part in a vicinity of the optical axis", and the region C of the lens element may be defined as "a part in a vicinity of a periphery of the lens element." Besides, the lens element may also have an extending part E extended radially and outwardly from the region C, namely the part outside of the clear aperture of the lens element. The extending part E may usually be used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present specification. These criteria mainly determine the boundaries of parts under various circumstances including the part in a vicinity of the optical axis, the part in a vicinity of a periphery of a lens element surface, and other types of lens element surfaces such as those having multiple parts.

FIG. 1 is a radial cross-sectional view of a lens element. Before determining boundaries of those aforesaid parts, two referential points should be defined first, central point and transition point. The central point of a surface of a lens element may be a point of intersection of that surface and the optical axis. The transition point may be a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The part of a surface of the lens element between the central point and the first transition point may be defined as the part in a vicinity of the optical axis. The part located radially outside of the Nth transition point (but still within the scope of the clear aperture) may be defined as the part in a vicinity of a periphery of the lens element. In some embodiments, there may be other parts existing or disposed between the part in a vicinity of the optical axis and the part in a vicinity of a periphery of the lens element; the numbers of parts depend on the numbers of the transition point(s). In addition, the radius of the clear aperture (or a so-called effective radius) of a surface may be defined as the radial distance from the optical axis I to a point of intersection of the marginal ray Lm and the surface of the lens element.

Referring to FIG. 2, determining the shape of a part is convex or concave may depend on whether a collimated ray passing through that part converges or diverges. That is, while applying a collimated ray to a part to be determined in terms of shape, the collimated ray passing through that part may be bent and the ray itself or its extension line will eventually meet the optical axis. The shape of that part can be determined by whether the ray or its extension line meets (intersects) the optical axis (focal point) at the object-side or image-side. For instance, if the ray itself intersects the optical axis at the image side of the lens element after passing through a part, i.e. the focal point of this ray is at the image side (see point R in FIG. 2), the part may be determined as having a convex shape. On the contrary, if the ray diverges after passing through a part, the extension line of the ray intersects the optical axis at the object side of the lens element, i.e. the focal point of the ray is at the object side (see point M in FIG. 2), that part may be determined as having a concave shape. Therefore, referring to FIG. 2, the part between the central point and the first transition point has a convex shape, the part located radially outside of the first transition point has a concave shape, and the first transition point is the point where the part having a convex shape changes to the part having a concave shape, namely the border of two adjacent parts. Alternatively, there may be another way to determine whether a part in a vicinity of the optical axis has a convex or concave shape by referring to the sign of an "R" value, which is the (paraxial) radius of curvature of a lens surface. The R value which may be used in optical design software such as Zemax and CodeV. The R value usually appears in the lens data sheet in the software. For an object-side surface, positive R may mean that the object-side surface is convex, and negative R may mean that the object-side surface is concave. Conversely, for an image-side surface, positive R may mean that the image-side surface is concave, and negative R may mean that the image-side surface is convex. The result found by using this method should be consistent as by using the other way mentioned above, which may determine surface shapes by referring to whether the focal point of a collimated ray is at the object side or the image side.

For none transition point cases, the part in a vicinity of the optical axis may be defined as the part between 0~50% of the effective radius (radius of the clear aperture) of the surface, whereas the part in a vicinity of a periphery of the lens element may be defined as the part between 50~100% of effective radius (radius of the clear aperture) of the surface.

Referring to the first example depicted in FIG. 3, only one transition point, namely a first transition point, may appear within the clear aperture of the image-side surface of the lens element. Part I is a part in a vicinity of the optical axis, and part II is a part in a vicinity of a periphery of the lens element. The part in a vicinity of the optical axis may be determined as having a concave surface due to the R value at the image-side surface of the lens element is positive. The shape of the part in a vicinity of a periphery of the lens element may be different from that of the radially inner adjacent part, i.e. the shape of the part in a vicinity of a periphery of the lens element is different from the shape of the part in a vicinity of the optical axis; the part in a vicinity of a periphery of the lens element may have a convex shape.

Referring to the second example depicted in FIG. 4, a first transition point and a second transition point may exist or be disposed on the object-side surface (within the clear aperture) of a lens element. In which part I is the part in a vicinity of the optical axis, and part III is the part in a vicinity of a periphery of the lens element. The part in a vicinity of the optical axis may have a convex shape because the R value at the object-side surface of the lens element is positive. The part in a vicinity of a periphery of the lens element (part III) may have a convex shape. What is more, there may be another part having a concave shape existing or disposed between the first and second transition point (part II).

Referring to a third example depicted in FIG. 5, no transition point may exist or be disposed on the object-side surface of the lens element. In this case, the part between 0~50% of the effective radius (radius of the clear aperture) may be determined as the part in a vicinity of the optical axis, and the part between 50~100% of the effective radius may be determined as the part in a vicinity of a periphery of the lens element. The part in a vicinity of the optical axis of the object-side surface of the lens element may be determined as having a convex shape due to its positive R value, and the part in a vicinity of a periphery of the lens element may be determined as having a convex shape as well.

In the present disclosure, examples of an optical imaging lens which is a prime lens are provided. Example embodiments of an optical imaging lens may comprise a first lens element, a second lens element, a third lens element, a fourth lens element, a fifth lens element and a sixth lens element. Each of the lens elements may comprise refracting power, an object-side surface facing toward an object side and an image-side surface facing toward an image side and a central thickness defined along the optical axis. These lens elements may be arranged sequentially from the object side to the image side along an optical axis, and example embodiments of the lens may comprise no other lenses having refracting power beyond the six lens elements. The design of the detail characteristics of each lens element may provide the improved imaging quality and short optical imaging lens.

The image-side surface of the first lens element may comprise a convex portion in the vicinity of the optical axis, which may gather light efficiently. The aperture stop may be in front of the object-side surface of the first lens element, which may be beneficial for enlarging the filed angle.

The object-side surface of the second lens element may comprise a concave portion in the vicinity of the periphery of the second lens element, the object-side surface of the third lens element may comprise a convex portion in the vicinity of the periphery of the third lens element, the image-side surface of the fifth lens element may comprise a concave portion in the vicinity of the optical axis, the image-side surface of the sixth lens element may comprise a concave portion in the vicinity of the optical axis. Because the shapes of second, third, fifth, and sixth lens elements are arranged, the optical aberration, curvature of field, and distortion can be reduced and the imaging quality can be enhanced.

EFL should be decreased as soon as possible for shortening the total length of optical imaging lens and ensuring the imaging quality. Because the radius of curvature of the sixth lens element may be longer, the thickness of sixth lens element can't be too small for considering the production difficulty of the sixth lens element. EFL, T2 and T6 could be controlled to satisfy the equation: $EFL/(T2+T6) \leq 5.9$, and the more advantageous range of $EFL/(T2+T6)$ may be between about 3.9 and about 5.9.

In some embodiments, when the total length of the optical imaging lens is shortened, it may be advantageous to decrease the air gaps between these lens elements and the thickness of each lens element. BFL could be controlled to satisfy the equations: $BFL/T4 \geq 1.8$, $BFL/(G12+G23) \geq 3.0$, and $ALT/BFL \leq 2.5$, wherein the more advantageous range of $BFL/T4$ may be between about 1.8 and about 5.0, the more advantageous range of $BFL/(G12+G23)$ may be between about 3.2 and about 5.9, and the more advantageous range of $ALT/BFL$ may be between about 1.5 and about 2.5.

Shortening the air gaps between these lens elements may advantageously shorten the total length of the optical imaging lens. If T5, T6, G34, G45, G56, T3, G12, ALT, AAG, T2, T1 could be controlled to satisfy the equations: $(T5+T6)/(G34+G45+G56) \geq 1.5$, $T3/(G12+G56) \geq 1.0$, $ALT/(G34+G56) \geq 4.6$, $AAG/T3 \leq 2.4$, $AAG/T2 \leq 3.8$, $ALT+AAG \leq 6.0$, and $T1/(G12+G56) \geq 1.25$, the total length of the optical imaging lens can be shortened and the imaging quality can be ensured, wherein the more advantageous range of $(T5+T6)/(G34+G45+G56)$ may be between about 1.5 and about 4.7, the more advantageous range of $T3/(G12+G56)$ may be between about 1.1 and about 6.2, the more advantageous range of $ALT/(G34+G56)$ may be between about 6.0 and about 21.5, the more advantageous range of $AAG/T3$ may be between about 0.7 to about 2.4, the more advantageous range of $AAG/T2$ may be between about 1.8 and about 3.8, the more advantageous range of $ALT+AAG$ may be between about 2.6 and about 4.1, and the more advantageous range of $T1/(G12+G56)$ may be between about 1.25 and about 4.2.

For shortening the length of the optical imaging lens, if AAG could be controlled to satisfy the equation: $EFL/AAG \geq 4.0$, the imaging quality of can be better, wherein the more advantageous range of $EFL/AAG$ may be between about 4.0 and about 7.3.

The lens element may be designed to be thinner for shortening the total length of optical imaging lens. Because the radius of curvature of the sixth lens element may be longer, the thickness of the sixth lens element may be limited. If ALT, T6 could be designed to satisfy the equation: ALT/T6≥5.5, the imaging quality may be better, wherein the more advantageous range of ALT/T6 may be between about 5.5 and about 10.1.

For shortening the total length of the optical imaging lens, because the radius of curvature of the fifth lens element is longer than the radius of curvature of the fourth lens element, shortening the thickness of the fifth lens element is limited. If T4 and T5 could be designed to satisfy the equation: T4/T5≤1.5, the imaging quality can be better, wherein the more advantageous range of T4/T5 may be between 0.7 and 1.7.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 7:
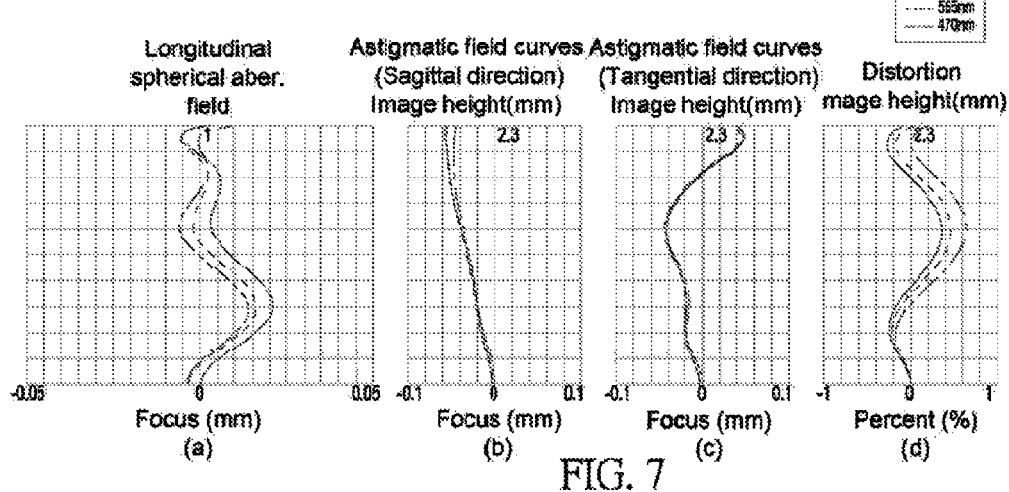
FIG. 7 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a shortened length. Reference is now made to FIGS. 6-9. FIG. 6 illustrates an example cross-sectional view of an optical imaging lens 1 having six lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment, in which f is used for representing EFL. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, a fifth lens element 150 and a sixth lens element 160. A filtering unit 170 and an image plane 180 of an image sensor may be positioned at the image side A2 of the optical lens 1. Each of the first, second, third, fourth, fifth, sixth lens elements 110, 120, 130, 140, 150, 160 and the filtering unit 170 may comprise an object-side surface 111/121/131/141/151/161/171 facing toward the object side A1 and an image-side surface 112/122/132/142/152/162/172 facing toward the image side A2. The example embodiment of the filtering unit 170 illustrated is an IR cut filter (infrared cut filter) positioned between the sixth lens element 160 and an image plane 180. The filtering unit 170 may selectively absorb light with specific wavelength from the light passing optical imaging lens 1. For example, IR light may be absorbed, and this may prohibit the IR light which is not seen by human eyes from producing an image on the image plane 180.

Exemplary embodiments of each lens element of the optical imaging lens 1 which may be constructed by plastic material will now be described with reference to the drawings.

An example embodiment of the first lens element 110 may have positive refracting power. The object-side surface 111 may be a convex surface comprising a convex portion 1111 in a vicinity of the optical axis and a convex portion 1112 in a vicinity of a periphery of the first lens element 110. The image-side surface 112 may be a convex surface comprising a convex portion 1121 in a vicinity of the optical axis and a convex portion 1122 in a vicinity of the periphery of the first lens element 110. The object-side surface 111 and the image-side surface 112 may be aspherical surfaces.

An example embodiment of the second lens element 120 may have negative refracting power. The object-side surface 121 may comprise a convex portion 1211 in a vicinity of the optical axis and a concave portion 1212 in a vicinity of a periphery of the second lens element 120. The image-side surface 122 may have a concave surface comprising a concave portion 1221 in a vicinity of the optical axis and a concave portion 1222 in a vicinity of the periphery of the second lens element 120. The object-side surface 121 and the image-side surface 122 may be aspherical surfaces.

An example embodiment of the third lens element 130 may have positive refracting power. The object-side surface 131 may have a convex surface comprising a convex portion 1311 in a vicinity of the optical axis and a convex portion 1312 in a vicinity of a periphery of the third lens element 130. The image-side surface 132 may comprise a convex portion 1321 in a vicinity of the optical axis and a concave portion 1322 in a vicinity of the periphery of the third lens element 130. The object-side surface 131 and the image-side surface 132 may be aspherical surfaces.

An example embodiment of the fourth lens element 140 may have positive refracting power. The object-side surface 141 may be a concave surface comprising a concave portion 1411 in a vicinity of the optical axis and a concave portion 1412 in a vicinity of a periphery of the fourth lens element 140. The image-side surface 142 may comprise a convex portion 1421 in a vicinity of the optical axis and a concave portion 1422 in a vicinity of the periphery of the fourth lens element 140. The object-side surface 141 and the image-side surface 142 may be aspherical surfaces.

An example embodiment of the fifth lens element 150 may have negative refracting power. The object-side surface 151 may comprise a convex portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of the periphery of the fifth lens element 150. The object-side surface 151 and the image-side surface 152 may be aspherical surfaces.

An example embodiment of the sixth lens element 160 may comprise negative refracting power. The object-side surface 161 may comprise a convex portion 1611 in a vicinity of the optical axis and a concave portion 1612 in a vicinity of a periphery of the sixth lens element 160. The image-side surface 162 may comprise a concave portion 1621 in a vicinity of the optical axis and a convex portion 1622 in a vicinity of the periphery of the sixth lens element 160. The object-side surface 161 and the image-side surface 162 may be aspherical surfaces.

In example embodiments, air gaps may exist or be disposed between the lens elements 110, 120, 130, 140, 150, 160, the filtering unit 170 and the image plane 180 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170 and the air gap d7 existing between the filtering unit 170 and the image plane 180 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45, the air gap d5 is denoted by G56 and the sum of d1, d2, d3, d4 and d5 is denoted by AAG.

FIG. 8 depicts the optical characteristics of each lens elements in the optical imaging lens 1 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 111 of the first lens element 110 to the image plane 180 along the optical axis may be about 4.132 mm, the image height may be about 2.3 mm. The length of the optical imaging lens 1 may be shortened compared with conventional optical imaging lenses.

The aspherical surfaces may include the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160 are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 9.

FIG. 7(a) shows the longitudinal spherical aberration, wherein the transverse axis of FIG. 7(a) defines the focus, and the lengthwise axis of FIG. 7(a) defines the filed. From the vertical deviation of each curve shown in FIG. 7(a), the offset of the off-axis light relative to the image point may be within about ±0.025 mm. Therefore, the first embodiment may improve the longitudinal spherical aberration with respect to different wavelengths. Furthermore, the curves of different wavelengths may be closed to each other, and this situation may represent that off-axis light with respect to these wavelengths is focused around an image point, and the aberration can be improved.

FIGS. 7(b) and 7(c) respectively show the astigmatism aberration in the sagittal direction and astigmatism aberration in the tangential direction, wherein the transverse axis of FIG. 7(b) defines the focus, the lengthwise axis of FIG. 7(b) defines the image height, the transverse axis of FIG. 7(c) defines the focus, the lengthwise axis of FIG. 7(c) defines the image height. Referring to FIG. 7(b), the focus variation with respect to the three different wavelengths (470 nm, 555 nm, 650 nm) in the whole field may fall within about ±0.06 mm. Referring to FIG. 7(c), the focus variation with respect to the three different wavelengths (470 nm, 555 nm, 650 nm) in the whole field may fall within about +0.05 mm. Therefore, the optical imaging lens 1 may indeed eliminate aberration effectively. Additionally, the three curves presenting different wavelengths may be closed to each other, and these closed curves may represent that the dispersion is improved.

Please refer to FIG. 7(d), the transverse axis of FIG. 7(d) defines the percentage, the lengthwise axis of FIG. 7(d) defines the image height, and the image height may be about 3.085 mm. The variation of the distortion aberration may be within about ±0.7%.

Reference is now made to FIGS. 10-13. FIG. 10 illustrates an example cross-sectional view of an optical imaging lens 2 having six lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, a fifth lens element 250, and a sixth lens element 260.

The differences between the second embodiment and the first embodiment may include the radius of curvature and thickness of each lens element, the aspherical data, the back focal length, and the configuration of the concave/convex shape of the object-side surface 241 and the image-side surfaces 222, 242, but the configuration of the positive/negative refracting power of the first, second, third, fourth, fifth lens elements, and sixth lens element 210, 220, 230, 240, 250, 260 and configuration of the concave/convex shape of surfaces comprising the object-side surfaces 211, 221, 231, 251, 261 facing to the object side A1 and the image-side surfaces 212, 232, 252, 262 facing to the image side A2 may be similar to those in the first embodiment. Here, for clearly showing the drawings of the present embodiment, only the surface shapes which are different from that in the first embodiment are labeled. Specifically, the image-side surface 222 of the second lens element 220 may comprise a convex portion 2222 in a vicinity of a periphery of the second lens element 220, and the object-side surface 241 of the fourth lens element 240 may comprise a convex portion 2412 in a vicinity of a periphery of the fourth lens element 240, and the image-side surface 242 of the fourth lens element 240 may comprise a convex portion 2422 in the vicinity of the periphery of the fourth lens element 240.

Please refer to FIG. 12 for the optical characteristics of each lens elements in the optical imaging lens 2 the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 211 of the first lens element 210 to the image plane 280 along the optical axis may be about 4.132 mm, image height may be about 2.3 mm, and the length of the length of the optical imaging lens 2 may be shortened compared with conventional optical imaging lenses.

FIG. 11(a) shows the longitudinal spherical aberration. From the vertical deviation of each curve shown in FIG. 11(a), the offset of the off-axis light relative to the image point may be within about ±0.02 mm. Furthermore, the three curves having different wavelengths may be closed to each other, and this situation may represent that off-axis light with respect to these wavelengths may be focused around an image point, and the aberration can be improved obviously.

FIGS. 11(b) and 11(c) respectively show the astigmatism aberration in the sagittal direction and astigmatism aberration in the tangential direction, Referring to FIG. 11(b), the focus variation with respect to the three different wavelengths (470 nm, 555 nm, 650 nm) in the whole field may fall within about ±0.08 mm. Referring to FIG. 11(c), the focus variation with respect to the three different wavelengths (470 nm, 555 nm, 650 nm) in the whole field may fall within about ±0.06 mm. Additionally, the three curves presenting different wavelengths may be closed to each other, and these closed curves may represent that the dispersion is improved.

Please refer to FIG. 11(d), the variation of the distortion aberration of the optical imaging lens 2 may be within about ±0.8%.

Therefore, the optical imaging lens 2 of the present embodiment may exhibit improved characteristics in the longitudinal spherical aberration, astigmatism in the sagittal direction, astigmatism in the tangential direction, and distortion aberration. According to above illustration, the optical imaging lens 2 of the example embodiment may indeed achieve improved optical performance and the length of the optical imaging lens 2 may be effectively shortened.

Figure 14:
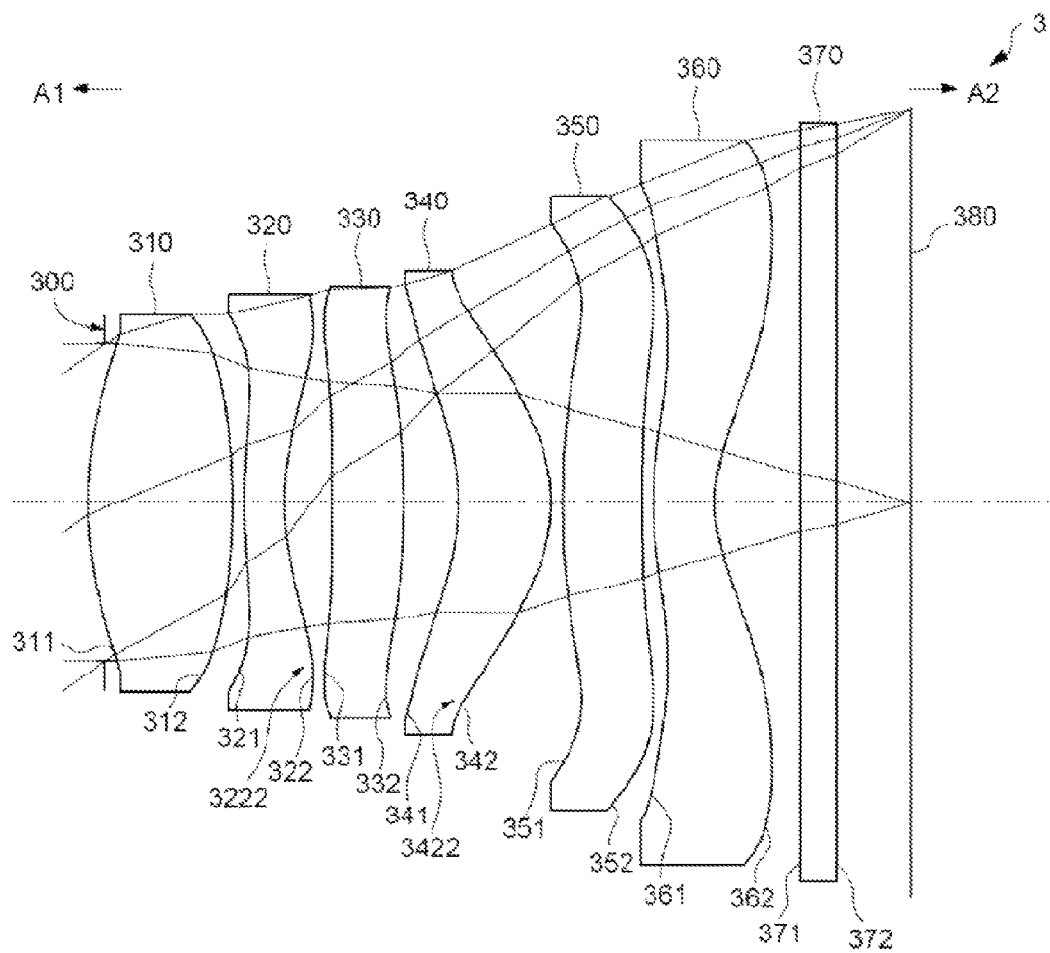
FIG. 14 is a cross-sectional view of a third embodiment of an optical imaging lens having six lens elements according to the present disclosure.
Figure 15:
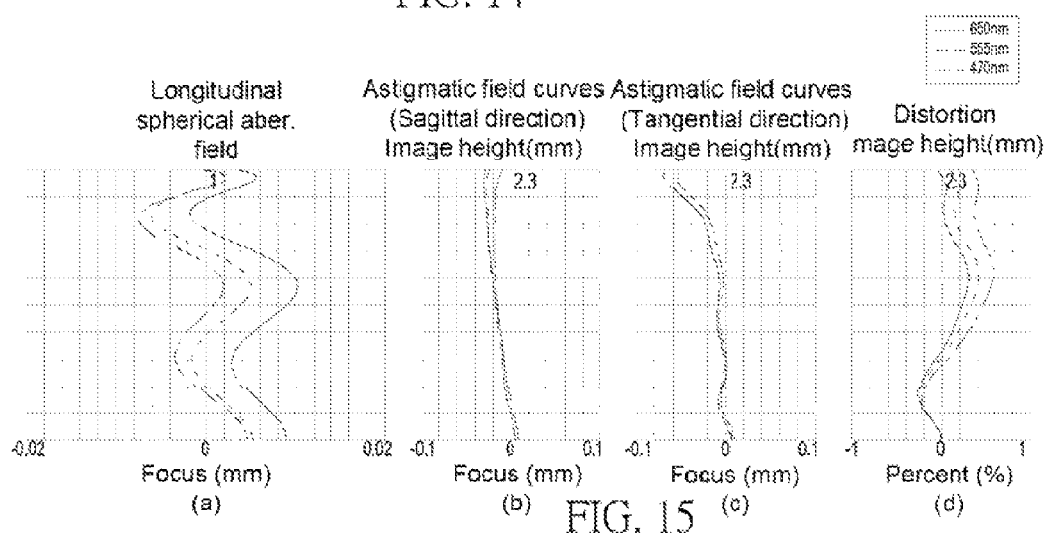
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having six lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise an aperture stop 300, a first lens element 310, a second lens element 320, a third lens element 330, a fourth lens element 340, a fifth lens element 350, and a sixth lens element 360.

The differences between the third embodiment and the first embodiment may include the radius of curvature and thickness of each lens element, the aspherical data, the back focal length, the configuration of the positive/negative refracting power of the fifth lens element 350 and the configuration of the concave/convex shape of surfaces comprising the image-side surface 322, 342, but the configuration of the positive/negative refracting power of the first, second, third, fourth, and sixth lens element 310, 320, 330, 340, 350, 360 and configuration of the concave/convex shape of surfaces comprising the object-side surfaces 311, 321, 331, 341, 351, 361 facing to the object side A1 and the image-side surfaces 312, 332, 352, 362 facing to the image side A2, may be similar to those in the first embodiment. Here, for clearly showing the drawings of the present embodiment, only the surface shapes which are different from that in the first embodiment are labeled. Specifically, the image-side surface 322 of the second lens element 320 may comprise a convex portion 3222 in a vicinity of a periphery of the second lens element 320; the image-side surface 342 of the fourth lens element 340 may comprise a convex portion 3422 in the vicinity of the periphery of the fourth lens element 340; the fifth lens element 350 may have positive refracting power.

FIG. 16 depicts the optical characteristics of each lens elements in the optical imaging lens 3 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 311 of the first lens element 310 to the image plane 380 along the optical axis may be about 4.804 mm, the image height may be about 2.3 mm and the length of the optical imaging lens 3 may be shortened compared with conventional optical imaging lenses.

FIG. 15(a) shows the longitudinal spherical aberration. From the vertical deviation of each curve shown in FIG. 15(a), the offset of the off-axis light relative to the image point may be within about ±0.016 mm. Furthermore, the three curves having different wavelengths are closed to each other, and this situation may represent that off-axis light with respect to these wavelengths is focused around an image point, and the aberration may be improved.

FIGS. 15(b) and 15(c) respectively show the astigmatism aberration in the sagittal direction and astigmatism aberration in the tangential direction. Referring to FIG. 15(b), the focus variation with respect to the three different wavelengths (470 nm, 555 nm, 650 nm) in the whole field may fall within about ±0.04 mm. Referring to FIG. 15(c), the focus variation with respect to the three different wavelengths (470 nm, 555 nm, 650 nm) in the whole field may fall within about ±0.08 mm. Additionally, the three curves presenting different wavelengths may be closed to each other, and these closed curves may represent that the dispersion is improved.

Please refer to FIG. 15(d), the variation of the distortion aberration of the optical imaging lens 3 may be within about ±0.6%.

Figure 18:
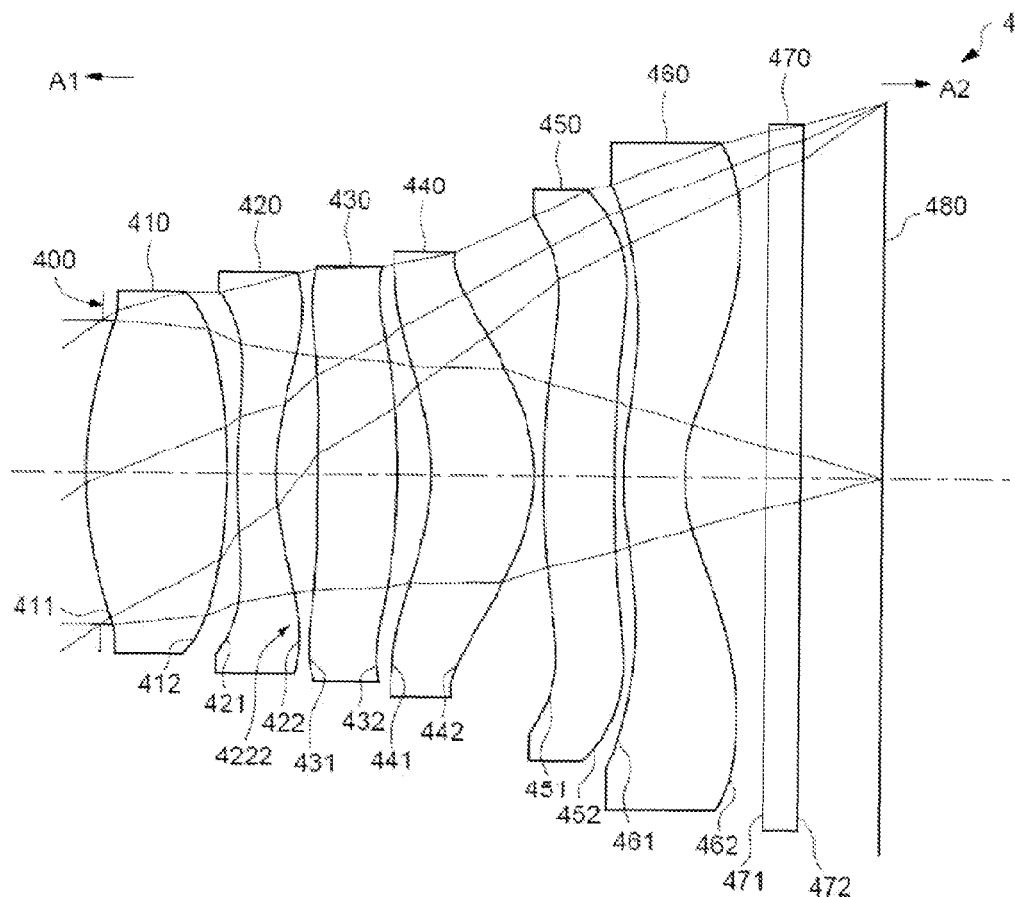
FIG. 18 is a cross-sectional view of a fourth embodiment of an optical imaging lens having six lens elements according to the present disclosure.
Figure 19:
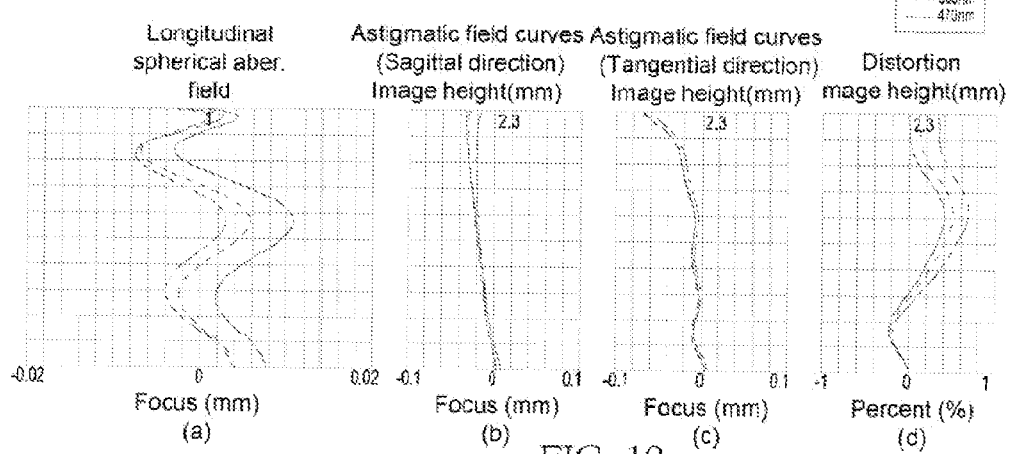
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having six lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 44, a fifth lens element 450, and a sixth lens element 460.

The differences between the fourth embodiment and the first embodiment may include the radius of curvature and thickness of each lens element, the aspherical data, back focal length, the configuration of the positive/negative refracting power of the fifth lens element 450, and the configuration of the concave/convex shape of the image-side surface 422, but the configuration of the positive/negative refracting power of the first, second, third, fourth and sixth lens elements 410, 420, 430, 440, 460 and configuration of the concave/convex shape of surfaces, comprising the object-side surfaces 411, 421, 441, 451, 461 facing to the object side A1 and the image-side surfaces 412, 432, 442, 452, 462 facing to the image side A2, may be similar to those in the first embodiment. Here, for clearly showing the drawings of the present embodiment, only the surface shapes which are different from that in the first embodiment are labeled. Specifically, the image-side surface 422 of the second lens element 420 may comprise a convex portion 4222 in a vicinity of a periphery of the second lens element 420; the fifth lens element 450 has positive refracting power.

FIG. 20 depicts the optical characteristics of each lens elements in the optical imaging lens 4 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 411 of the first lens element 410 to the image plane 480 along the optical axis may be about 4.896 mm, image height may be about 2.3 mm, and the length of the optical imaging lens 4 may be shortened compared with conventional optical imaging lenses.

FIG. 19(a) shows the longitudinal spherical aberration. From the vertical deviation of each curve shown in FIG. 19(a), the offset of the off-axis light relative to the image point may be within about ±0.016 mm. Furthermore, the three curves having different wavelengths may be closed to each other, and this situation may represent that off-axis light with respect to these wavelengths is focused around an image point, and the aberration can be improved.

FIGS. 19(b) and 19(c) respectively show the astigmatism aberration in the sagittal direction and astigmatism aberration in the tangential direction. Referring to FIG. 19(b), the focus variation with respect to the three different wavelengths (470 nm, 555 nm, 650 nm) in the whole field may fall within about ±0.04 mm. Referring to FIG. 19(c), the focus variation with respect to the three different wavelengths (470 nm, 555 nm, 650 nm) in the whole field may fall within about ±0.08 mm. Additionally, the three curves presenting different wavelengths may be closed to each other, and these closed curves represents that the dispersion is improved.

Please refer to FIG. 19(d), the variation of the distortion aberration of the optical imaging lens 4 may be within about ±0.7%.

Figure 22:
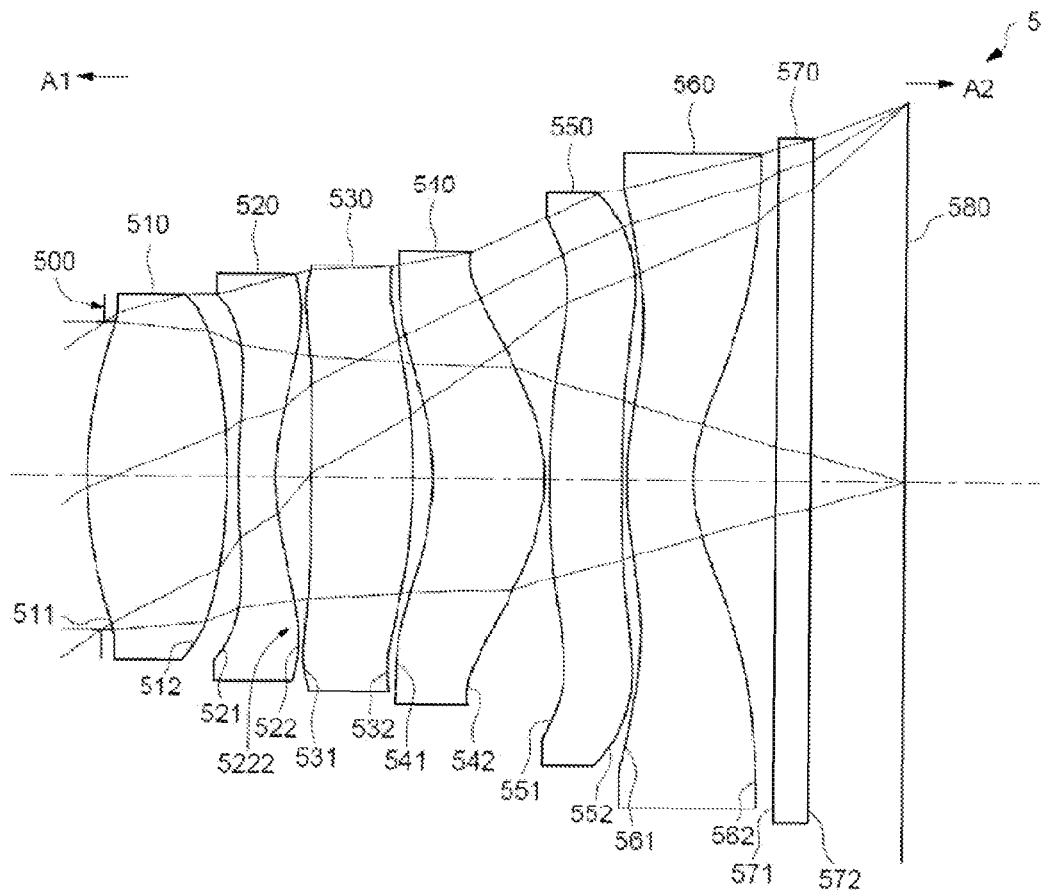
FIG. 22 is a cross-sectional view of a fifth embodiment of an optical imaging lens having six lens elements according to the present disclosure.
Figure 23:
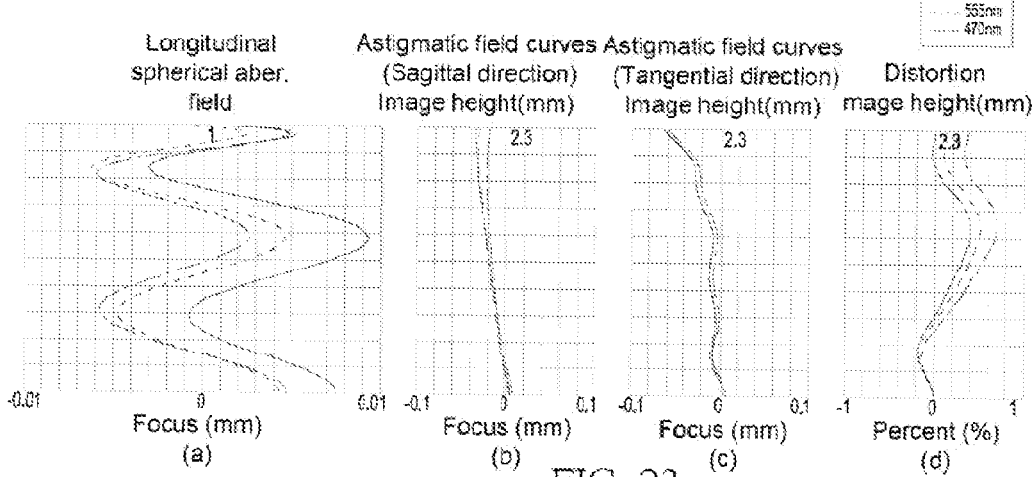
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having six lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, a fifth lens element 550, and a sixth lens element 560.

The differences between the fifth embodiment and the first embodiment may include the radius of curvature and thickness of each lens element, the aspherical data, and back focal length, the configuration of the positive/negative refracting power of the fifth lens element 550, and configuration of the concave/convex shape of the image-side surface 522. But the configuration of the positive/negative refracting power of the first, second, third, fourth and sixth lens elements 510, 520, 530, 540, 560 and configuration of the concave/convex shape of surfaces comprising the object-side surfaces 511, 521, 531, 541, 551, 561 facing to the object side A1 and the image-side surfaces 512, 532, 542, 552, 562 facing to the image side A2, may be similar to those in the first embodiment. Here, for clearly showing the drawings of the present embodiment, only the surface shapes which are different from that in the first embodiment are labeled. Specifically, the image-side surface 522 of the second lens element 520 comprises a convex portion 5222 in a vicinity of a periphery of the second lens element 520; the fifth lens element 550 has positive refracting power.

FIG. 24 depicts the optical characteristics of each lens elements in the optical imaging lens 5 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 511 of the first lens element 510 to the image plane 580 along the optical axis may be about 4.955 mm, the image height may be about 2.3 mm, and the length of the optical imaging lens 5 may be shortened compared with conventional optical imaging lenses and even with the optical imaging lens 5 of the first embodiment. Thus, the optical imaging lens 5 may be capable of providing excellent imaging quality for smaller sized mobile devices.

FIG. 23(a) shows the longitudinal spherical aberration of the first embodiment. From the vertical deviation of each curve shown in FIG. 23(a), the offset of the off-axis light relative to the image point may be within about ±0.01 mm. Furthermore, the three curves having different wavelengths may be closed to each other, and this situation may represent that off-axis light with respect to these wavelengths is focused around an image point, and the aberration can be improved obviously.

FIGS. 23(b) and 23(c) respectively show the astigmatism aberration in the sagittal direction and astigmatism aberration in the tangential direction. Referring to FIG. 23(b), the focus variation with respect to the three different wavelengths (470 nm, 555 nm, 650 nm) in the whole field may fall within about ±0.04 mm. Referring to FIG. 23(c), the focus variation with respect to the three different wavelengths (470 nm, 555 nm, 650 nm) in the whole field may fall within about ±0.08 mm. Additionally, the three curves presenting different wavelengths may be closed to each other, and these closed curves may represent that the dispersion is improved.

Please refer to FIG. 23(d), the variation of the distortion aberration of the optical imaging lens 5 may be within about ±0.8%.

Figure 26:
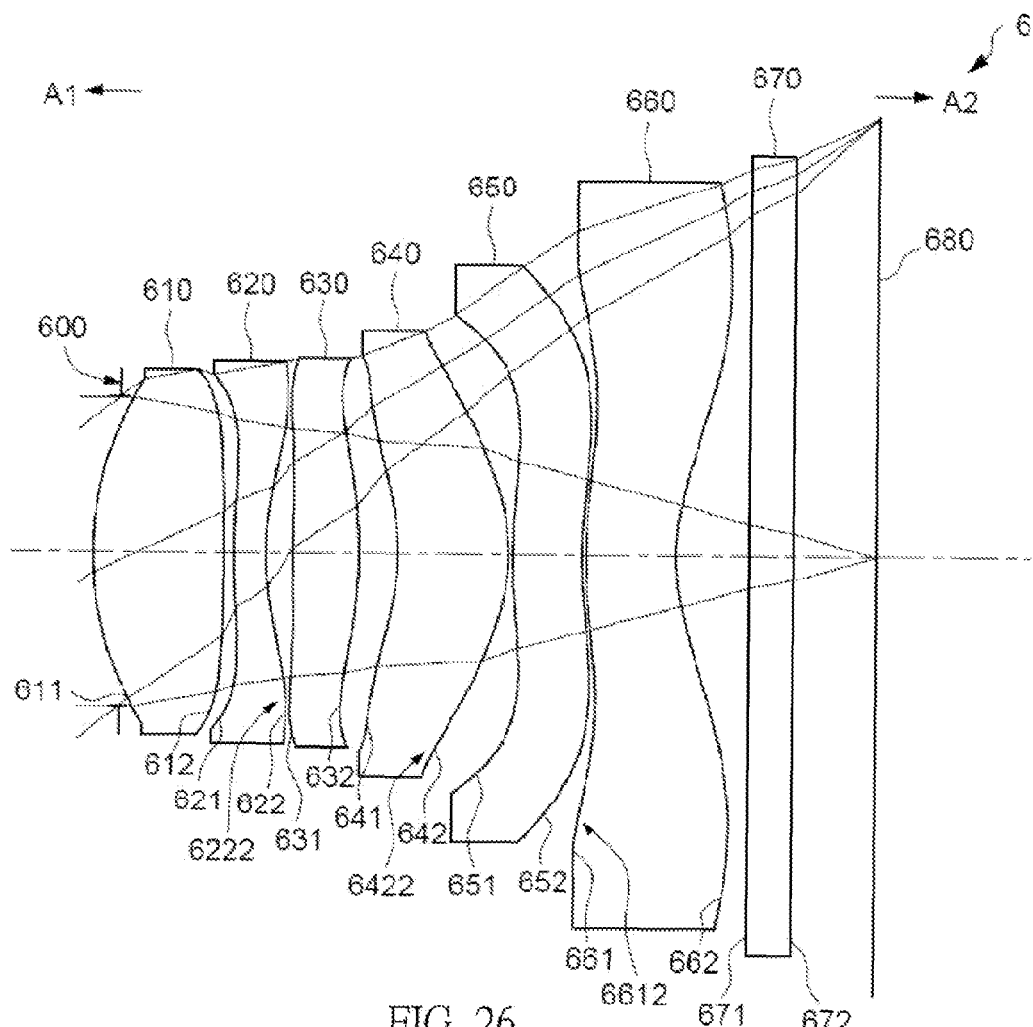
FIG. 26 is a cross-sectional view of a sixth embodiment of an optical imaging lens having six lens elements according to the present disclosure.
Figure 27:
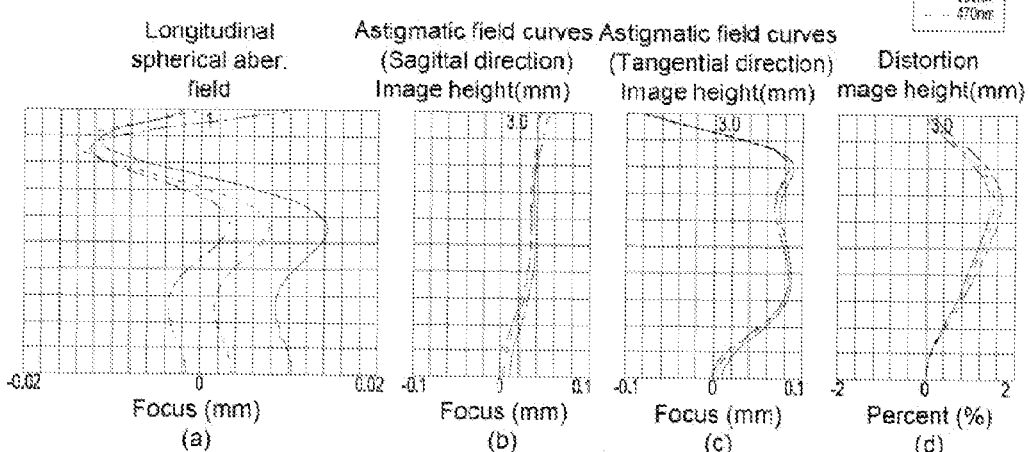
FIG. 27 is a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having six lens elements of the optical imaging lens 6 according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650 and a sixth lens element 660. The differences between the sixth embodiment and the first embodiment may include the radius of curvature and thickness of each lens element, the aspherical data, back focal length, and the configuration of the concave/convex shape of the object-side surface 661 and the image-side surfaces 622, 642, but the configuration of the positive/negative refracting power of the first, second, third, fourth, fifth, and sixth lens elements 610, 620, 630, 640, 650, 660 and configuration of the concave/convex shape of surfaces, comprising the object-side surfaces 611, 621, 631, 641, 651 facing to the object side A1 and the image-side surfaces 612, 632, 642, 652, 662 facing to the image side A2, may be similar to those in the first embodiment. Here, for clearly showing the drawings of the present embodiment, only the surface shapes which are different from that in the first embodiment are labeled. Specifically, the image-side surface 622 of the second lens element 620 may comprise a convex portion 6222 in a vicinity of a periphery of the second lens element 620, the image-side surface 642 of the fourth lens element 640 may comprise a convex portion 6422 in the vicinity of a periphery of the fourth lens element 640, and the object-side surface 661 of the sixth lens element 660 may comprise a convex portion 6612 in the vicinity of a periphery of the sixth lens element 660.

FIG. 28 depicts the optical characteristics of each lens elements in the optical imaging lens 6 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 611 of the first lens element 610 to the image plane 680 along the optical axis may be about 5.384 mm, the image height may be about 3.0 mm, and the length of the optical imaging lens 6 may be shortened compared with conventional optical imaging lenses. Thus, the optical imaging lens 6 may be capable of providing excellent imaging quality for smaller sized mobile devices.

FIG. 27(a) shows the longitudinal spherical aberration. From the vertical deviation of each curve shown in FIG. 27(a), the offset of the off-axis light relative to the image point may be within about ±0.018 mm. Furthermore, the three curves having different wavelengths may be closed to each other, and this situation may represent that off-axis light with respect to these wavelengths is focused around an image point, and the aberration can be improved obviously.

FIGS. 27(b) and 27(c) respectively show the astigmatism aberration in the sagittal direction and astigmatism aberration in the tangential direction. Referring to FIG. 27(b), the focus variation with respect to the three different wavelengths (470 nm, 555 nm, 650 nm) in the whole field may fall within about ±0.06 mm. Referring to FIG. 23(c), the focus variation with respect to the three different wavelengths (470 nm, 555 nm, 650 nm) in the whole field may fall within about ±0.08 mm. Additionally, the three curves presenting different wavelengths may be closed to each other, and these closed curves may represent that the dispersion is improved.

Please refer to FIG. 27(d), the variation of the distortion aberration of the optical imaging lens 6 may be within about ±2%.

Figure 30:
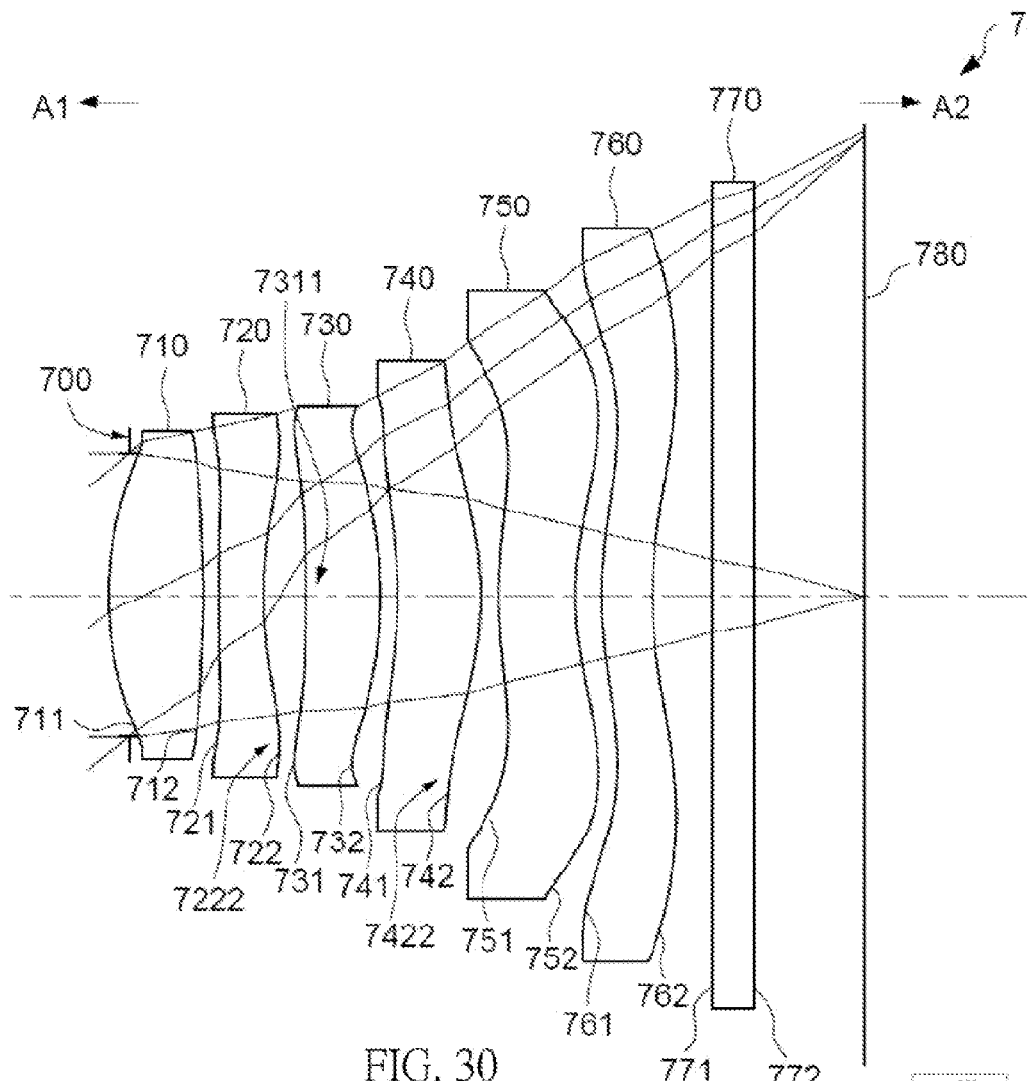
FIG. 30 is a cross-sectional view of a seventh embodiment of an optical imaging lens having six lens elements according to the present disclosure.
Figure 31:
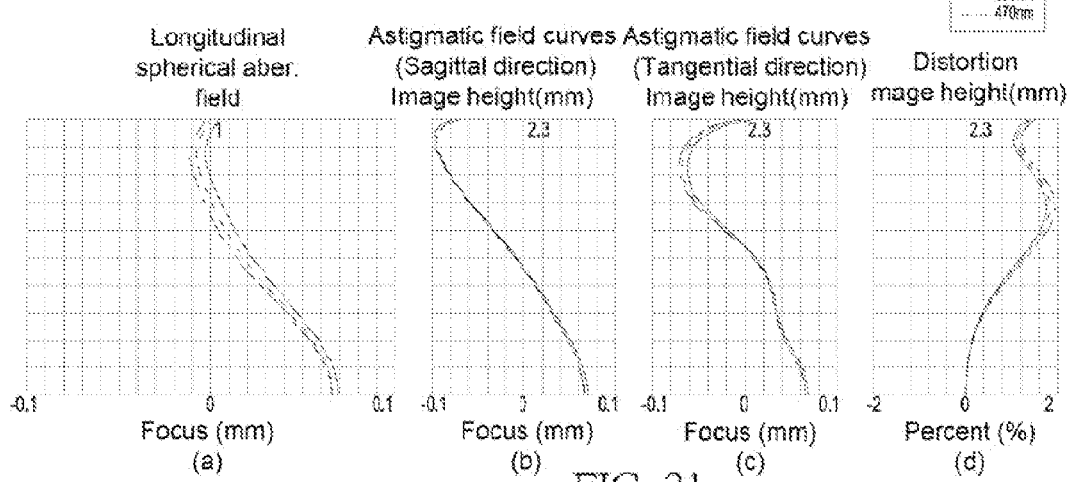
FIG. 31 is a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having six lens elements of the optical imaging lens 7 according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, a fifth lens element 750, and a sixth lens element 760.

The differences between the seventh embodiment and the first embodiment may include the radius of curvature, thickness of each lens element, the aspherical data, back focal length, and the configuration of the concave/convex shape of the object-side surface 731 and the image-side surfaces 722, 742 but the configuration of the positive/negative refracting power of the first, second, third, fourth, fifth and sixth lens elements 710, 720, 730, 740, 750, 760 and configuration of the concave/convex shape of surfaces, comprising the object-side surfaces 711, 721, 741, 751, 761 facing to the object side A1 and the image-side surfaces 712, 732, 752, 762 facing to the image side A2, may be similar to those in the first embodiment. Here, for clearly showing the drawings of the present embodiment, only the surface shapes which are different from that in the first embodiment are labeled. Specifically, the image-side surface 722 of the second lens element 720 may comprise a convex portion 7222 in a vicinity of a periphery of the second lens element 720; the object-side surface 731 of the third lens element 730 may comprise a concave portion 7311 in a vicinity of the optical axis; and the image-side surface 742 of the fourth lens element 740 may comprise a convex portion 7422 in a vicinity of a periphery of the fourth lens element 740.

FIG. 32 depicts the optical characteristics of each lens elements in the optical imaging lens 1 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 711 of the first lens element 710 to the image plane 780 along the optical axis may be about 3.782 mm, the image height may be about 2.3 mm, and the length of the optical imaging lens 7 may be shortened compared with conventional optical imaging lenses.

FIG. 31(*a*) shows the longitudinal spherical aberration. From the vertical deviation of each curve shown in FIG. 31(*a*), the offset of the off-axis light relative to the image point may be within about ±0.07 mm. Furthermore, the three curves having different wavelengths may be closed to each other, and this situation may represent that off-axis light with respect to these wavelengths is focused around an image point, and the aberration can be improved obviously.

FIGS. 31(*b*) and 31(*c*) respectively show the astigmatism aberration in the sagittal direction and astigmatism aberration in the tangential direction. Referring to FIG. 31(*b*), the focus variation with respect to the three different wavelengths (470 nm, 555 nm, 650 nm) in the whole field may fall within about +0.1 mm. Referring to FIG. 31(*c*), the focus variation with respect to the three different wavelengths (470 nm, 555 nm, 650 nm) in the whole field may fall within about ±0.08 mm. Additionally, the three curves presenting different wavelengths may be closed to each other, and these closed curves may represent that the dispersion is improved.

Please refer to FIG. 31(*d*), the variation of the distortion aberration of the optical imaging lens 7 may be within about ±2.0%.

Figure 34:
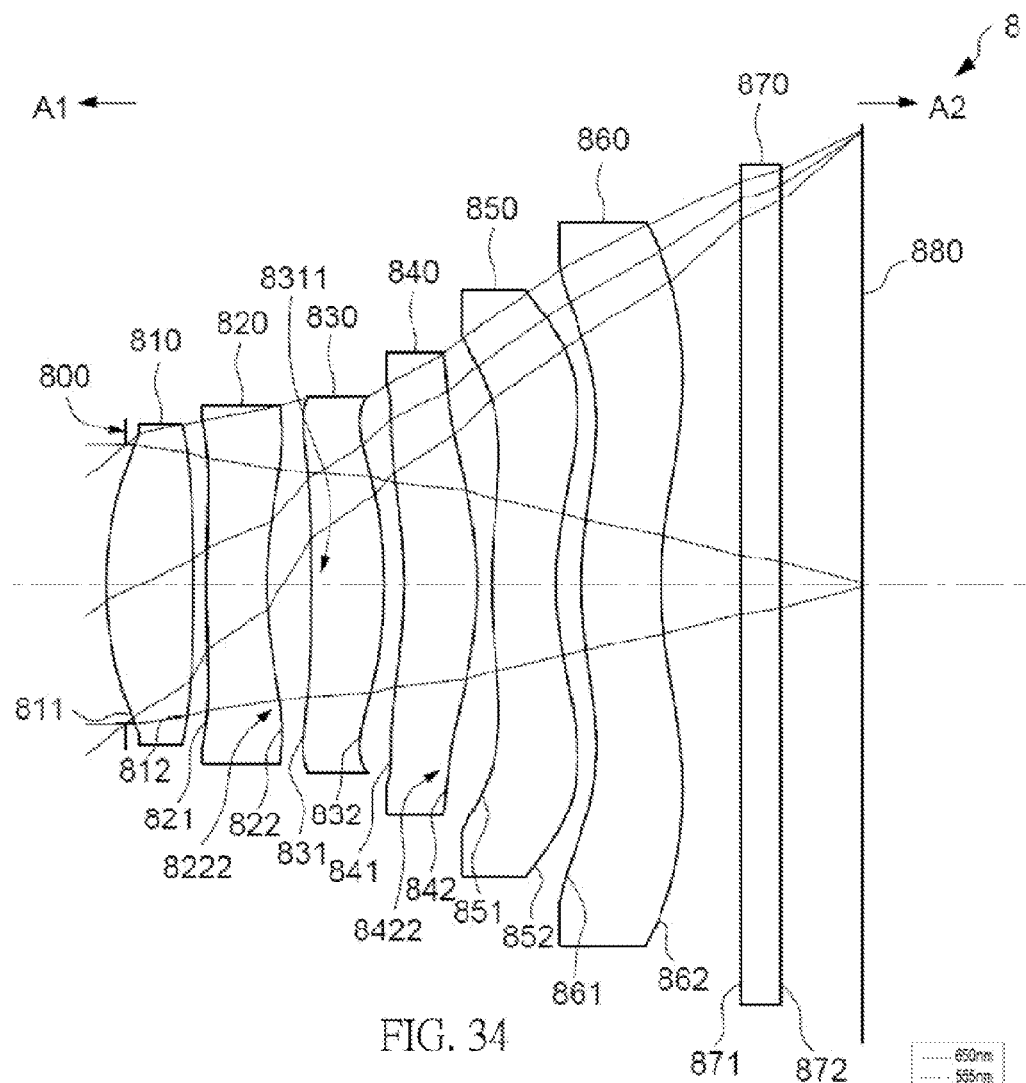
FIG. 34 is a cross-sectional view of a eighth embodiment of an optical imaging lens having six lens elements according to the present disclosure.
Figure 35:
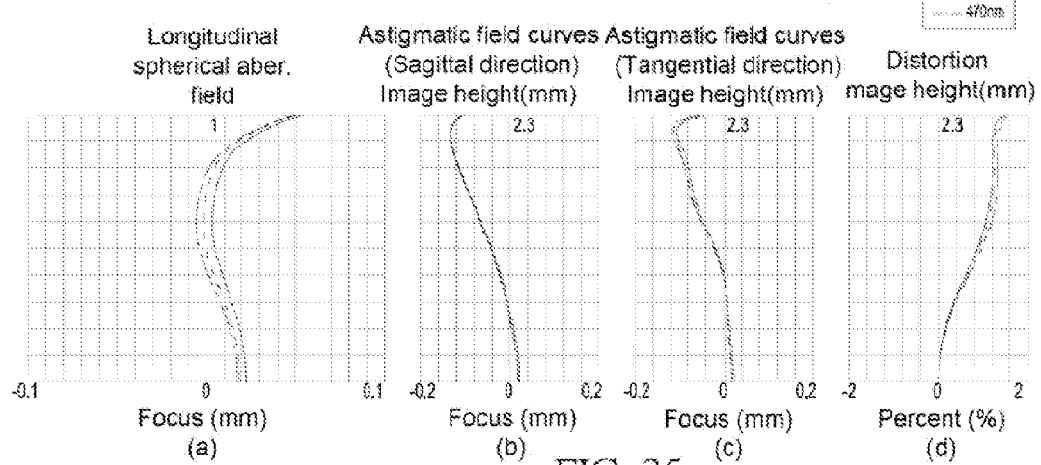
FIG. 35 is a chart of longitudinal spherical aberration and other kinds of optical aberrations of a eighth embodiment of the optical imaging lens according the present disclosure.

Reference is now made to FIGS. 34-37. FIG. 34 illustrates an example cross-sectional view of an optical imaging lens 8 having six lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850, and a sixth lens element 860.

The differences between the eighth embodiment and the first embodiment may include the radius of curvature and thickness of each lens element, the aspherical data, back focal length, the configuration of the positive/negative refracting power of the sixth lens element 860, and the configuration of the concave/convex shape of the object-side surface 831 and image-side surfaces 822, 842, but the configuration of the positive/negative refracting power of the first, second, third, fourth, and fifth lens elements 810, 820, 830, 840, 850 and configuration of the concave/convex shape of surfaces, comprising the object-side surfaces 811, 821, 841, 851, 861 facing to the object side A1 and the image-side surfaces 812, 832, 852, 862 facing to the image side A2, may be similar to those in the first embodiment. Here, for clearly showing the drawings of the present embodiment, only the surface shapes which are different from that in the first embodiment are labeled. Specifically, the image-side surface 822 of the second lens element 820 may comprise a convex portion 8222 in a vicinity of a periphery of the second lens element 820; the object-side surface 831 of the third lens element 830 may comprise a concave portion 8311 in a vicinity of the optical axis; the image-side surface 842 of the fourth lens element 840 may comprise a convex portion 8422 in the vicinity of a periphery of the fourth lens element 840, and the sixth lens element 860 may have positive refracting power.

FIG. 36 depicts the optical characteristics of each lens elements in the optical imaging lens 8 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 811 of the first lens element 810 to the image plane 880 along the optical axis may be about 3.840 mm, the image height may be about 2.3 mm, and the length of the optical imaging lens 8 may be shortened compared with conventional optical imaging lenses. Thus, the optical imaging lens 8 may be capable of providing excellent imaging quality for smaller sized mobile devices.

FIG. 35(a) shows the longitudinal spherical aberration. From the vertical deviation of each curve shown in FIG. 35(a), the offset of the off-axis light relative to the image point may be within about ±0.06 mm. Furthermore, the three curves having different wavelengths may be closed to each other, and this situation may represent that off-axis light with respect to these wavelengths is focused around an image point, and the aberration may be improved.

FIGS. 35(b) and 35(c) respectively show the astigmatism aberration in the sagittal direction and astigmatism aberration in the tangential direction. Referring to FIG. 35(b), the focus variation with respect to the three different wavelengths (470 nm, 555 nm, 650 nm) in the whole field may fall within about ±0.18 mm. Referring to FIG. 35(c), the focus variation with respect to the three different wavelengths (470 nm, 555 nm, 650 nm) in the whole field may fall within about ±0.16 mm. Additionally, the three curves presenting different wavelengths may be closed to each other, and these closed curves may represent that the dispersion is improved.

Please refer to FIG. 35(d), the variation of the distortion aberration of the optical imaging lens 8 may be within about ±1.8%.

Figure 38:
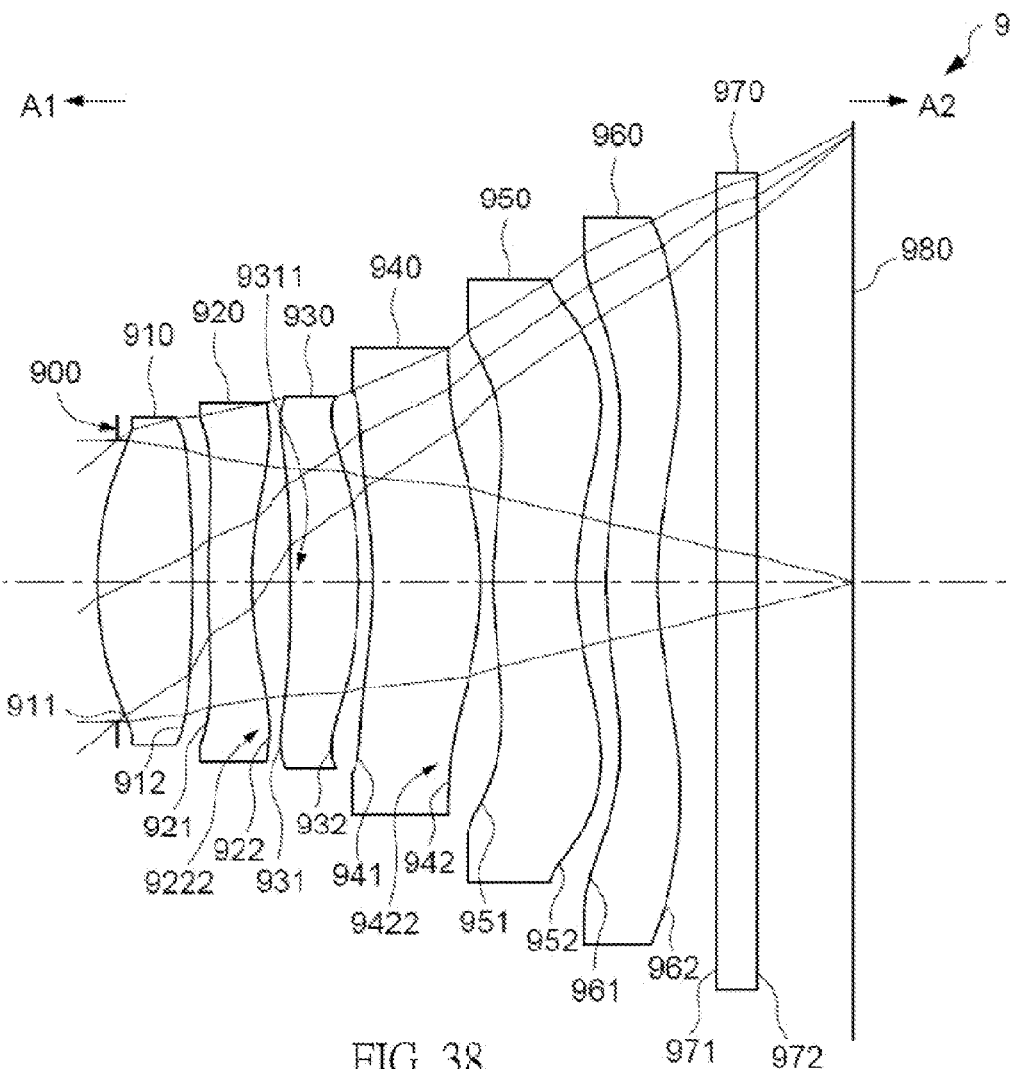
FIG. 38 is a cross-sectional view of a ninth embodiment of an optical imaging lens having six lens elements according to the present disclosure.
Figure 39:
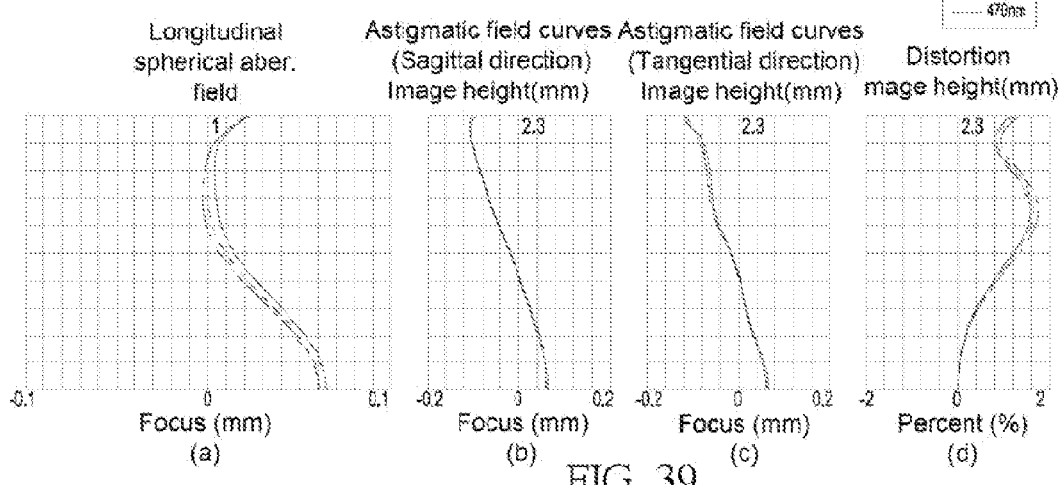
FIG. 39 is a chart of longitudinal spherical aberration and other kinds of optical aberrations of a ninth embodiment of the optical imaging lens according the present disclosure.

Reference is now made to FIGS. 38-41. FIG. 38 illustrates an example cross-sectional view of an optical imaging lens 9 having six lens elements of the optical imaging lens 9 according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950, and a sixth lens element 960.

The differences between the ninth embodiment and the first embodiment are the radius of curvature and thickness of each lens element, the aspherical data, back focal length, and the configuration of the concave/convex shape of the object-side surface 931 and image-side surfaces 922, 942, but the configuration of the positive/negative refracting power of the first, second, third, fourth, fifth, and sixth lens elements 910, 920, 930, 940, 950, 960 and configuration of the concave/convex shape of surfaces, comprising the object-side surfaces 911, 921, 941, 951, 961 facing to the object side A1 and the image-side surfaces 912, 932, 952, 962 facing to the image side A2, may be similar to those in the first embodiment. Here, for clearly showing the drawings of the present embodiment, only the surface shapes which are different from that in the first embodiment are labeled. Specifically, the image-side surface 922 of the second lens element 920 may comprise a convex portion 9222 in a vicinity of a periphery of the second lens element 920; the object-side surface 931 of the third lens element 930 may comprise a concave portion 9311 in a vicinity of the optical axis; and the image-side surface 942 of the fourth lens element 940 may comprise a convex portion 9422 in a vicinity of a periphery of the fourth lens element 940.

FIG. 40 depicts the optical characteristics of each lens elements in the optical imaging lens 9 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 911 of the first lens element 910 to the image plane 980 along the optical axis may be about 3.862 mm, the image height may be about 2.3 mm, and the length of the optical imaging lens 9 may be shortened compared with conventional optical imaging lenses. Thus, the optical imaging lens 9 may be capable of providing excellent imaging quality for smaller sized mobile devices.

FIG. 39(a) shows the longitudinal spherical aberration. From the vertical deviation of each curve shown in FIG. 39(a), the offset of the off-axis light relative to the image point may be within about ±0.07 mm. Furthermore, the three curves having different wavelengths may be closed to each other, and this situation may represent that off-axis light with respect to these wavelengths is focused around an image point, and the aberration can be improved.

FIGS. 39(b) and 39(c) respectively show the astigmatism aberration in the sagittal direction and astigmatism aberration in the tangential direction. Referring to FIG. 39(b), the focus variation with respect to the three different wavelengths (470 nm, 555 nm, 650 nm) in the whole field may fall within about ±0.16 mm. Referring to FIG. 39(c), the focus variation with respect to the three different wavelengths (470 nm, 555 nm, 650 nm) in the whole field may fall within about ±0.16 mm. Additionally, the three curves presenting different wavelengths may be closed to each other, and these closed curves may represent that the dispersion is improved.

Please refer to FIG. 39(d), the variation of the distortion aberration of the optical imaging lens 9 may be within about ±2.0%.

Figure 42:
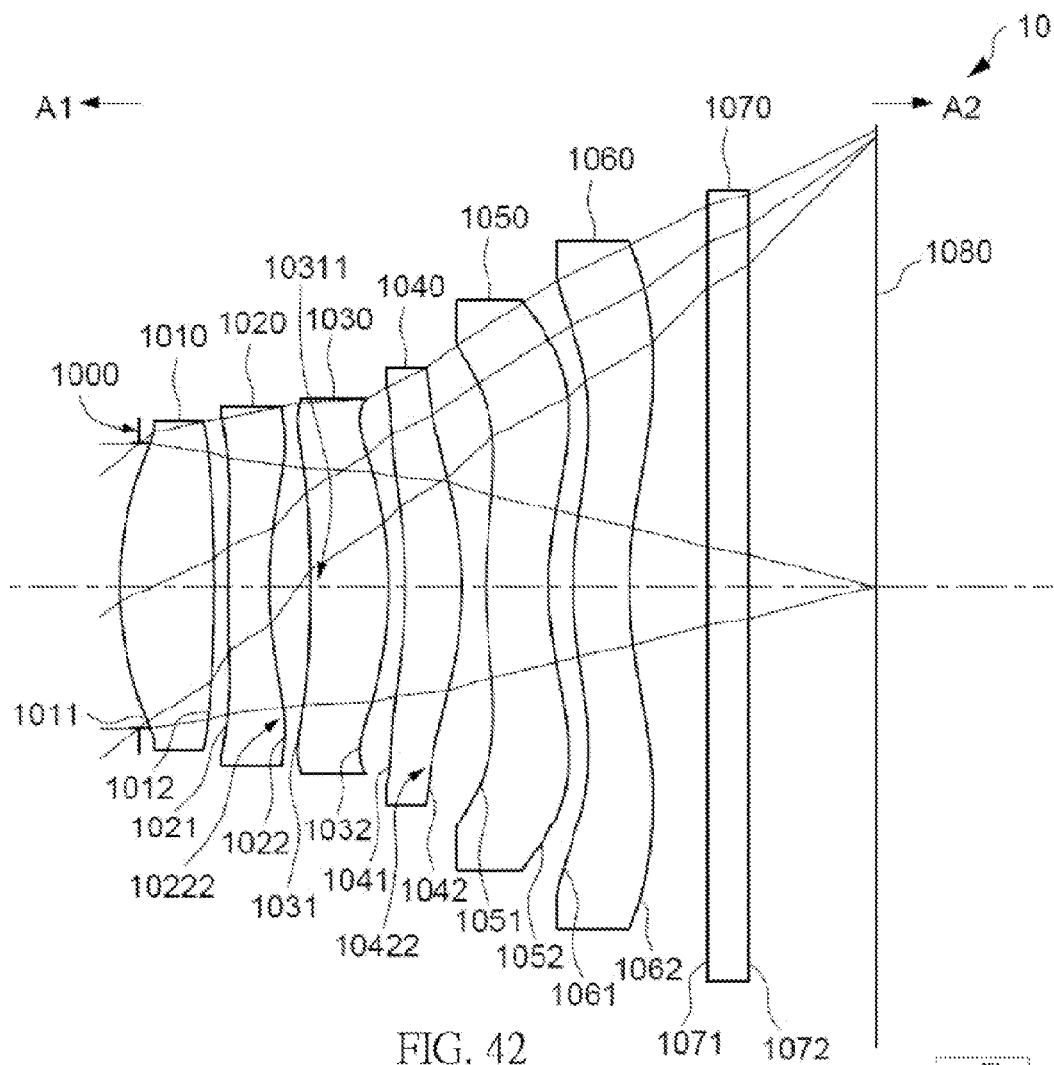
FIG. 42 is a cross-sectional view of a tenth embodiment of an optical imaging lens having six lens elements according to the present disclosure.
Figure 43:
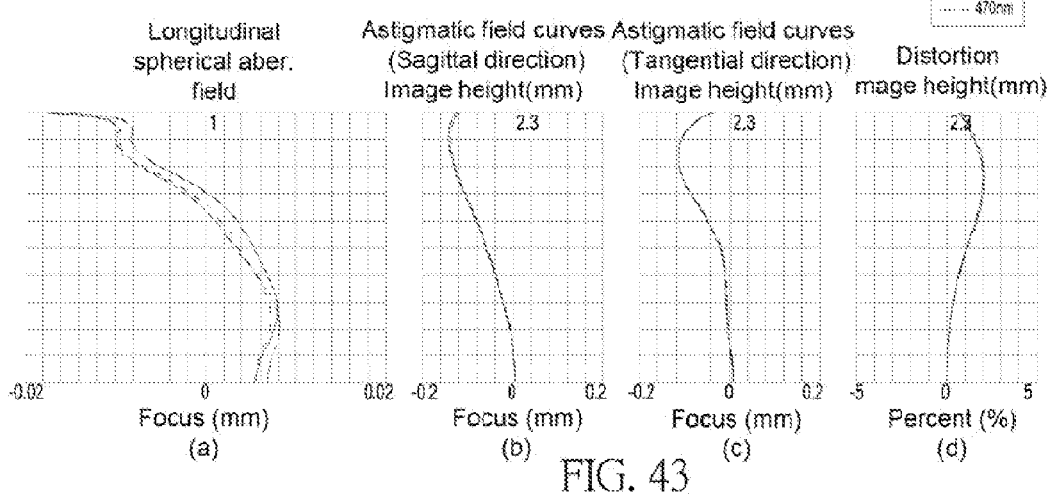
FIG. 43 is a chart of longitudinal spherical aberration and other kinds of optical aberrations of a tenth embodiment of the optical imaging lens according the present disclosure.

Reference is now made to FIGS. 42-45. FIG. 42 illustrates an example cross-sectional view of an optical imaging lens 10 having six lens elements of the optical imaging lens according to a tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise an aperture stop 1000, a first lens element 1010, a second lens element 1020, a third lens element 1030, a fourth lens element 1040, a fifth lens element 1050, and a sixth lens element 1060.

The differences between the tenth embodiment and the first embodiment may include the radius of curvature and thickness of each lens element, the aspherical data, back focal length, the configuration of the positive/negative refracting power of the sixth lens element 1060, and the configuration of the concave/convex shape of the object-side surface 1031 and image-side surfaces 1022, 1042, but the configuration of the positive/negative refracting power of the first, second, third, fourth, and fifth lens elements 1010, 1020, 1030, 1040, 1050 and configuration of the concave/convex shape of surfaces, comprising the object-side surfaces 1011, 1021, 1041, 1051, 1061 facing to the object side A1 and the image-side surfaces 1012, 1032, 1052, 1062 facing to the image side A2, may be similar to those in the first embodiment. Here, for clearly showing the drawings of the present embodiment, only the surface shapes which are different from that in the first embodiment are labeled. Specifically, the image-side surface 1022 of the second lens element 1020 may comprise a convex portion 10222 in a vicinity of a periphery of the second lens element 1020; the object-side surface 1031 of the third lens element 1030 may comprise a concave portion 10311 in a vicinity of the optical axis; the image-side surface 1042 of the fourth lens element 1040 may comprise a convex portion 10422 in a vicinity of a periphery of the fourth lens element 1040; and the sixth lens element 1060 may have positive refracting power.

FIG. 44 depicts the optical characteristics of each lens elements in the optical imaging lens 10 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 1011 of the first lens element 1010 to the image plane 1080 along the optical axis may be about 3.866 mm, the image height may be about 2.3 mm, and the length of the optical imaging lens 10 may be shortened compared with conventional optical imaging lenses. Thus, the optical imaging lens 10 may be capable of providing excellent imaging quality for smaller sized mobile devices.

FIG. 43(a) shows the longitudinal spherical aberration. From the vertical deviation of each curve shown in FIG. 43(a), the offset of the off-axis light relative to the image point may be within about ±0.018 mm. Furthermore, the three curves having different wavelengths may be closed to each other, and this situation may represent that off-axis light with respect to these wavelengths is focused around an image point, and the aberration can be improved obviously.

FIGS. 43(b) and 43(c) respectively show the astigmatism aberration in the sagittal direction and astigmatism aberration in the tangential direction. Referring to FIG. 43(b), the focus variation with respect to the three different wavelengths (470 nm, 555 nm, 650 nm) in the whole field may fall within about ±0.18 mm. Referring to FIG. 43(c), the focus variation with respect to the three different wavelengths (470 nm, 555 nm, 650 nm) in the whole field may fall within about ±0.16 mm. Additionally, the three curves presenting different wavelengths may be closed to each other, and these closed curves may represent that the dispersion is improved.

Please refer to FIG. 43(d), the variation of the distortion aberration of the optical imaging lens 10 may be within about ±3.0%.

Figure 46:
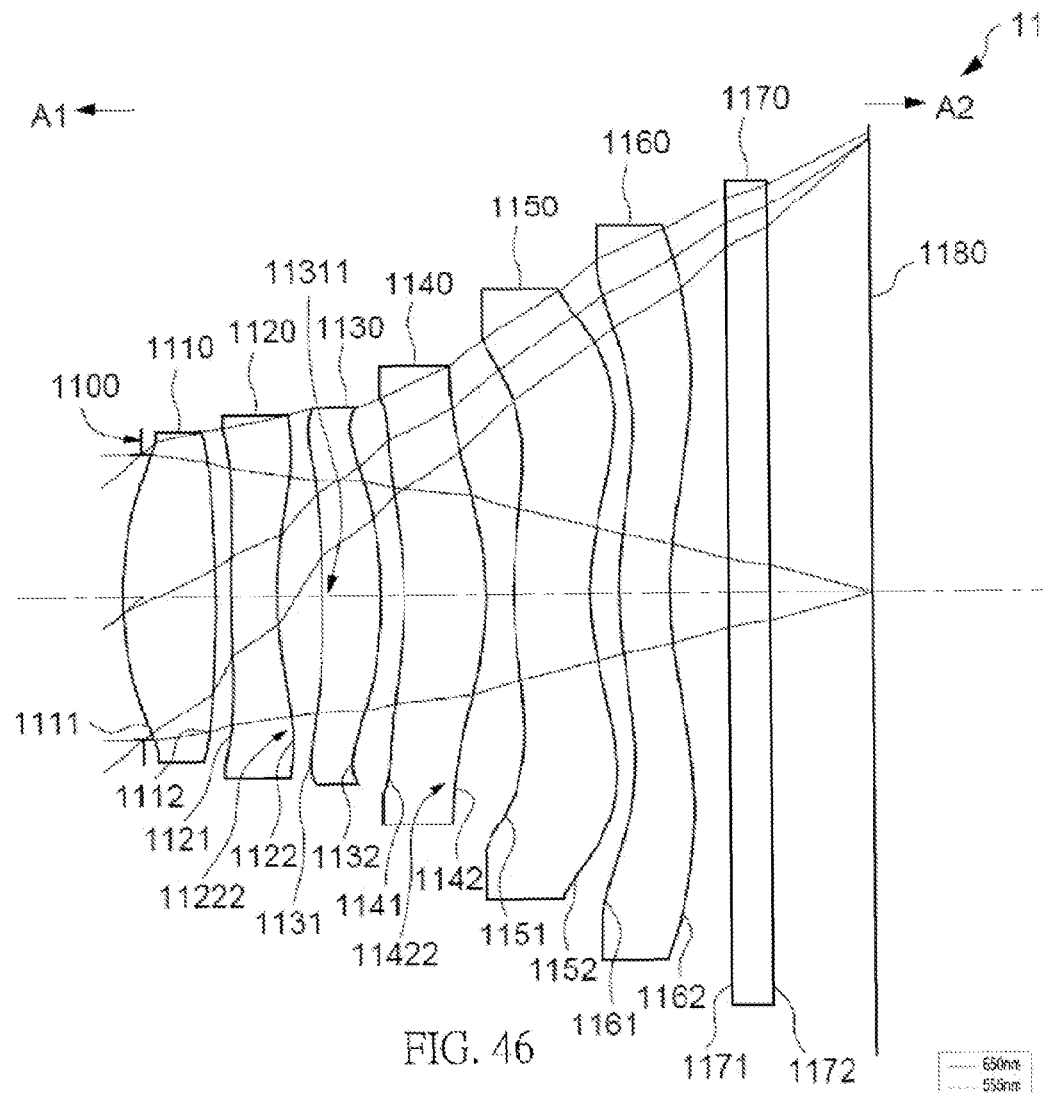
FIG. 46 is a cross-sectional view of a eleventh embodiment of an optical imaging lens having six lens elements according to the present disclosure.
Figure 47:
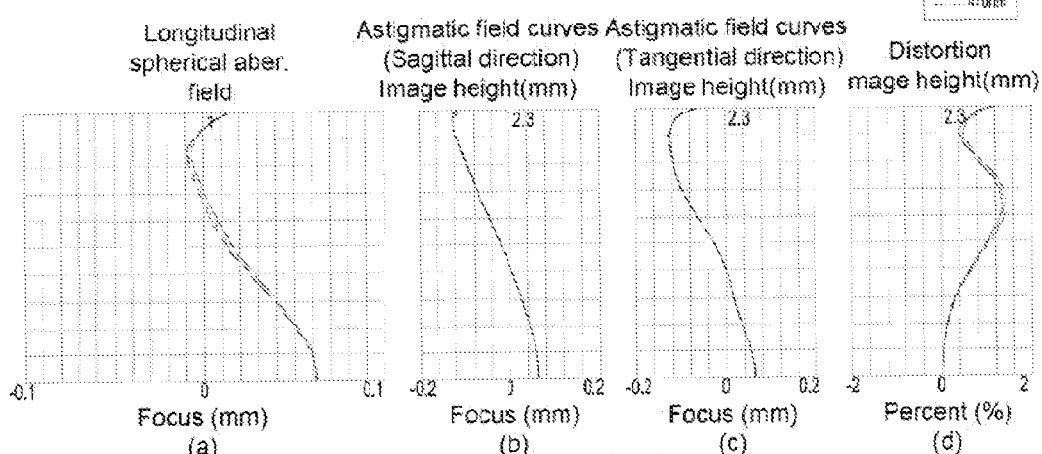
FIG. 47 is a chart of longitudinal spherical aberration and other kinds of optical aberrations of an eleventh embodiment of the optical imaging lens according the present disclosure.

Reference is now made to FIGS. 46-49. FIG. 46 illustrates an example cross-sectional view of an optical imaging lens 11 having six lens elements of the optical imaging lens according to a eleventh example embodiment. FIG. 47 shows example charts of longitudinal spherical aberration and other kinds of optical aberrations of the optical imaging lens 11 according to the eleventh embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labeling the object-side surface of the third lens element 1130, reference number 1132 for labeling the image-side surface of the third lens element 1130, etc.

As shown in FIG. 46, the optical imaging lens 11 of the present embodiment, in an order from an object side A1 to an image side A2 along an optical axis, may comprise an aperture stop 1100, a first lens element 1110, a second lens element 1120, a third lens element 1130, a fourth lens element 1140, a fifth lens element 1150 and a sixth lens element 1160.

The differences between the eleventh embodiment and the first embodiment may include the radius of curvature and thickness of each lens element, the aspherical data, back focal length, and the configuration of the concave/convex shape of the object-side surface 1131 and image-side surfaces 1122, 1142, but the configuration of the positive/negative refracting power of the first, second, third, fourth, fifth, and sixth lens elements 1110, 1120, 1130, 1140, 1150, 1160 and configuration of the concave/convex shape of surfaces, comprising the object-side surfaces 1111, 1121, 1141, 1151, 1161 facing to the object side A1 and the image-side surfaces 1112, 1132, 1152, 1162 facing to the image side A2, may be similar to those in the first embodiment. Here, for clearly showing the drawings of the present embodiment, only the surface shapes which are different from that in the first embodiment are labeled. Specifically, the image-side surface 1122 of the second lens element 1120 may comprise a convex portion 11222 in a vicinity of a periphery of the second lens element 1120; the object-side surface 1131 of the third lens element 1130 may comprise a concave portion 11311 in a vicinity of a optical axis of the third lens element 1130; and the image-side surface 1142 of the fourth lens element 1140 may comprise a convex portion 11422 in a vicinity of a periphery of the fourth lens element 1140.

FIG. 48 depicts the optical characteristics of each lens elements in the optical imaging lens 11 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 1111 of the first lens element 1110 to the image plane 1180 along the optical axis may be about 3.800 mm, the image height may be about 2.3 mm, and the length of the optical imaging lens 11 may be shortened compared with conventional optical imaging lenses. Thus, the optical imaging lens 11 may be capable of providing excellent imaging quality for smaller sized mobile devices.

FIG. 47(a) shows the longitudinal spherical aberration. From the vertical deviation of each curve shown in FIG. 47(a), the offset of the off-axis light relative to the image point may be within about ±0.07 mm. Furthermore, the three curves having different wavelengths may be closed to each other, and this situation may represent that off-axis light with respect to these wavelengths is focused around an image point, and the aberration can be improved.

FIGS. 47(b) and 47(c) respectively show the astigmatism aberration in the sagittal direction and astigmatism aberration in the tangential direction. Referring to FIG. 47(b), the focus variation with respect to the three different wavelengths (470 nm, 555 nm, 650 nm) in the whole field may fall within about ±0.18 mm. Referring to FIG. 47(c), the focus variation with respect to the three different wavelengths (470 nm, 555 nm, 650 nm) in the whole field may fall within about ±0.18 mm. Additionally, the three curves presenting different wavelengths may be closed to each other, and these closed curves may represent that the dispersion is improved.

Please refer to FIG. 47(d), the variation of the distortion aberration of the optical imaging lens 11 may be within about ±1.8%.

Reference is now made to FIGS. 50-53. FIG. 50 illustrates an example cross-sectional view of an optical imaging lens 12 having six lens elements of the optical imaging lens according to a twelfth example embodiment. FIG. 51 shows example charts of longitudinal spherical aberration and other kinds of optical aberrations of the optical imaging lens 12 according to the twelfth embodiment. FIG. 52 shows an example table of optical data of each lens element of the optical imaging lens 12 according to the twelfth example embodiment. FIG. 53 shows an example table of aspherical data of the optical imaging lens 12 according to the twelfth example embodiment. The reference numbers labeled in the present embodiment are similar to those in the first embodiment for the similar elements, but here the reference numbers are initialed with 12, for example, reference number 1231 for labeling the object-side surface of the third lens element 1230, reference number 1232 for labeling the image-side surface of the third lens element 1230, etc.

As shown in FIG. 50, the optical imaging lens 12 of the present embodiment, in an order from an object side A1 to an image side A2 along an optical axis, may comprise an aperture stop 1200, a first lens element 1210, a second lens element 1220, a third lens element 1230, a fourth lens element 1240, a fifth lens element 1250 and a sixth lens element 1260.

The differences between the twelfth embodiment and the first embodiment may include the radius of curvature and thickness of each lens element, the aspherical data, back focal length, the configuration of the positive/negative refracting power of the sixth lens element 1260, and the configuration of the concave/convex shape of the object-side surface 1231 and image-side surfaces 1222, 1242, but the configuration of the positive/negative refracting power of the first, second, third, fourth, and fifth lens elements 1210, 1220, 1230, 1240, 1250 and configuration of the concave/convex shape of surfaces, comprising the object-side surfaces 1211, 1221, 1241, 1251, 1261 facing to the object side A1 and the image-side surfaces 1212, 1232, 1252, 1262 facing to the image side A2, may be similar to those in the first embodiment. Here, for clearly showing the drawings of the present embodiment, only the surface shapes which are different from that in the first embodiment are labeled. Specifically, the image-side surface 1222 of the second lens element 1220 may comprise a convex portion 12222 in a vicinity of a periphery of the second lens element 1220; the object-side surface 1231 of the third lens element 1230 may comprise a concave portion 12311 in a vicinity of the optical axis; the image-side surface 1242 of the fourth lens element 1240 may comprise a convex portion 12422 in a vicinity of a periphery of the fourth lens element 1240; and the sixth lens element 1260 may have positive refracting power.

FIG. 52 depicts the optical characteristics of each lens elements in the optical imaging lens 12 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 1211 of the first lens element 1210 to the image plane 1280 along the optical axis may be about 3.787 mm, the image height may be about 2.3 mm, and the length of the optical imaging lens 12 may be shortened compared with conventional optical imaging lenses. Thus, the optical imaging lens 12 may be capable of providing excellent imaging quality for smaller sized mobile devices.

FIG. 51(a) shows the longitudinal spherical aberration. From the vertical deviation of each curve shown in FIG. 51(a), the offset of the off-axis light relative to the image point may be within about ±0.035 mm. Furthermore, the three curves having different wavelengths may be closed to each other, and this situation may represent that off-axis light with respect to these wavelengths is focused around an image point, and the aberration can be improved.

FIGS. 51(b) and 51(c) respectively show the astigmatism aberration in the sagittal direction and astigmatism aberration in the tangential direction. Referring to FIG. 51(b), the focus variation with respect to the three different wavelengths (470 nm, 555 nm, 650 nm) in the whole field may fall within about ±0.16 mm. Referring to FIG. 51(c), the focus variation with respect to the three different wavelengths (470 nm, 555 nm, 650 nm) in the whole field may fall within about ±0.14 mm. Additionally, the three curves presenting different wavelengths are closed to each other, and these closed curves may represent that the dispersion is improved.

Please refer to FIG. 51(d), the variation of the distortion aberration of the optical imaging lens 12 may be within about ±0.8%.

Figure 54:
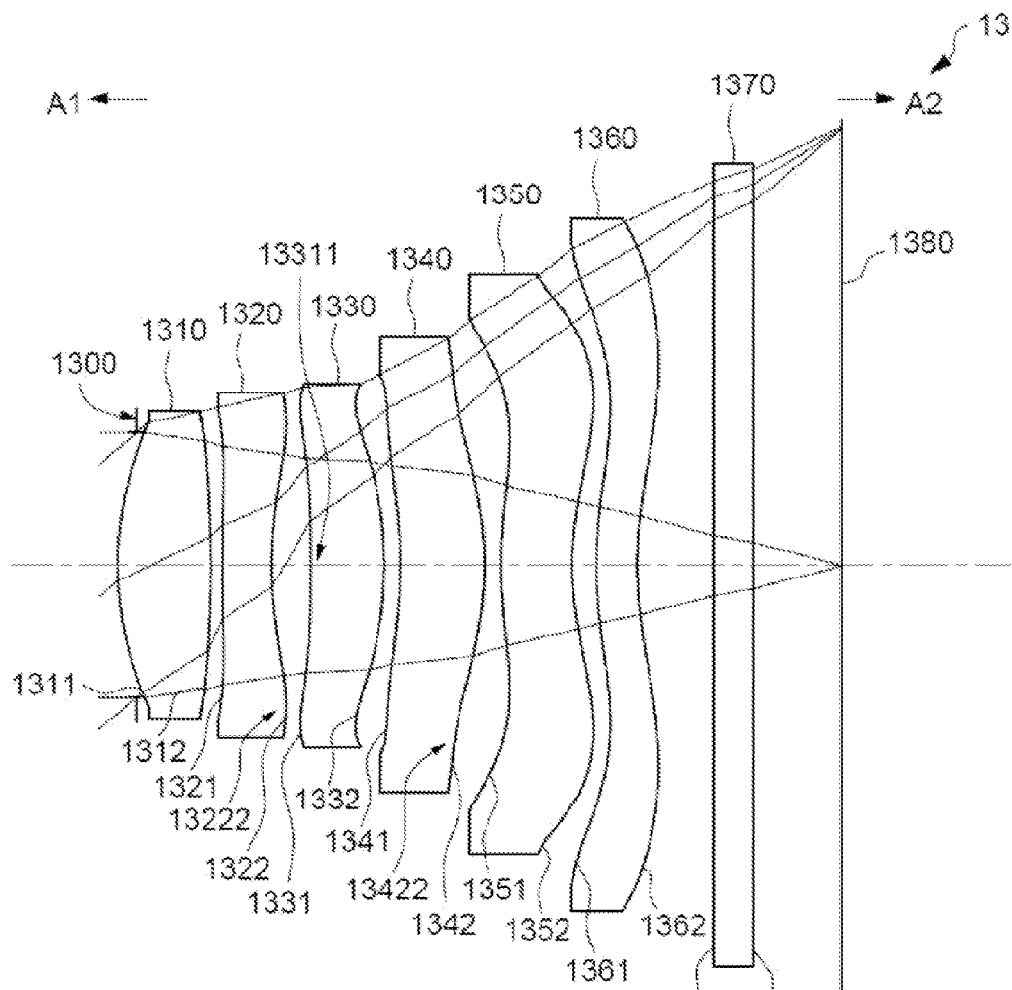
FIG. 54 is a cross-sectional view of a thirteenth embodiment of an optical imaging lens having six lens elements according to the present disclosure.
Figure 55:
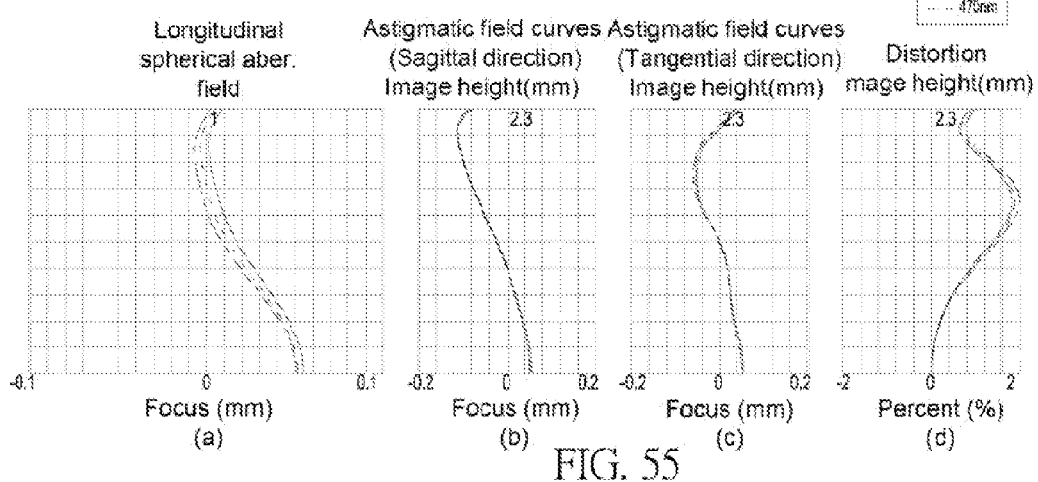
FIG. 55 is a chart of longitudinal spherical aberration and other kinds of optical aberrations of a thirteenth embodiment of the optical imaging lens according the present disclosure.

Reference is now made to FIGS. 54-57. FIG. 54 illustrates an example cross-sectional view of an optical imaging lens 13 having six lens elements of the optical imaging lens according to a thirteenth example embodiment. FIG. 55 shows example charts of longitudinal spherical aberration and other kinds of optical aberrations of the optical imaging lens 13 according to the thirteenth embodiment. FIG. 56 shows an example table of optical data of each lens element of the optical imaging lens 13 according to the thirteenth example embodiment. FIG. 57 shows an example table of aspherical data of the optical imaging lens 13 according to the thirteenth example embodiment. The reference numbers labeled in the present embodiment are similar to those in the first embodiment for the similar elements, but here the reference numbers are initialed with 13, for example, reference number 1331 for labeling the object-side surface of the third lens element 1330, reference number 1332 for labeling the image-side surface of the third lens element 1330, etc.

As shown in FIG. 54, the optical imaging lens 13 of the present embodiment, in an order from an object side A1 to an image side A2 along an optical axis, may comprise an aperture stop 1300, a first lens element 1310, a second lens element 1320, a third lens element 1330, a fourth lens element 1340, a fifth lens element 1350 and a sixth lens element 1360.

The differences between the thirteenth embodiment and the first embodiment may include the radius of curvature and thickness of each lens element, the aspherical data, back focal length, and the configuration of the concave/convex shape of the object-side surface 1331 and image-side surfaces 1322, 1342, but the configuration of the positive/negative refracting power of the first, second, third, fourth, fifth and sixth lens elements 1310, 1320, 1330, 1340, 1350, 1360 and configuration of the concave/convex shape of surfaces, comprising the object-side surfaces 1311, 1321, 1341, 1351, 1361 facing to the object side A1 and the image-side surfaces 1312, 1332, 1352, 1362 facing to the image side A2, may be similar to those in the first embodiment. Here, for clearly showing the drawings of the present embodiment, only the surface shapes which are different from that in the first embodiment are labeled. Specifically, the image-side surface 1322 of the second lens element 1320 may comprise a convex portion 13222 in a vicinity of a periphery of the second lens element 1320; the object-side surface 1331 of the third lens element 1330 may comprise a concave portion 13311 in a vicinity of the optical axis; and the image-side surface 1342 of the fourth lens element 1340 may comprise a convex portion 13422 in a vicinity of a periphery of the fourth lens element 1340.

FIG. 56 depicts the optical characteristics of each lens elements in the optical imaging lens 13 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 1311 of the first lens element 1310 to the image plane 1380 along the optical axis may be about 3.802 mm, the image height may be about 2.3 mm, and the length of the optical imaging lens 13 may be shortened compared with conventional optical imaging lenses. Thus, the optical imaging lens 13 may be capable of providing excellent imaging quality for smaller sized mobile devices.

FIG. 55(a) shows the longitudinal spherical aberration. From the vertical deviation of each curve shown in FIG. 55(a), the offset of the off-axis light relative to the image point may be within about ±0.06 mm. Furthermore, the three curves having different wavelengths may be closed to each other, and this situation may represent that off-axis light with respect to these wavelengths is focused around an image point, and the aberration can be improved.

FIGS. 55(b) and 55(c) respectively show the astigmatism aberration in the sagittal direction and astigmatism aberration in the tangential direction. Referring to FIG. 55(b), the focus variation with respect to the three different wavelengths (470 nm, 555 nm, 650 nm) in the whole field may fall within about ±0.16 mm. Referring to FIG. 55(c), the focus variation with respect to the three different wavelengths (470 nm, 555 nm, 650 nm) in the whole field may fall within about ±0.14 mm. Additionally, the three curves presenting different wavelengths may be closed to each other, and these closed curves may represent that the dispersion is improved.

Please refer to FIG. 55(d), the variation of the distortion aberration of the optical imaging lens 13 may be within about ±2.0%.

Figure 58:
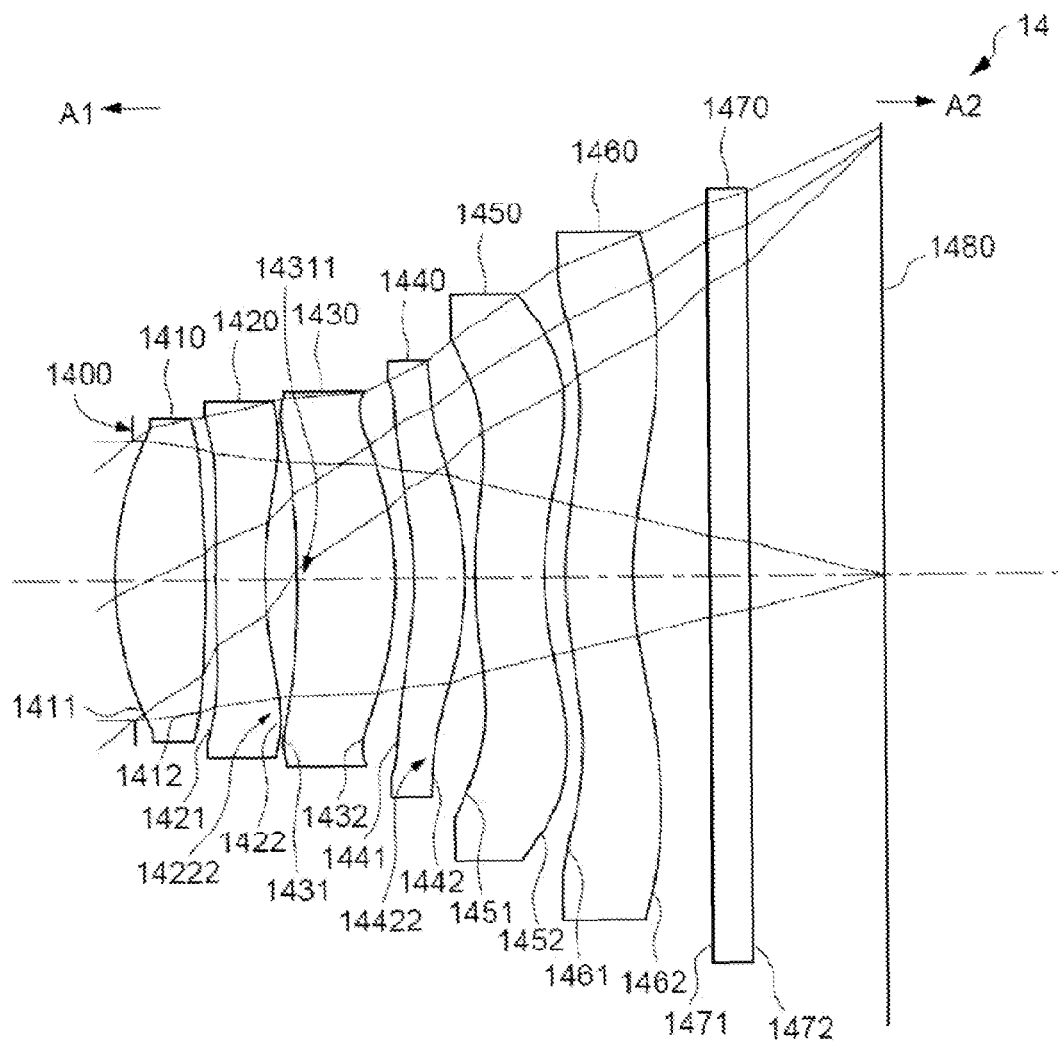
FIG. 58 is a cross-sectional view of a fourteenth embodiment of an optical imaging lens having six lens elements according to the present disclosure.
Figure 59:
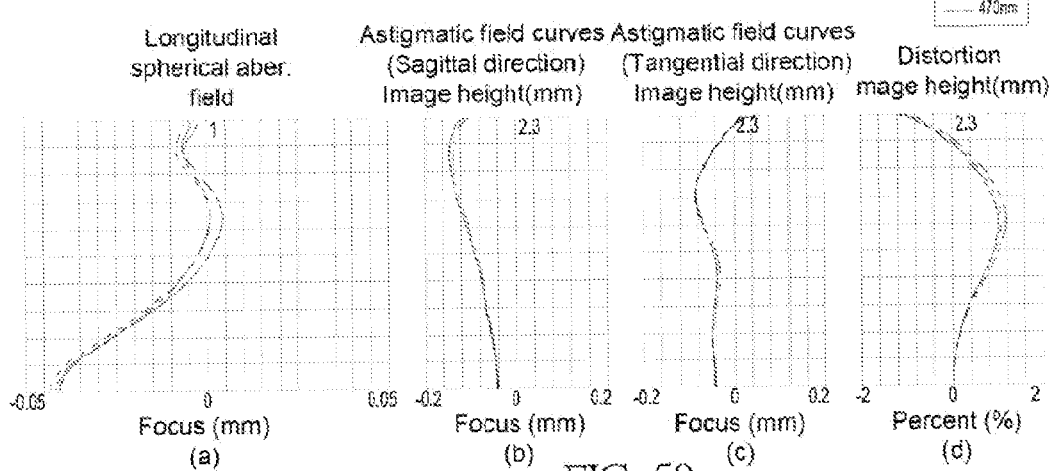
FIG. 59 is a chart of longitudinal spherical aberration and other kinds of optical aberrations of a fourteenth embodiment of the optical imaging lens according the present disclosure.

Reference is now made to FIGS. 58-61. FIG. 58 illustrates an example cross-sectional view of an optical imaging lens 14 having six lens elements of the optical imaging lens according to a fourteenth example embodiment. FIG. 59 shows example charts of longitudinal spherical aberration and other kinds of optical aberrations of the optical imaging lens 14 according to the fourteenth embodiment. FIG. 60 shows an example table of optical data of each lens element of the optical imaging lens 14 according to the fourteenth example embodiment. FIG. 61 shows an example table of aspherical data of the optical imaging lens 14 according to the fourteenth example embodiment. The reference numbers labeled in the present embodiment are similar to those in the first embodiment for the similar elements, but here the reference numbers are initialed with 14, for example, reference number 1431 for labeling the object-side surface of the third lens element 1430, reference number 1432 for labeling the image-side surface of the third lens element 1430, etc.

As shown in FIG. 58, the optical imaging lens 14 of the present embodiment, in an order from an object side A1 to an image side A2 along an optical axis, may comprise an aperture stop 1400, a first lens element 1410, a second lens element 1420, a third lens element 1430, a fourth lens element 1440, a fifth lens element 1450, and a sixth lens element 1460.

The differences between the fourteenth embodiment and the first embodiment may include the radius of curvature and thickness of each lens element, the aspherical data, back focal length, the configuration of the positive/negative refracting power of the sixth lens element 1460, and the configuration of the concave/convex shape of the object-side surface 1431 and image-side surfaces 1422, 1442, but the configuration of the positive/negative refracting power of the first, second, third, fourth, and fifth lens elements 1410, 1420, 1430, 1440, 1450 and configuration of the concave/convex shape of surfaces, comprising the object-side surfaces 1411, 1421, 1441, 1451, 1461 facing to the object side A1 and the image-side surfaces 1412, 1432, 1452, 1462 facing to the image side A2, may be similar to those in the first embodiment. Here, for clearly showing the drawings of the present embodiment, only the surface shapes which are different from that in the first embodiment are labeled. Specifically, the image-side surface 1422 of the second lens element 1420 comprises a convex portion 14222 in a vicinity of a periphery of the second lens element 1420; the object-side surface 1431 of the third lens element 1430 comprises a concave portion 14311 in a vicinity of the optical axis; the image-side surface 1442 of the fourth lens element 1440 comprises a convex portion 14422 in a vicinity of a periphery of the fourth lens element 1440; and the sixth lens element 1460 has positive refracting power.

FIG. 60 depicts the optical characteristics of each lens elements in the optical imaging lens 14 of the present embodiment, and please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of the present embodiment.

The distance from the object-side surface 1411 of the first lens element 1410 to the image plane 1480 along the optical axis may be about 4.015 mm, the image height may be about 2.3 mm, and the length of the optical imaging lens 14 may be shortened compared with conventional optical imaging lenses. Thus, the optical imaging lens 14 may be capable of providing excellent imaging quality for smaller sized mobile devices.

FIG. 59(a) shows the longitudinal spherical aberration. From the vertical deviation of each curve shown in FIG. 59(a), the offset of the off-axis light relative to the image point may be within about ±0.045 mm. Furthermore, the three curves having different wavelengths may be closed to each other, and this situation may represent that off-axis light with respect to these wavelengths is focused around an image point, and the aberration can be improved.

FIGS. 59(b) and 59(c) respectively show the astigmatism aberration in the sagittal direction and astigmatism aberration in the tangential direction. Referring to FIG. 59(b), the focus variation with respect to the three different wavelengths (470 nm, 555 nm, 650 nm) in the whole field may fall within about ±0.18 mm. Referring to FIG. 59(c), the focus variation with respect to the three different wavelengths (470 nm, 555 nm, 650 nm) in the whole field may fall within about ±0.16 mm. Additionally, the three curves presenting different wavelengths may be closed to each other, and these closed curves may represent that the dispersion is improved.

Please refer to FIG. 59(d), the variation of the distortion aberration of the optical imaging lens 14 may be within about ±1.6%.

Please refer to FIGS. 62 (A) and 62(B) for the values of T1, G12, T2, G23, T3, G34, T4, G45, T5, G56, T6, BFL, EFL, ALT, AAG, EFL/(T2+T6), BFL/T4, AAG/T3, ALT/T6, EFL/AAG. BFL/(G12+G23), ALT/BFL, (T5+T6)/(G34+G45+G56), ALT+AAG. T3/(G12+G56), ALT/(G34+G56), T4/T5, AAG/T2, and T1/(G23+G56) of all fourteen embodiments, and it is clear that the optical imaging lens of the present disclosure satisfy the Equations (1)~(14).

Figure 63:
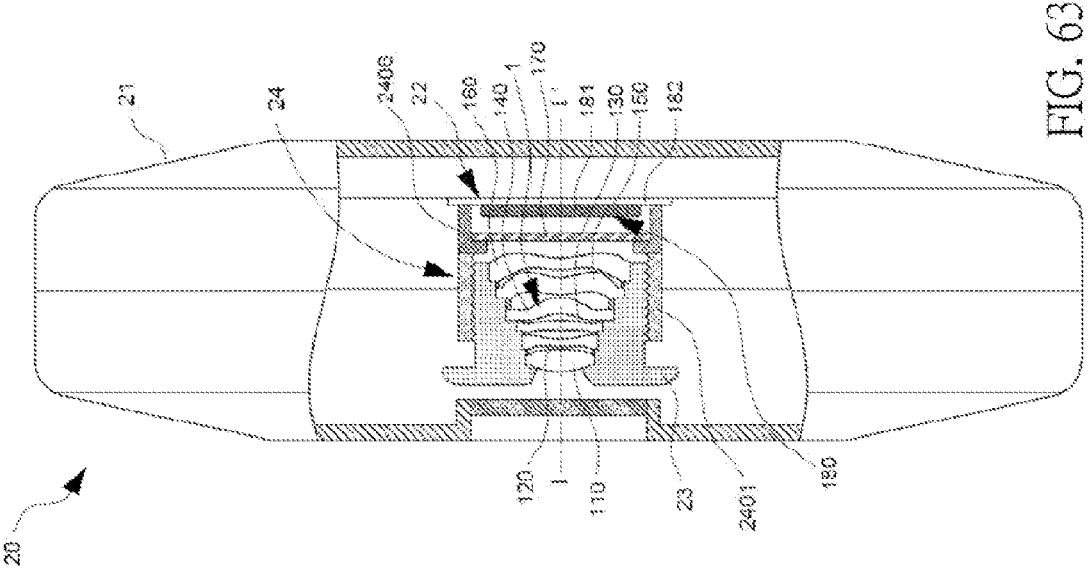
FIG. 63 is a structure of an example embodiment of a mobile device.

Reference is now made to FIG. 63, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 63, the photography module 22 has an optical imaging lens with fixed focal length, wherein the photography module 22 may comprise the aforesaid optical imaging lens with six lens elements. For example, photography module 22 comprises the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 180 is formed on the image sensor 181.

In some other example embodiments, the structure of the filtering unit 170 may be omitted. In some example embodiments, the housing 21, the lens barrel 23, and/or the module housing unit 24 may be integrated into a single component or assembled by multiple components. In some example embodiments, the image sensor 181 used in the present embodiment is directly attached to a substrate 182 in the form of a chip on board (COB) package, and such package is different from traditional chip scale packages (CSP) since COB package does not require a cover glass before the image sensor 181 in the optical imaging lens 1. Aforesaid exemplary embodiments are not limited to this package type and could be selectively incorporated in other described embodiments.

The six lens elements 110, 120, 130, 140, 150, 160 are positioned in the lens barrel 23 in the way of separated by an air gap between any two adjacent lens elements.

The module housing unit 24 comprises a lens backseat 2401 for positioning the lens barrel 23 and an image sensor base 2406 positioned between the lens backseat 2401 and the image sensor 181. The lens barrel 23 and the lens backseat 2401 are positioned along a same axis I-I', and the lens backseat 2401 is positioned at the inside of the lens barrel 23. The image sensor base 2406 is exemplarily close to the lens backseat 2401 here. The image sensor base 2406 could be optionally omitted in some other embodiments of the present disclosure.

Because the length of the optical imaging lens 1 may be merely 4.132 mm, the size of the mobile device 20 may be quite small. Therefore, the embodiments described herein meet the market demand for smaller sized product designs.

Figure 64:
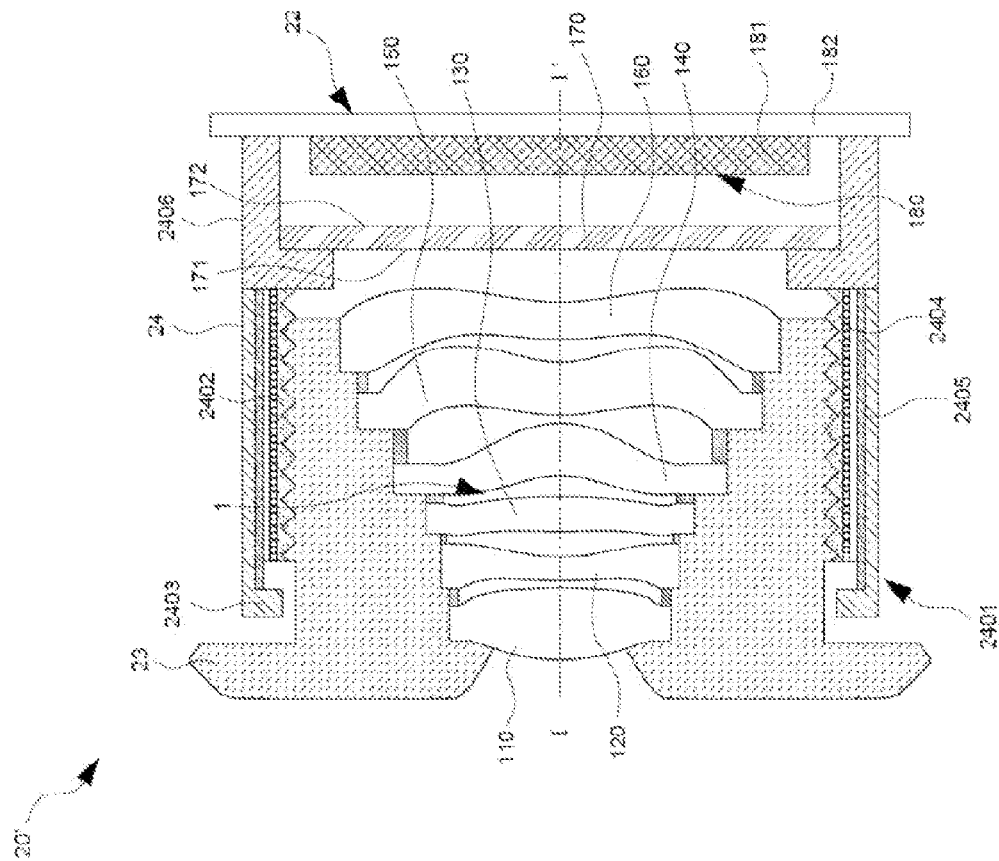
FIG. 64 is a partially enlarged view of the structure of another example embodiment of a mobile device.

Reference is now made to FIG. 64, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 may be close to the outside of the lens barrel 23, and positioned along an axis I-I', and the second seat unit 2403 may be around the outside of the first seat unit 2402 and positioned along with the axis I-I'. The coil 2404 may be positioned between the outside of the first seat unit 2402 and the inside of the second seat unit 2403. The magnetic unit 2405 may be positioned between the outside of the coil 2404 and the inside of the second seat unit 2403.

The lens barrel 23 and the optical imaging lens 1 positioned therein may be driven by the first seat unit 2402 for moving along the axis I-I'. The rest structure of the mobile device 20' may be similar to the mobile device 20.

Similarly, because the length of the optical imaging lens 1 may be about 4.132 mm, is shortened, the mobile device 20' may be designed with a smaller size and meanwhile good optical performance may still be provided. Therefore, the present embodiment may meet the demand of small sized product design and the request of the market.

According to above illustration, it is clear that the mobile device and the optical imaging lens thereof in example embodiments, through controlling the detail structure of the lens elements and an inequality, the length of the optical imaging lens may be effectively shortened and meanwhile good optical characteristics are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising an aperture stop, first, second, third, fourth, fifth and sixth lens elements, each of said first, second, third, fourth, fifth and sixth lens elements having refracting power, an object-side surface facing toward the object side and an image-side surface facing toward the image side and a central thickness defined along the optical axis, wherein:
   said image-side surface of said first lens element comprises a convex portion in a vicinity of the optical axis;
   said object-side surface of said second lens element comprises a concave portion in a vicinity of a periphery of the second lens element;
   said object-side surface of said third lens element comprises a convex portion in a vicinity of a periphery of the third lens element;
   said fourth lens element is constructed by plastic material;
   said image-side surface of said fifth lens element comprises a concave portion in a vicinity of the optical axis;
   said image-side surface of said sixth lens element comprises a concave portion in a vicinity of the optical axis;
   an effective focal length of the optical imaging lens is represented by EFL, a central thickness of the second lens element is represented by T2, a central thickness of the sixth lens element is represented by T6, EFL, T2 and T6 satisfy the equation: $EFL/(T2+T6) \leq 5.9$; and
   a sum of all five air gaps from the first lens element to the sixth lens element along the optical axis is represented by AAG, AAG and EFL satisfy the equation: $EFL/AAG \geq 4.0$;
   the optical imaging lens comprises no other lenses having refracting power beyond the six lens elements.

2. The optical imaging lens according to claim 1, wherein a back focal length of the optical imaging lens, which is defined as the distance from the image-side surface of the sixth lens element to an image plane along the optical axis is represented by BFL, a central thickness of the fourth lens element is represented by T4, BFL and T4 satisfy the equation: $BFL/T4 \geq 1.8$.

3. The optical imaging lens according to claim 2, wherein a central thickness of the fifth lens element is represented by T5, an air gap between the third lens element and the fourth lens element along the optical axis is represented by G34, an air gap between the fourth lens element and the fifth lens element along the optical axis is represented by G45, an air gap between the fifth lens element and the sixth lens element along the optical axis is represented by G56, T5, T6, G34, G45, and G56 satisfy the equation: $(T5+T6)/(G34+G45+G56) \geq 1.5$.

4. The optical imaging lens according to claim 1, wherein the central thickness of the third lens element is represented by T3, AAG and T3 satisfy the equation: $AAG/T3 \leq 2.4$.

5. The optical imaging lens according to claim 4, wherein a sum of the central thicknesses of all six lens elements along the optical axis is represented by ALT, ALT and AAG satisfy the equation: $ALT+AAG \leq 6$ mm.

6. The optical imaging lens according to claim 1, wherein a sum of the central thicknesses of all six lens elements along the optical axis is represented by ALT, ALT and T6 satisfy the equation: $ALT/T6 \geq 5.5$.

7. The optical imaging lens according to claim 6, wherein a central thickness of the third lens element is represented by T3, an air gap between the first lens element and the second lens element along the optical axis is represented by G12 an air gap between the fifth lens element and the sixth lens element along the optical axis is represented by G56, T3, G12 and G56 satisfy the equation: $T3/(G12+G56) \geq 1.0$.

8. The optical imaging lens according to claim 1, wherein a sum of the central thicknesses of all six lens elements along the optical axis is represented by ALT, an air gap between the third lens element and the fourth lens element along the optical axis is represented by G34, an air gap between the fifth lens element and the sixth lens element along the optical axis is represented by G56, ALT, G34 and G56 satisfy the equation: $ALT/(G34+G56) \geq 4.6$.

9. The optical imaging lens according to claim 1, wherein a central thickness of the fourth lens element is represented by T4, a central thickness of the fifth lens element is represented by T5, T4 and T5 satisfy the equation: $T4/T5 \leq 1.5$.

10. The optical imaging lens according to claim 1, wherein a back focal length of the optical imaging lens, which is defined as the distance from the image-side surface of the sixth lens element to the image plane along the optical axis is represented by BFL, an air gap between the first lens element and the second lens element along the optical axis is represented by G12, an air gap between the second lens element and the third lens element along the optical axis is represented by G23, BFL, G12 and G23 satisfy the equation: $BFL/(G12+G23) \geq 3.0$.

11. The optical imaging lens according to claim 10, wherein a sum of all five air gaps from the first lens element to the sixth lens element along the optical axis is represented by AAG, a central thickness of the second lens element is represented by T2, AAG and T2 satisfy the equation: $AAG/T2 \leq 3.8$.

12. The optical imaging lens according to claim 1, wherein a sum of the central thicknesses of all six lens elements along the optical axis is represented by ALT, a back focal length of the optical imaging lens, which is defined as the distance from the image-side surface of the sixth lens element to the image plane along the optical axis is represented by BFL, ALT and BFL satisfy the equation: $ALT/BFL \leq 2.5$.

13. The optical imaging lens according to claim 12, wherein a central thickness of the first lens element is represented by T1, an air gap between the second lens element and the third lens element along the optical axis is represented by G23, an air gap between the fifth lens element and the sixth lens element along the optical axis is represented by G56, T1, G23 and G56 satisfy the equation: $T1/(G23+G56) \geq 1.25$.

14. A mobile device, comprising:
  a housing; and
  a photography module positioned in the housing and comprising:
   an optical imaging lens according to claim 1;
   a lens barrel for positioning the optical imaging lens;
   a module housing unit for positioning the lens barrel; and
   an image sensor positioned at the image side of the optical imaging lens.

* * * * *